United States Patent [19]

Ho et al.

[11] 4,379,991

[45] Apr. 12, 1983

[54] APPARATUS FOR ACCURATELY MEASURING THE VOLUME OF A METER PROVER

[75] Inventors: William W. Ho; William F. Hall, both of Thousand Oaks, Calif.

[73] Assignee: Rockwell International Corporation, Pittsburgh, Pa.

[21] Appl. No.: 135,191

[22] Filed: Mar. 28, 1980

[51] Int. Cl.³ .................. G01R 27/04; G01F 17/00
[52] U.S. Cl. .................. 324/58.5 C; 73/149
[58] Field of Search ............ 324/58.5 C, 58.5 R, 324/71 R; 73/149, 290 V

[56] References Cited

U.S. PATENT DOCUMENTS 2,491,418 12/1949 Schlesman ............ 324/58.5 C
3,312,107 4/1967 Burns et al. ............... 73/149

Primary Examiner—Ernest F. Karlsen
Attorney, Agent, or Firm—Mason, Fenwick & Lawrence

[57] ABSTRACT

Apparatus and method are disclosed for measuring the volume of a chamber of a meter prover. The meter prover includes a piston adapted for rectilinear movement within said cylinder between a first position and a second position. The volume measuring apparatus comprises an antenna disposed within the chamber and a generator coupled to apply electromagnetic energy to the antenna whereby electromagnetic waves are emanated into the chamber. A detector is coupled to the antenna to detect electromagnetic energy reflected from the chamber and is in turn coupled to a resonant detector in the form of a cathode ray tube, whereby a minimum of the level of the electromagnetic energy may be determined. Further, a frequency detector in the form of a counter, is connected to the output of the generator to detect the frequencies of the generator output at which the minimum level occurs as observed upon a display device corresponding to the establishment of a resonant standing wave within the chamber of the meter prover. The frequency(ies) at which the resonant standing waves are established within the chamber, in turn determine the volume of the meter prover chamber. The electromagnetic field(s) are generated within the chamber of a mode selected so that at a resonant condition within the chamber, the electric and magnetic component fields of the electromagnetic field have a defined relation to the dimensions of the chamber of regular geometry, illustratively, a right circular cylinder.

13 Claims, 58 Drawing Figures

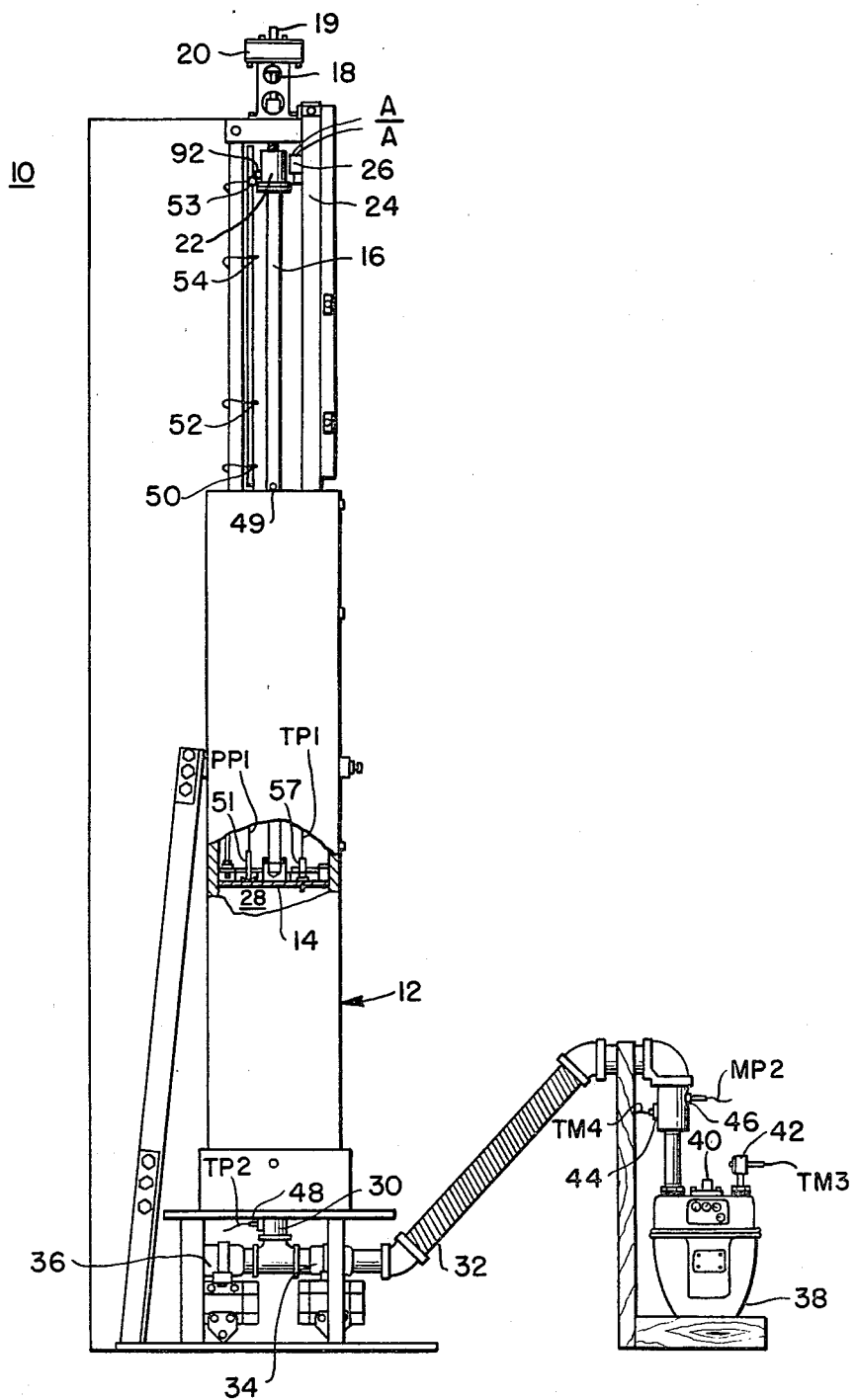

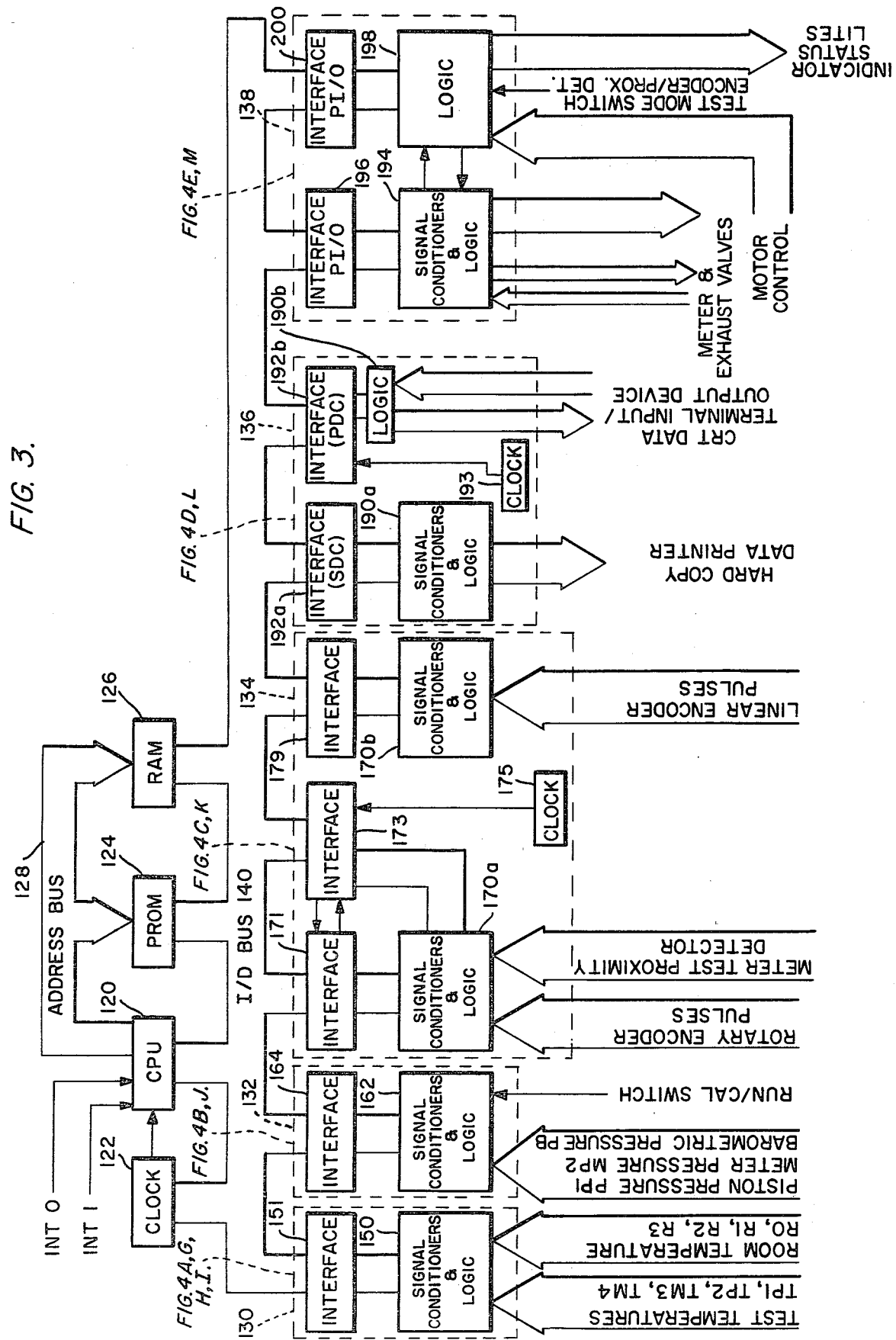

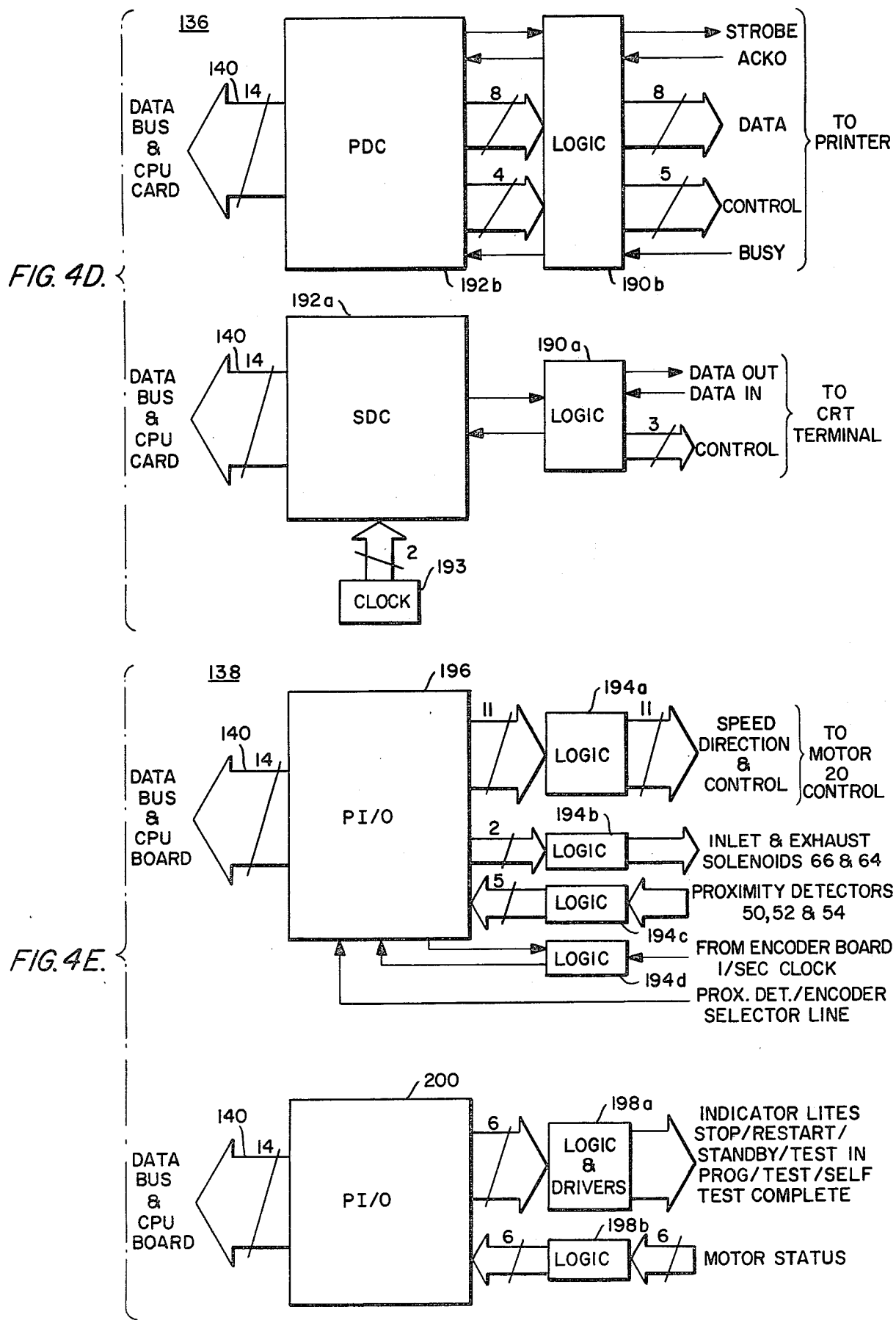

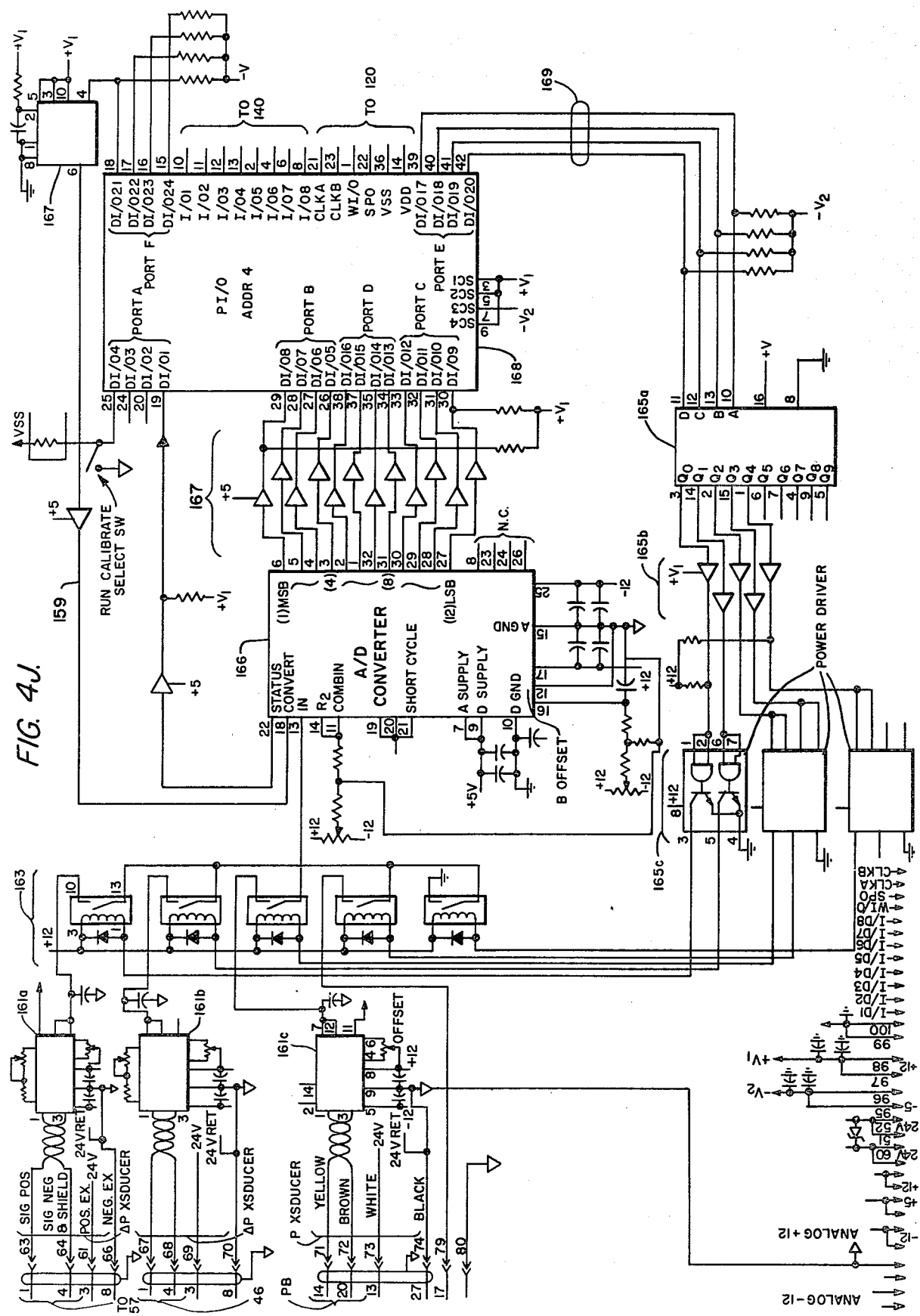

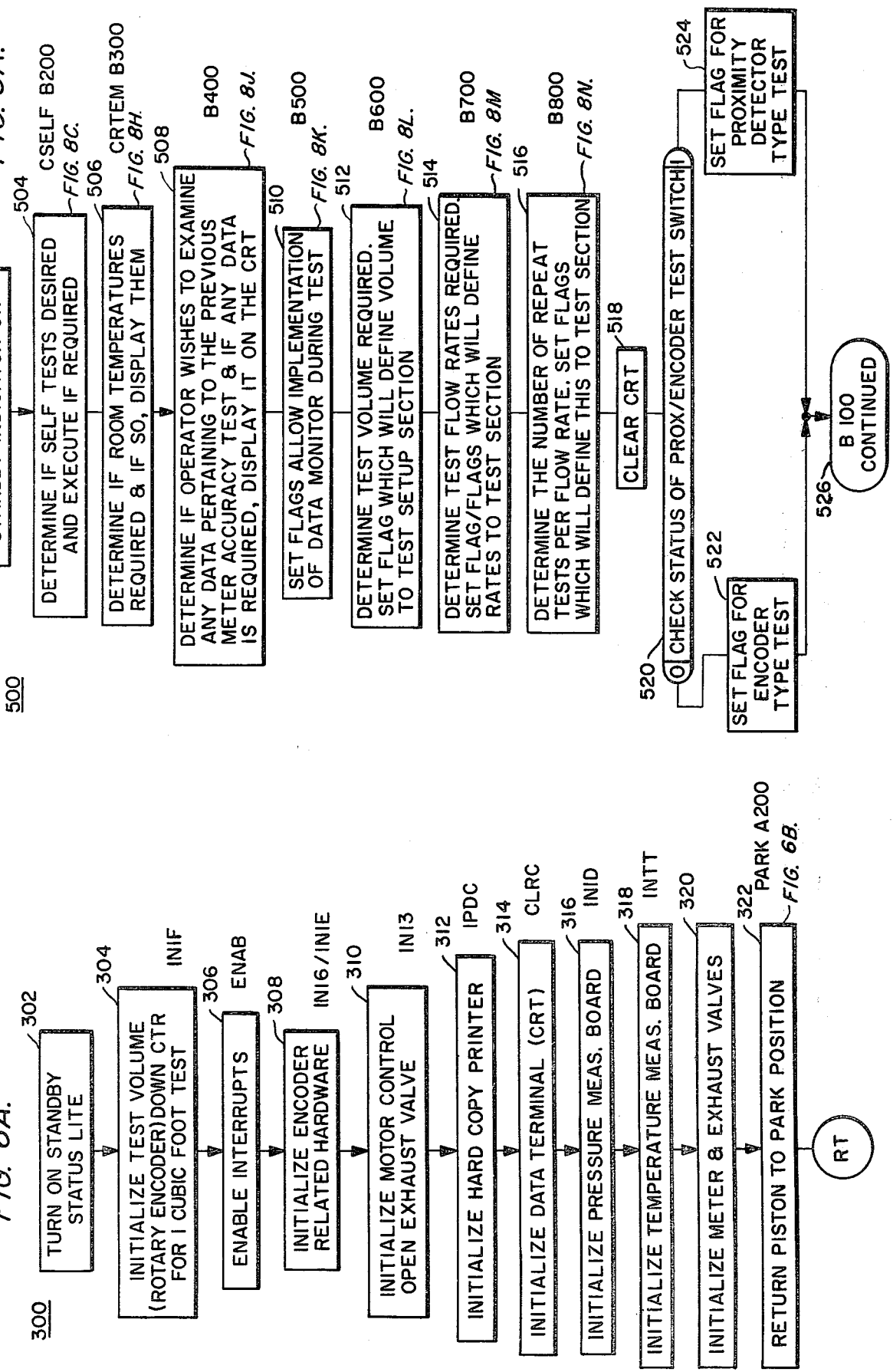

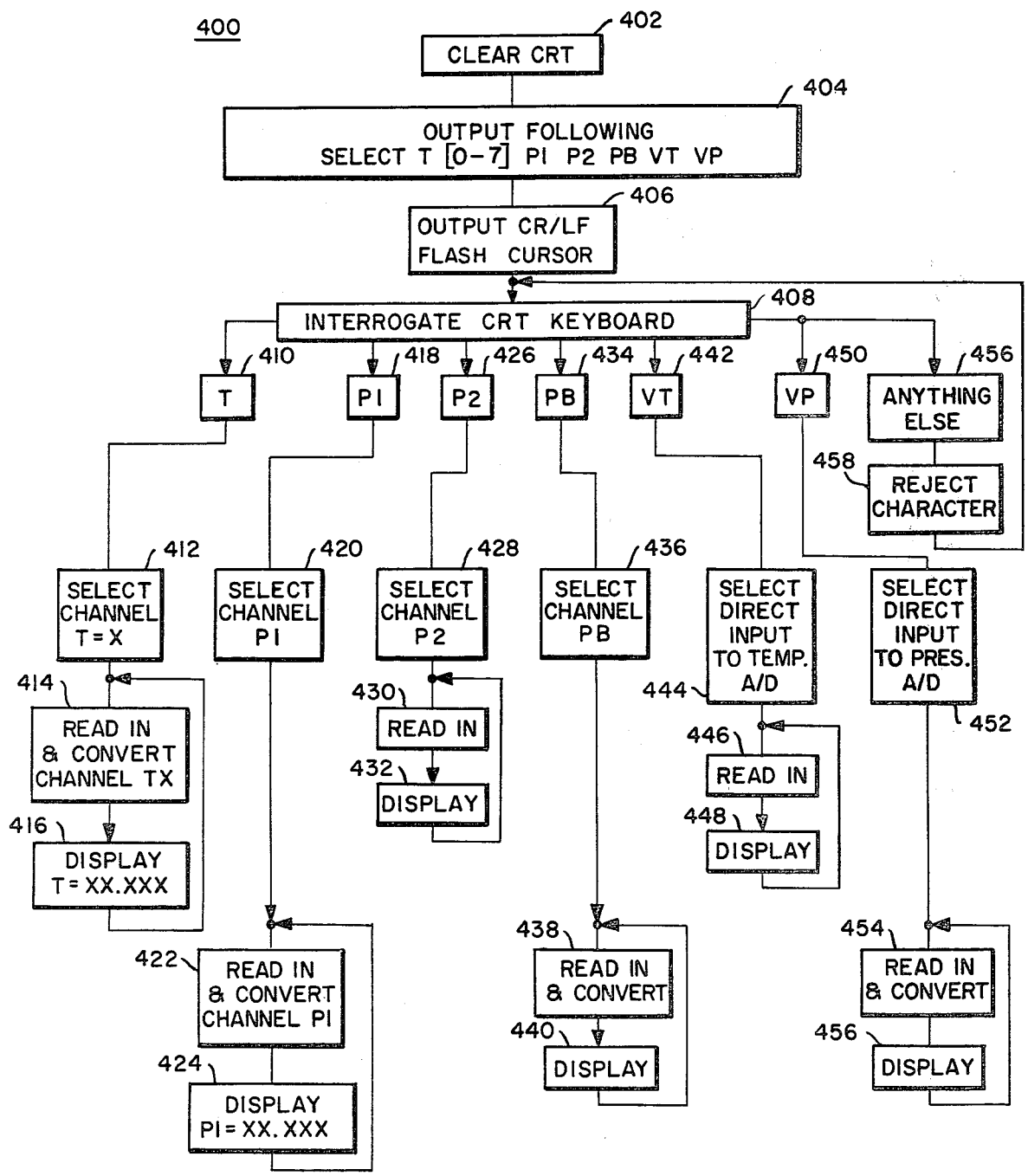

FIG. 8C.

```
                        544  C SELF
                         │
                    ┌─────────┐
                    │CLEAR CRT│ 542
                    └────┬────┘
                         │
        ┌────────────────────────────────┐
        │ OUTPUT FOLLOWING               │
  504   │ IF SELF TESTS DESIRED,         │ 544
        │ ENTER V(VOLUME) L(LEAK) OR NO  │
        └────────────────┬───────────────┘
                         │
                    ┌─────────────┐
                    │OUTPUT CR/LF │ 546
                    │FLASH CURSOR │
                    └──────┬──────┘
                           │  548  D SELF
                    ┌──────────────┐
                    │ INTERROGATE  │────┬──────┐
                    │ CRT KEYBOARD │    │ 568  │
                    └──────────────┘   ┌──────────────┐
                      │  │  │  │       │ANYTHING ELSE │
                      │  │  │  │       └──────┬───────┘
          550 V       │  │  │  │ NO 566              │ 570
                      │  │  │  └──(RT)       ┌──────────┐
              558 L   │  │  │                │  REJECT  │
                      │  │  │ 562 ESC        │CHARACTER │
                      │  │  └──▶ TO EB1      └──────────┘
                      │  │       212
                      │  │       FIG.5
           ┌──────────────┐
           │OUTPUT VOLUME │ 552
           │  SELF TEST   │
           └──────┬───────┘
                  │        ┌──────────────┐
                  │        │OUTPUT LEAK   │ 559
                  │        │  SELF TEST   │
                  │        └──────┬───────┘
           ┌──────────────┐       │
           │EXECUTE VOLUME│ 554   │
           │  SELF TEST   │       │
           └──────┬───────┘       │
              STENC B220   ┌──────────────┐
              FIG. 8E.     │EXECUTE LEAK  │ 560
                           │  SELF TEST   │
                           └──────┬───────┘
                            STLE B210
                            FIG. 8D.
                         ┌──────────────┐
                         │OUTPUT ANOTHER?│ 556
                         └───────────────┘
```

FIG. 8B

```
   ┌──────────┐
   │   B100   │ 526
   │CONTINUED │
   └────┬─────┘
        │
   ┌─────────────────┐
   │OUTPUT TEST MONITOR│ 528    B900 VOUT
   │DATA IF REQUIRED  │        FIG. 8F.
   └────────┬─────────┘
            │
   ┌─────────────────┐
   │DECODE TEST VOLUME│ 530
   │     REQUIRED    │
   └────────┬────────┘
            │
   ┌─────────────────┐
   │OUTPUT FOLLOWING │ 532
   │TEST VOLUME = Z  │
   │WHERE Z = 1.0,.5 OR .25 BASED│
   │ON PREVIOUS DECISION│
   └────────┬────────┘
            │
   ┌─────────────────┐
   │DECODE FLOW RATES│ 534
   │    REQUIRED     │
   └────────┬────────┘
            │
   ┌─────────────────────┐
   │OUTPUT FOLLOWING     │ 536
   │FLOW RATES ARE Z.....Z│
   │WHERE Z= Q1,Q2,Q3,...QF│
   │BASED ON PREVIOUS DECISION│
   │ANY NUMBER OF FLOW RATES│
   │ONE TO 16 CAN RESULT │
   └────────┬────────────┘
            │
   ┌─────────────────┐
   │DECODE REPEATS   │ 538
   │    REQUIRED     │
   └────────┬────────┘
            │
   ┌─────────────────┐
   │OUTPUT FOLLOWING │ 539
   │TESTS PER FLOW RATE = Z│
   │WHERE Z=1,2 OR 3 BASED ON│
   │PREVIOUS DECISION│
   └────────┬────────┘
            │
   ┌─────────────┐
   │OUTPUT CR/LF │ 540
   └──────┬──────┘
          │
         (RT)
```

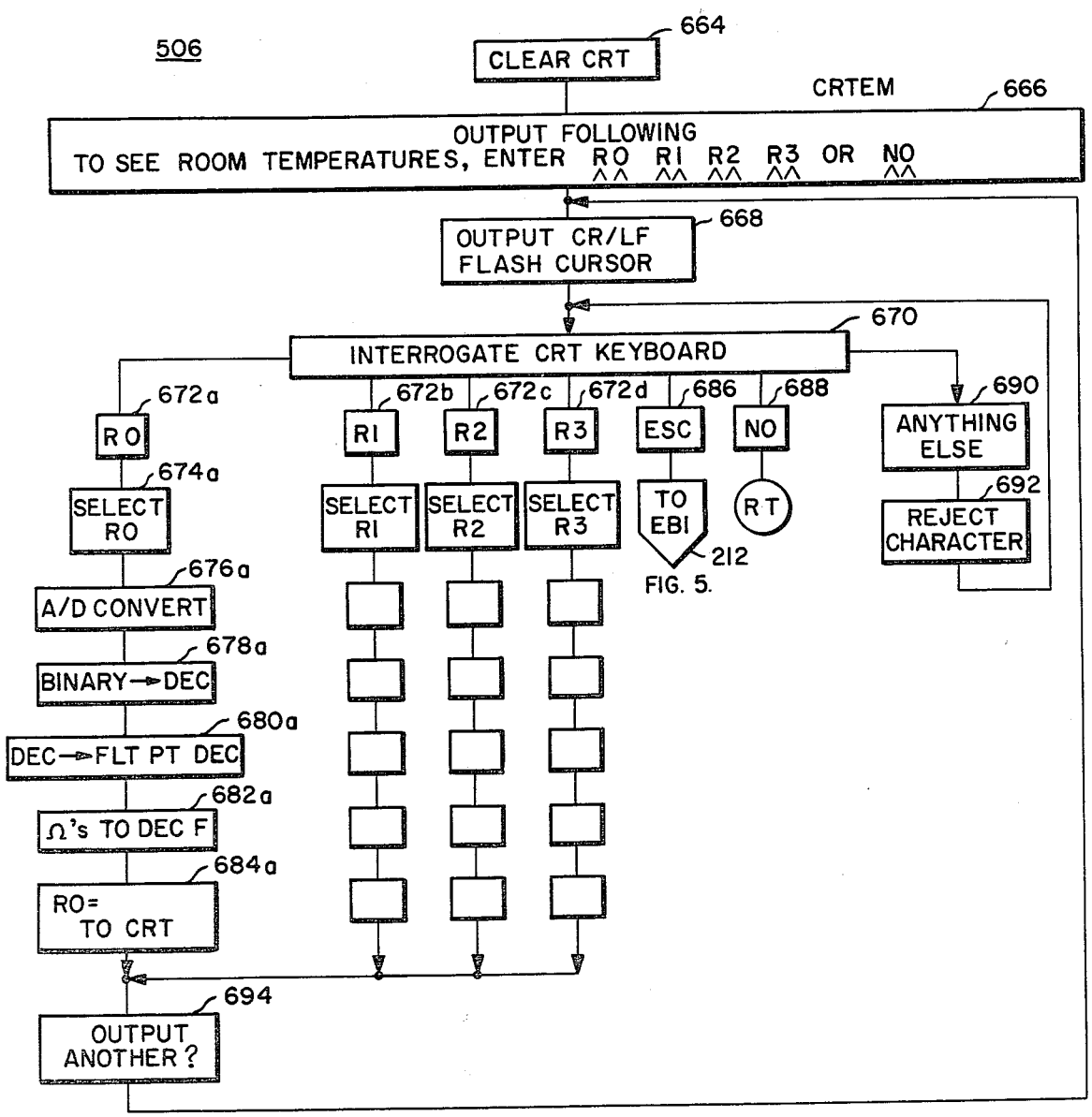

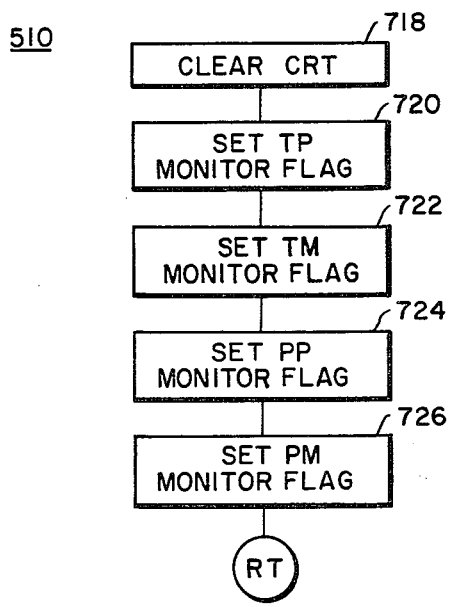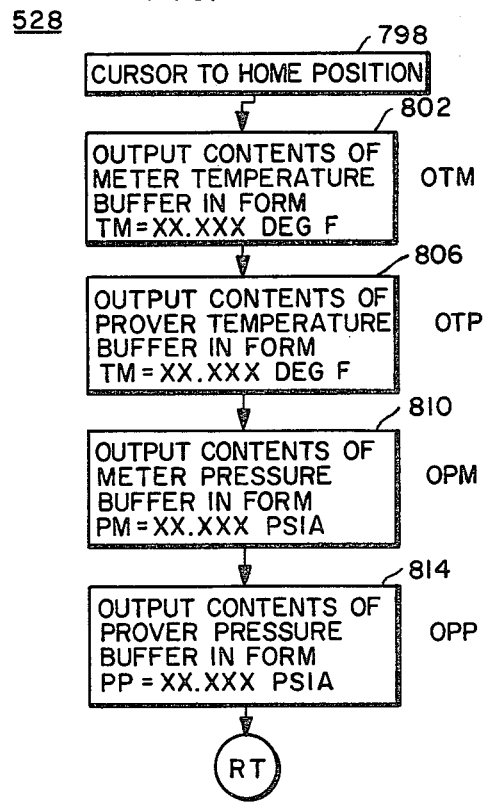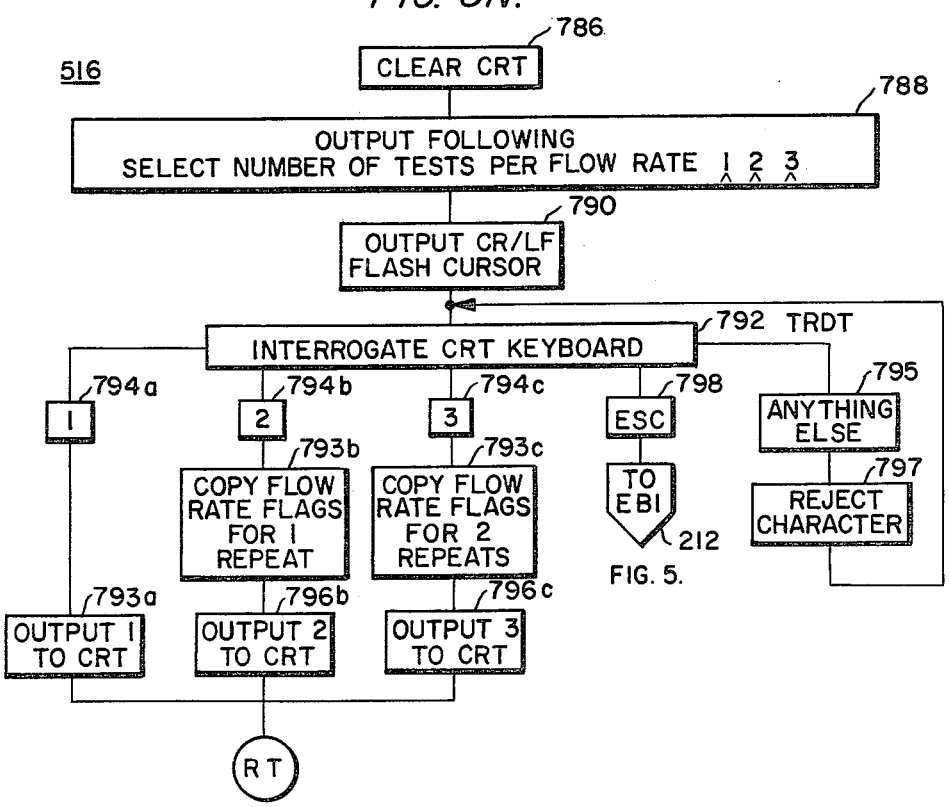

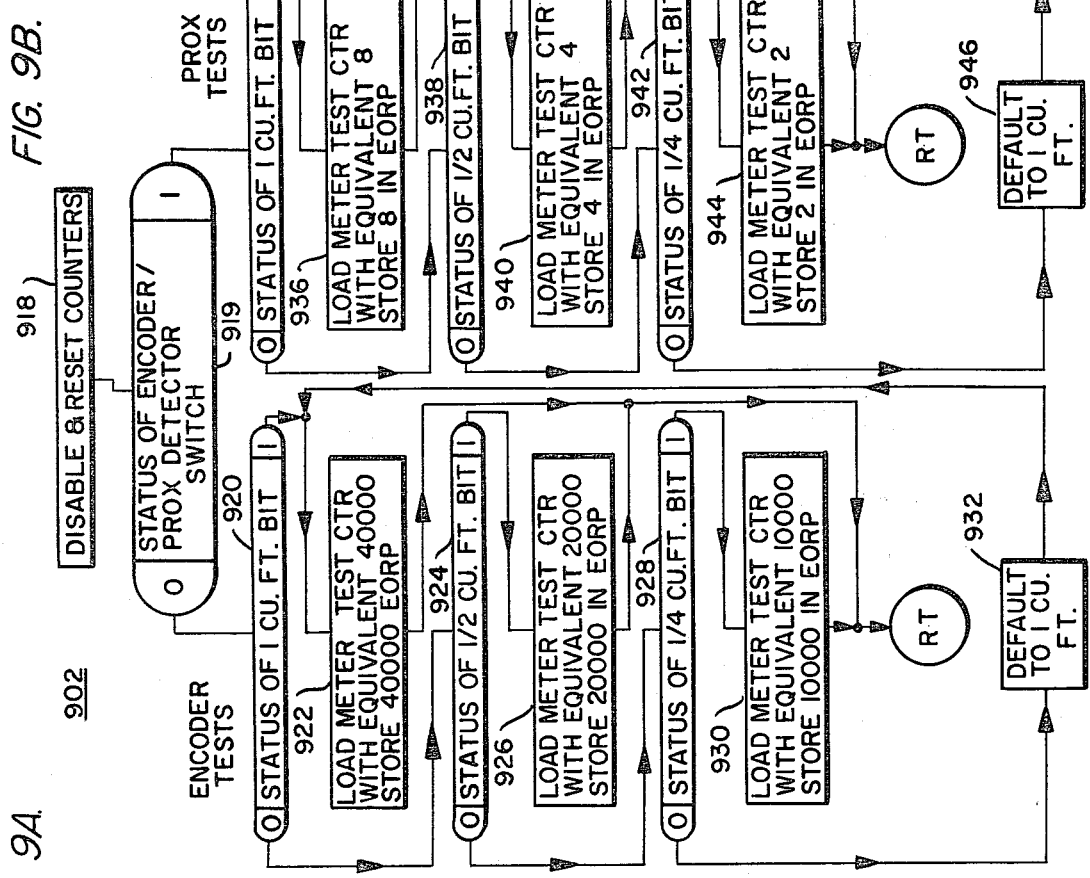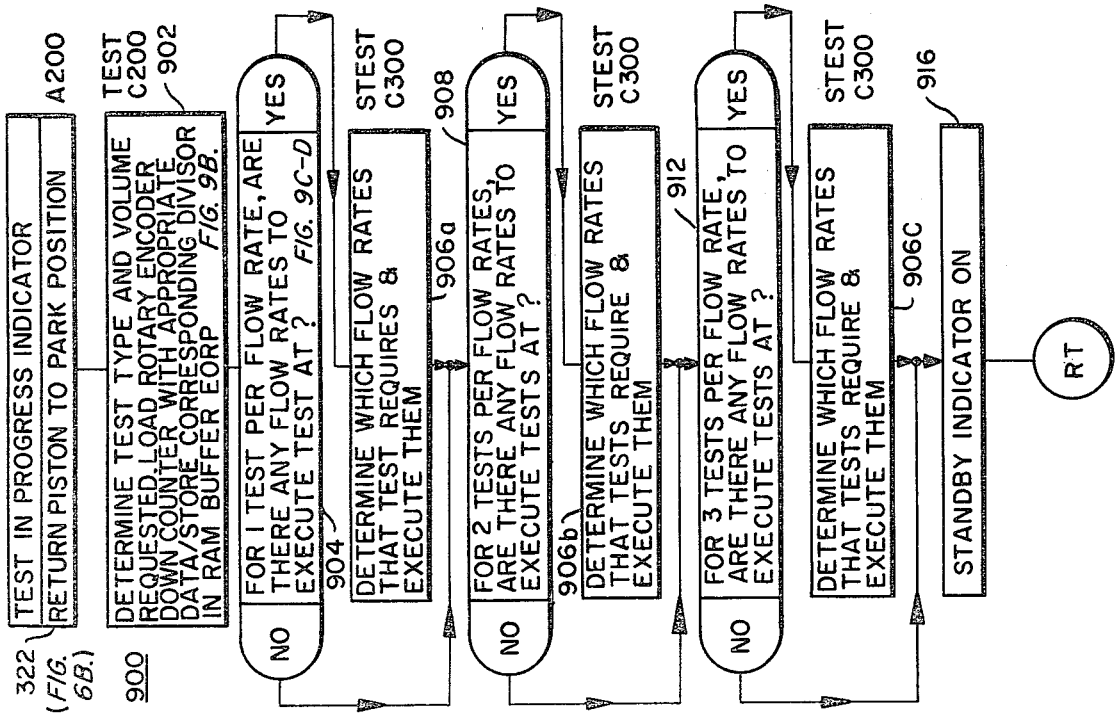

FIG. 9N.

CALCULATE AVERAGE TEMPERATURE AND PRESSURES — 1060 FIG. 9Q.
998

$$\left[\left(\frac{K^*(C)}{K(CAL. FACTOR)}\right)\left(\frac{PM}{PP}\right)\left(\frac{TP}{TM}\right) - 1\right][100] = \%$$

% = PERCENT ERROR
K* = METER VOLUME COUNTS
K = PROVER VOLUME COUNTS
PM = METER PRESSURE (AVG)
PP = PROVER PRESSURE (AVG)
TP = PROVER TEMPERATURE (AVG)
TM = METER TEMPERATURE (AVG)

$\frac{ATP}{AVCTR} + 459.67 = FTP$
FTP = AVERAGE PROVER TEMP °K — 1064

$\frac{ATM}{AVCTR} + 459.67 = FTM$ — 1066

$\frac{APM}{AVCTR} = FPM$
FPM = AVERAGE METER PRESSURE PSIA — 1068

$2\frac{APP}{AVCTR} = FPP$
FPP = AVERAGE METER PRESSURE PSIA — 1070

INITIALIZE PRINTER
OUTPUT PERCENT ERROR
± X.XX — 1072

1002

OUTPUT LF — 1074

OUTPUT FLOW RATE — 1076

OUTPUT 10 LF — 1078

(RT)

APPARATUS FOR ACCURATELY MEASURING THE VOLUME OF A METER PROVER

I. DESCRIPTION

Background of Prior Art

This invention, in its preferred form, relates to meter provers for testing the accuracy of fluid and in particular gas meters.

In the prior art, U.S. Pat. No. 185,319 of Harris is an early example of the use of a bell-type meter prover comprising a bell-shaped container or bell that is rectilinearly moved into and from a container or kettle filled with a liquid such as oil. Typically, a pulley arrangement is used whereby a pulley is located above the bell, with a cord suspended about the pulley having one end attached to the bell and the other end to a set of weights. A conduit is provided from the bell to the meter to be tested, whereby as the bell is drawn upward, a fluid, e.g., gas, is drawn through the meter and into the bell. A valve is placed within the conduit and when disposed to its closed position, prevents the flow of the fluid from the meter into the space defined by the bell and its kettle, thus inhibiting the motion of the bell and the weight suspended therefrom by the pulley. Upon opening of the valve, the fluid flows into the bell permitting the weights to exert its force upon the bell, thereby lifting the bell. When the weights are released, the cord and thus the bell are pulled upward, thus creating a vacuum within the bell, the oil providing a seal to prevent leakage of air otherwise into the bell.

In order to determine the amount of fluid that is drawn through the meter, the early practice sought to control the extent of movement of the bell, correlating this movement to a given quantity of fluid that would be drawn through the meter and comparing the known quantity of fluid drawn through the meter and into the meter prover, to the fluid as measured by the meter, typically indicated by the meter's dial positions. Current methods require physical measurements of the dimensions of the bell (bell strapping) which are inconvenient and are subject to a number of possible errors incurred by averaging the non-uniform geometrical diameters and the wall thicknesses of the bell and by interpolating the scale markings by eye. The quoted accuracy of such current methods is about 0.3% at best. Thus, it can be seen that such a bell-type meter prover, which was the calibrating standard for fluid meters, lacked inherently a high degree of accuracy due to the errors introduced by (1) the visual sightings of the beginning and final points of the bell movement, (2) the visual sightings of the initial and terminating volume indications by the meter dial, and (3) the inherent inaccuracy of determining the volume of the bell. The most significant cause of error in this technique was due to the difficulty of accurately measuring and determining the volume of the bell. The bell, itself, was formed with as great an accuracy as possible, but variations in its diameter, and therefore circumference, inherently occurred. The taking of many measurements of the circumference by bell strapping was the best method then devised to obtain the bell's average circumference and therefrom the volume of the cylindrical portion of the bell.

The use of the bell-type prover has persisted for many years with improvements being made thereto primarily in the nature of determining the movement of the bell and in determining the volume of fluid passed through the meter. One of the earliest examples of an automated prover system is found in U.S. Pat. No. 3,050,980 of Dufour et al., which discloses a bell having optical pick offs to sense the movement of its bell as it is directed upwardly by its motor. A conduit is directed from the bell to the meter having a first solenoid actuated valve for controlling the flow of fluid from the meter to the bell, as well as a second solenoid actuated valve coupled to the conduit for permitting discharge of the fluid from the bell as it returns to its downmost position. In operation, the bell, initially filled with air, is lowered into its tank tending to drive air through the meter. A dial hand on the meter register, known as the "prover hand" is detected by means of an optical pick-up to initiate the test, whereby the first valve is opened, while maintaining the second valve closed, to permit a flow of the fluid from the bell through the meter. An automatic airtight test is described wherein both the first inlet and second discharge valves are closed, and as pressure is built up, tests are made for leaks in the system and its valves by measuring the pressure established within the bell.

Further, U.S. Pat. No. 2,987,911 of McDonell suggests a prover system in which first and second temperature sensors are disposed at the outlets of the meter and of the prover, respectively, whereby the temperature differences is calculated to develop a temperature compensation factor Tc, which is used to make a correction in the calculated volume.

As suggested by U.S. Pat. No. 3,933,027 of Mehall, efforts were made to improve the bell-type prover system by automating its operation. The Mehall patent '027 suggests the placement of a series of sensing flags with respect to its bell, whereby an optical encoder senses the movement of these flags to provide indications of corresponding volumes of air as drawn by the bell's prover through the coupled meter. Further, a second optical encoder is coupled to the dial of the meter to provide an output as a train of pulses indicative of the volume flowing through the meter. At initiation of the meter test, a gate is activated by the first optical encoder to initiate a counting or timing procedure whereby a clock signal is applied to each of a bell clock counter and a meter clock counter. The gate passing the clock signals to the bell counter is disabled upon reaching a given count corresponding to a known quantity of fluid as drawn through the meter. When a similar quantity of fluid has been measured by the meter, as indicated by the second optical encoder, a signal therefrom is applied to a gate to terminate the application of clock signals to the meter clock counter. At termination, first and second counts have been accumulated within the bell clock and meter clock counters, whereby the ratio thereof may be readily calculated and displayed upon a suitable digital display. This ratio is understood to be the meter registration, i.e., the ratio of the actual or calibrated volume of fluid passed through the meter to that measured by the meter.

U.S. Pat. No. 3,937,048 of St. Clair et al provides similar teachings to the Mehall patent '027 disclosing a bell-type automatic meter prover wherein there is further included a device for sensing the series of pulses produced by the meter during a cycle of its operation. The volume actually passed through the meter is measured by an encoder which produces a train of pulses indicative of the linear movement of the bell and therefore the volume displaced into or out of the bell during a test. The encoder provides a train of pulses indicative of the volume displaced by the bell; the encoder pulses are accumulated for a given number of meter operation cycles, to calibrate the meter indication of volume with a known volume of fluid displaced by the bell.

U.S. Pat. No. 3,877,287 of Duntz, Jr. suggests a substantially different structure, wherein in place of the bell-type container, a cylinder is used to receive a piston driven through the cylinder at a controlled rate by a motor rotatively coupled by a lead screw to the piston for driving it through the cylinder as the motor rotates. As a result, the piston is driven at a constant velocity through the precision bore tube or cylinder to drive fluid from the cylinder and through the meter to be tested. The Duntz, Jr. patent '287 suggests two ways of measuring the fluid flow rate, the first involving placing a series of holes in a piston rod interconnecting the piston and the lead screw, and sensing the movement of the holes past a photodetector. A second method uses an optical encoder coupled to the drive motor to provide an output train of pulses indicative of piston displacement and therefore the actual fluid volume displaced from the cylinder.

U.S. Pat. No. 3,631,709 of Smith also discloses a meter prover comprising a piston and cylinder arrangement, wherein the piston is driven via a lead screw by a program controlled motor. Upon actuation, the motor drives via the lead screw the piston through the cylinder, whereby a known volume of fluid (water) is drawn through a series of meters disposed in series. The control program of the motor causes the piston to move at different rates of speed, whereby corresponding fluid flow rates are established through the meters for a single strobe of the piston through the cylinder. A magnet is coupled to a shaft interconnecting the lead screw and the piston to actuate a reed switch as the piston is drawn through the cylinder, to initiate the counting of pulses derived from a first or master pulser 54 coupled to the motor. The output of the master pulser is a train of pulses and is applied to a register to provide an indication of the actual flow through the meters. Optical encoders are also coupled to each of the meters to provide pulse signals to a second set of registers whereby the measured values of fluid flow measured by the meters may be accumulated and displayed. The standard or actual volume of flow is defined as a specific number of counts from the first or master pulser against which the output from the individual meters is compared. The program control of the motor permits the acceleration of the motor and its piston to a steady state condition before beginning measurement of the fluid flow through the meter in order to permit any transients in the fluid to settle.

As indicated above, the prior art has dealt with providing automation to the process of testing meters by automatically initiating and terminating the counting of pulses from a first encoder indicative of the standard volume of fluid drawn through the meter, as well as the counting of pulses from a second encoder indicative of the volume of fluid measured by the meter under test.

However, the prior art has not dealt with the problem of improving the basic accuracy of the meter prover, i.e., the basic meter calibrating device. At this point in the development of the art, meter provers, particularly those of the bell-type, are only able to achieve an accuracy of ±0.2% under optimum conditions. It is thus obvious that the fluid meters calibrated or tested with such provers may achieve no greater accuracy themselves. One of the primary reasons for the lack of ultimate precision in existing meter provers, is the lack of precise methods of and apparatus for measuring with high precision the volume displaced within either the bell or the cylinder as disclosed by the abovediscussed patents.

It is contemplated by this invention to provide a method and apparatus for measuring the volume of the test chamber of the meter prover with an accuracy to one part in $10^6$. Once the volume can be obtained with such accuracy, then it is necessary to insure, as taught by this invention, that the structure containing the chamber is rigid and nondeformable. In the past, the bell-type enclosures have not provided such a rigid structure so that if they were accidentally jarred, the interior volume may be changed to a degree to affect the accuracy of the bell-type meter prover's readings. As will be disclosed, this invention adopts a technique for measuring the displacement volume within the meter prover's chamber by generating electromagnetic waves and determining the frequency at which resonance is established at first and second positions of a piston to be driven through the housing. Adopting such a method of measuring the container's volume requires, as taught by this invention, the use of a housing having a substantially perfect right circular cylinder configuration so that the frequencies at which resonance is established, may be determined sharply to thereby determine the displacement volume within the rigid cylinder. Further, in the development of the invention to be described, it became evident that once the volume of the prover had been determined with great accuracy, then it was necessary to determine other parameters as would affect the indication of meter registration or of the volume of fluid as drawn through the meter under test, with similar accuracy. In this regard, the invention contemplates methods and apparatus for measuring with a high degree of accuracy the temperature an pressure of the fluid within the meter and within the meter prover such that a correction factor may be determined with a similar degree of accuracy to thereby correct for variations in these parameters that exist in the meter under test and the meter prover of this invention. Such a technique contrasts to the prior art, wherein a meter prover was put into an environmentally conditioned room with limited variations in the temperature and pressure of that room. However, when the precision with which the variables are to be measured approaches $10^6$ as has been achieved by this invention for the measurement of the displacement volume of the meter prover, then it becomes necessary to note that these parameters of pressure and temperature do vary within the meter prover and within the fluid flow meter during the course of its test such that to insure desired precision, that new methods and apparatus for measuring pressure and temperature must be provided. For example, if there is an error of 1° F. in the measurement of fluid temperature, there may result an error of 0.2% in the displacement volume indicated by the prover. It is contemplated that the meter prover system of this invention is capable of achieving an indication of the volume as drawn through the meter under test to a precision of 0.004%. With such accuracy, then investigations may be conducted to determine the effects of other factors upon the measurement of fluid flow. For example, the number of times that tests are performed upon a given meter will affect the measured meter registration. Further, it is contemplated that the variation in the rate of fluid flow as well as the volume of fluid flow through the meter will affect the indicated measured volume by the meter as well as its meter registration with respect to its standard volume as measured by a meter prover.

BRIEF SUMMARY OF THE INVENTION

In accordance with this invention, there is disclosed apparatus and method of measuring the volume of a meter prover including a chamber, illustratively taking the form of a substantially perfect right circular cylinder, and a piston adapted for rectilinear movement within said cylinder between a first position and a second position. The volume measuring apparatus comprises an antenna disposed within the chamber and a generator coupled to apply electromagnetic energy to the antenna whereby electromagnetic waves are emanated into the chamber. A detector is coupled to the antenna to detect electromagnetic energy reflected from the chamber and is in turn coupled to a resonant detector in the form of a cathode ray tube, wherein a minimum in the level of the electromagnetic energy may be determined. Further, a frequency detector in the form of a counter, is connected to the output of the generator to detect the frequencies of the generator output at which the minimum level occurs as observed upon a display device corresponding to the establishment of a resonant standing wave within the chamber of the meter prover. The frequency(ies) at which the resonant standing waves are established within the chamber, in turn determine the volume of the meter prover chamber. The electromagnetic field(s) are generated within the chamber of a mode selected so that at a resonant condition within the chamber, the electric and magnetic component fields of the electromagnetic field have a defined relation to the dimensions of the chamber of regular geometry, illustratively, a right circular cylinder.

BRIEF DESCRIPTION OF THE DRAWINGS

A detailed description of one preferred embodiment of this invention is hereafter described with specific reference being made to the drawings in which:

FIG. 1 is an elevational view of a meter prover system in accordance with the teachings of this invention;

FIG. 3 is a functional block diagram of the architecture of the computer system used to sense the several variables of the meter prover system and to control the movement of the piston through the cylinder of the prover as shown in FIGS. 1 and 2A, as well as to provide an accurate indication of the meter registration of the tested meter.

FIGS. 4A to 4E show the various signal conditioning and interface circuits as are needed to provide signals into and from the computer system as shown in FIG. 3;

FIGS. 4G through M show detailed schematic diagrams of the signal conditioning and interface circuits generally shown in FIGS. 4A and E;

FIGS. 6A and 6B show in a more detailed diagram, the initialization process effected by the computer system of FIG. 3;

FIG. 7 shows in a more detailed fashion the steps necessary to calibrate the inputs as applied to the signal conditioning and interface circuits for applying the measurements of temperature and pressure to the computer system as shown in FIG. 3;

DETAILED DESCRIPTION OF INVENTION

Figure 2A:
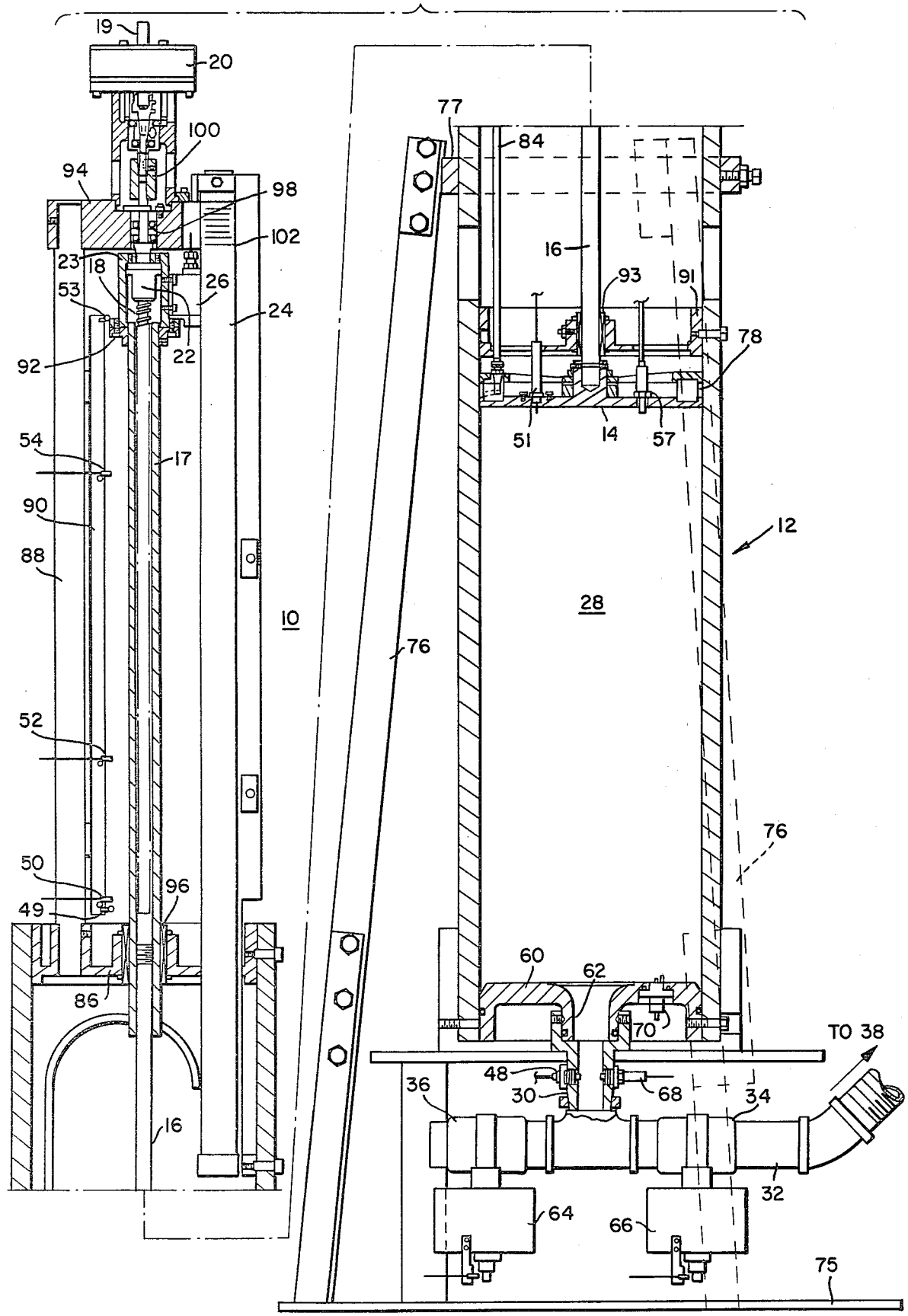
FIGS. 2A and B are detailed, partially sectioned views of the meter prover of this invention as more generally shown in FIG. 1.

Referring now to the drawings, and in particular to FIGS. 1 and 2A, there is shown the meter prover system 10 of this invention as coupled to a meter 38 to be tested. The meter prover system 10 includes a cylinder 12 through which a piston 14 is driven in rectilinear fashion, by a programmable, variable speed motor 20 such as a servomotor.

The cylinder 12 is supported in upright position by a series of struts 76 (only two of which are shown) secured to a collar 77 which in turn is secured around the exterior of cylinder 12. The upper end of cylinder 12 is closed by a head 86 from which a series of struts 88 (only one of which is shown) extend upwardly. A support plate 94 is fixed to the upper end of struts 88 and servomotor 20 is mounted on the top of plate 94. The upper end of a lead screw 18 is journalled for rotation in plate 94 by means of bearing 98 and is drive connected to the drive shaft of the servomotor 20 by means of a coupling 100. A lead nut 22 fixed within a housing 23 is threadedly received on lead screw 18. The lead screw 18 is telescoped within sleeve 17, the upper end of which is secured to the housing 23. The lower end of sleeve 17 projects through and is slidingly received in bushing 96 in head 86. The upper end of piston shaft 16 is secured to the lower end of sleeve 17.

An intermediate cylinder head 91 separates the upper portion of the interior of cylinder 12 from the lower portion in which the piston 14 is contained. Piston shaft 16 projects through and is slidably received in bushing 93 in head 91, the lower end of shaft 16 being connected to the piston 14.

Thus, as the servomotor 20 rotates, the lead screw 18 rotates in nut 22 causing the housing 23, sleeve 17, and shaft 16 to move vertically in either direction depending on the direction of servomotor rotation.

The bottom of cylinder 12 is closed by a head 60 and the cylinder 12 therefore encloses and defines between the piston 14 and head 60 a variable volume chamber 28. An opening 62 in head 60 places chamber 28 in communication with conduit 30, conduit 32, and meter 38. A first inlet valve 34 is disposed between the cylinder 12 and the meter 38 to control the flow of fluid, e.g., a gas, therebetween. A second, exit valve 36 is connected to the conduit 30 in order to permit the exit of fluid from the cylinder 12 when the valve 36 has been opened.

The precise position of the piston drive shaft 16 and therefore the piston 14 is provided by a high precision, linear optical encoder 26 that is coupled to the drive shaft 16 to move therewith. More specifically, the encoder 26 illustratively includes first and second sets of light sources and photodetectors disposed on either side of a linear scale 24 having a high number of scale marks 102. In one illustrative embodiment of this invention, the linear scale 24 is disposed in a fixed position with respect to movable encoder 26 and includes 40,000 scale marks 102 (2500 marks per inch); of course, only a limited number of such a high number of scale marks could be illustrated in the drawings. Thus, as the encoder 26 is moved rectilinearly along the length of the linear scale 24, first and second sets of pulse trains A and $\overline{A}$ are developed, 90° out of phase with respect to each other, as the light beams generated by the first and second light sources are intercepted by the scale marks 102. The outputs A and $\overline{A}$ from the optical encoder 26 indicate precisely the position of the piston 14 and likewise the volume of fluid has been drawn through the meter 38. As will be explained, the volume of the chamber 28 within the cylinder 12 is precisely measured, and each output pulse derived from the encoder 26 provides a precise indication of an incremental volume as drawn into the chamber 28 within the cylinder 12 as the piston 14 is withdrawn, i.e., is directed upward by the servomotor 20. Before the piston 14 is begun to be raised, thus creating a vacuum within the chamber 28 the exit valve 36 is closed and the meter valve 34 is opened to permit a flow of fluid through the meter 38 via the conduit 32, the open valve 34 and a pair of conduits 30 and 32 into the housing 28. During a meter test, the meter 38 provides via its encoder 40 an output train of pulses indicative of the flow of fluid therethrough. The train of pulses as derived from the meter encoder 40, is compared to the train of pulses derived from the linear encoder 26 to provide an indication of the meter accuracy in terms of the meter registration, a ratio corresponding to the volume measured by the meter encoder 40 to the volume measured by the linear encoder 26.

Further, the programmed movement of the piston 14 uses a plurality of proximity sensors 50, 52, and 54, as well as a pair of limit switches 49 and 53. As will be explained, the servomotor 20 drives the piston 14 rectilinearly within the housing 28. As shown in FIGS. 1 and 2A, the piston 14 is in its uppermost position wherein an abutment 92 on housing 23 26, contacts and closes the upper limit switch 53 thereby deactuating the servomotor 20 when the piston 14 is driven upward and thereby halting the movement of the piston 14. When the servomotor 20 drives the piston in a downward direction as shown in FIG. 1, the abutment 92 may then engage the lower limit switch 49 again bringing the piston to a halt. The upper failsafe switch 53 and the lower failsafe switch 49 are used to prevent physical damage to the meter prover 10 if for reason of failure, the servomotor 20 should continue to drive the piston 14 to either extremity. If the abutment 92 should engage either of the failsafe switches 49 or 53, the servomotor 20 will be deenergized and the piston brought to an abrupt halt. Also in a volume self-test mode of operation, as will be explained, the proximity detectors 52 and 54 are used to detect the movement of the piston 14 between designated locations. In general, the servomotor 20 accelerates the piston 14 to a given speed and the output of the linear encoder 26 is gated by the output of the proximity detector 52 to permit its pulses to be accumulated and counted. The counting of the pulses derived from the linear encoder 26 is gated off, in the volume self-test mode, by the occurrence of an output from the proximity detector 54 indicating the passage of the abutment 92 there past. Thereafter, the servomotor 20 is decelerated to a stop. By contrast, in the meter test mode, the piston 14 is driven upward by the servomotor 20 and when the abutment 92 passes the proximity detector 52, an enable signal is generated thereby whereby on the occurrence of the next or leading edge of the next output pulse from the meter encoder 40, the counting of the output pulses of the linear encoder may then begin. In the meter test mode, the counting of the linear encoder pulses is terminated when the counting of the meter encoder pulses has reached a predetermined count corresponding to a volume of fluid drawn through the meter.

In order to facilitate an understanding of this invention, a brief summary of its operation will now be given, while a more detailed discussion of the operation of the meter prover 10 will be provided below. A first or initialization mode determines whether the piston 14 is in its park position as by determining whether the proximity detector 50 detects the presence of the abutment 92 as explained above; if not the servomotor 20 is energized to drive the piston 14 to its park position. If the abutment 92 is in a position to be detected or before the piston 14 is returned to its park position, the second or exit valve 36 is opened to permit the exit of fluid driven from the chamber 28 through the conduit 30, and then the inlet meter valve 34 is closed to prevent the fluid from being driven therethrough and possibly injuring the meter 38. Upon command of the operator that a meter 38 is to be tested, first meter valve 34 is opened and then the second valve 36 is closed to permit the flow of fluid through the meter 38, the conduit 32, the open valve 34 and the conduit 30 into the chamber 28, as the piston 14 is being driven in an upward direction by the servomotor 20. The piston 14 is gradually accelerated to a given steady state volocity and is maintained at that selected velocity during the course of the fluid volume test measurement, while the output pulses of the encoders 26 and 40 are accumulated by an arithmetic unit including registers to accumulate counts indicative of a precise volume as measured by the linear encoder 26 and of the volume as measured by the meter 38, respectively. The meter test is initiated by the passage of the piston 14 past the start-test proximity detector 52 that enables upon the occurrence of the next output pulse or more precisely its leading edge from the meter encoder 40, the counting or accumulation of the meter encoder pulses as well as the linear encoder pulses. Dependent upon the desired volume to be drawn through the meter 38 under test, the meter test will terminate upon the counting of a number of meter encoder pulses. In particular, the register for accumulating the meter encoder pulses 38 upon counting the predetermined number dependent upon the fluid volume, provides an output applied to the linear encoder system terminating its counting of the input pulses derived from the meter encoder 40. The stored counts indicative of the fluid volume as measured by the meter encoder 40 and the linear encoder 26 are compared, i.e., a ratio therebetween is obtained to provide an indication of the meter registration.

In addition, measurements of temperature and pressure are taken in order that the measured volumes may be adjusted for these conditions. In particular a pair of temperature measuring devices 42 and 44 are respectively disposed at the entrance and exit ports of the meter 38. A differential pressure transducer 46 is disposed to measure the difference between the pressure established by the fluid in the conduit 32 and ambient pressure. In addition, temperature measuring devices 48 and 57 are disposed respectively at the conduit 30 coupled to the chamber 28 and upon the piston 14 to provide indications of the temperature of the fluid within the chamber 28. In addition, a second differential pressure transducer 51 is disposed within the piston 14 to provide an indication of the differential pressure between the ambient pressure and that established within the chamber 28. The temperature outputs TM3 and TM4 derived from the temperature measuring devices 42 and 44, respectively, are averaged to provide an average meter temperature AMT, whereas the outputs TP1 and TP2 of the temperature measuring devices 57 and 48, respectively, are averaged to provide an indication of the average prover temperature APT. As will be explained in greater detail later, these input parameters are used to provide an adjustment of the measured volumes as derived from encoders 26 and 40 dependent upon the measured conditions of pressure and temperature.

As shown in FIG. 2A, a microwave antenna 70 is disposed in the head 60 to generate microwaves within the chamber 28, whereby its volume may be accurately determined. It is contemplated that this measurement may be made periodically to detect even the minutest changes in the volume of the chamber 28. As will be explained, the techniques of establishing electromagnetic waves in the microwave range permits an accuracy to at least one part in $10^6$ of the volume of the chamber 28. In addition, in order to test the accuracy of the temperature sensors 48 and 57, a high precision temperature measuring device 68 is also inserted within the conduit 30. The temperature transducers 48 and 57 may illustratively take the form of a RTD Model No. 601222 temperature transducer as manufactured by Senso-Metrics, Incorporated, whereas the high precision temperature transducer 68 may be of the type as manufactured by Hewlett Packard under their Model No. 18115A; this transducer 68 must be used with a Hewlett Packard 2804A quartz thermometer. The proximity switches 50, 52, and 54 may illustratively take the form of a proximity switch as manufactured by Microswitch under their designation FMSA5, whereas the limit switches 49 and 53 may be of a type as manufactured by Microswitch under their designations BA-2R-A2 and ADA3721R. The servomotor 20 may illustratively take the form of that manufactured by Control Systems Research, Inc. under their designation NC100DC Servo Motor/Tachometer. The optical encoder 26 and scale 24 may take the form of a Pos-Econ 5 linear encoder as manufactured by Heindenhain Corporation. As will be explained later in detail, the measurements of pressure and temperature within the meter 38 and within the prover 10 are used to calculate a factor by which the volume as drawn into the prover 10 is adjusted for these variables. In particular, the temperature transducers 48 and 57 measure the temperature at the bottom and topmost portions of the chamber 28 to obtain a spatially averaged measurement of the temperature across the entire volume within the chamber 28 of the prover 10. In similar fashion, the temperature transducers 42 and 44 provide indications of the temperatures of the gas at the inlet and outlet of the meter 38 whereby a spatial averaging of the temperature of the gas flowing through the meter 38 may be obtained. The temperature transducers as selectively incorporated into the meter prover 10 are highly stable, low-thermal-mass platinum resistance thermometers and provide accurate readings of these variables whereby the volume as drawn into the meter prover 10 may be accurately determined.

As shown in FIGS. 2A and B, the proximity devices 50, 52, and 54, as well as the limit switches 49 and 53 are supported upon the upright member 90, which is in turn supported from one of the upstanding struts 88. One end of the linear scale 24 is supported from the member 94 and extends downward substantially parallel to the direction of the movement of the piston 14, having its lower end supported upon an upper portion of the interior of the cylinder 12. Only a limited number of the some 40,000 markings 102 are shown in FIG. 2A. In the lowermost portion of FIG. 2A, the inlet valve 34 and the exit valve 36 are actuated, respectively, from open to closed positions by pneumatic actuators 66 and 64, respectively.

In FIG. 2A, there is shown a sealing means indicated generally at 78 for the piston 14 to prevent the fluid as drawn through the meter 38 and into chamber 28 from leaking about the edges of the piston 14 as it is moved rectilinearly within the cylinder 12. The details of this piston seal 78 are disclosed in the U.S. patent application entitled "Piston Seal", filed concurrently herewith and assigned to the assignee hereof.

Figure 2B:
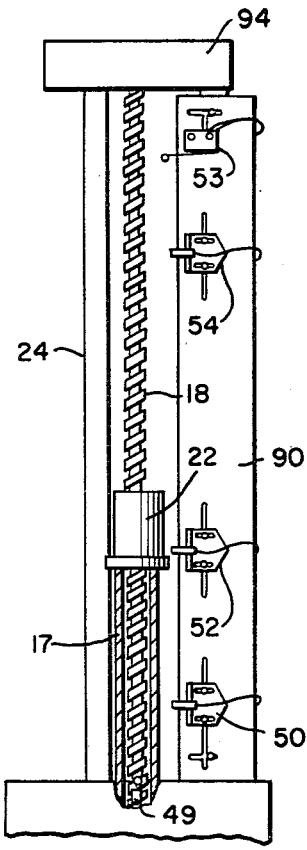
FIG. 2C shows the structure for housing the meter prover as shown in FIGS. 1 and 2A and a control console whereby the operator may control and observe the data output from the meter prover.
FIG. 2D shows the display panel of the system control and status module as shown in FIG. 2C.
Figure 2C:
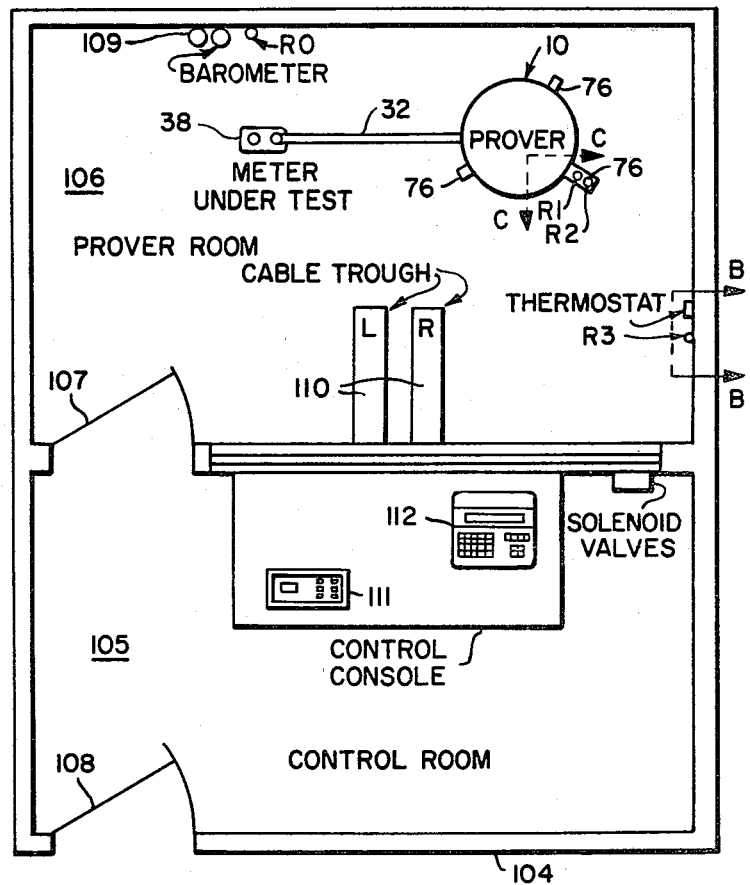

Referring now to FIG. 2C, the meter prover 10 is shown as being disposed within a controlled environment formed by an enclosure 104 comprising a prover room 106 for receiving the meter prover 10 and a control room 105, wherein the control's console is disposed and includes a display unit 111 containing a printer and a series of lights for indicating the various states of the meter prover, a CRT terminal 112 including a keyboard whereby various commands may be input by the operator, and a variety of heat generating equipment including power supplies, motor control, amplifiers, etc. The control of the ambient conditions about the meter prover 10 is insured by disposing the meter prover 10 within the prover room 106 remote from the heat generating display unit 111 and terminal 112. As shown in FIG. 2C, the meter 38 to be tested is also disposed within the prover room 106 and is coupled to the meter prover 10 by the conduit 32. The temperature in the prover room 106 is measured by the four temperature sensitive devices R0, R1, R2, and R3 disposed about the prover room 106 and upon a strut 76 of the prover 10. A barometric pressure transducer 109 and a barometer are also disposed within the prover room 106 to measure the ambient pressure. Electrical connections are made to the various temperature measuring devices as shown in FIG. 2C, as well as those temperature and pressure measuring devices as shown in FIGS. 1 and 2A and are directed through a pair of troughs 110 to the control console disposed within the control room 105. In this manner, the ambient conditions under which the meter 38 to be tested and the meter prover 10 operate can be accurately controlled to insure the integrity of the measurements being made upon the meter 38 and the meter prover 10.

Referring now to FIG. 3, there is shown a functional block diagram of the computer architecture of the computer system implementing the various functions including processing of the temperature and pressure measurements, of the linear encoder and meter encoder output signals, and to appropriately close the valves 34 and 36. In addition, outputs are provided to the CRT terminal 112 to indicate the measured parameters as well as to the system control and the display unit 111 to display the various states of operation of the meter prover system 10, while permitting operator input through the keyboard of the CRT terminal 112, of selected meter test functions. The computer system includes a central processing unit (CPU) 120 of the type manufactured by the assignee of this invention under their designation PPS-8 Microcomputer, from which address signals are applied from CPU 120 via an address bus 128 to a programmable read only memory (PROM) 124 and to a random access memory (RAM) 126. The RAM 126 may take the form of the 256×8 RAM as manufactured by the assignee of this invention, whereas the PROM 124 may take the form of that PROM manufactured by Intel Corporation under their designation 2708. A system clock 122 provides system clock signals (e.g., 200 KHz) to the CPU 120 and may illustratively take the form of the clock generator circuit P/N 10706 as manufactured by the assignee of this invention. As shown in FIG. 3, each of the clock 122, the CPU 120, the PROM 124, and the RAM 126 are interconnected by an instruction-data (I/D) bus 140, which may illustratively take the form of a 14-line bus not only interconnecting the forementioned elements but also connected to each of the signal conditioning and interface circuits 130, 132, 134, 136, and 138.

The circuit 130 conditions and interface the signals indicative of the prover temperature signals TP1 and TP2 as derived respectively from the temperature measuring devices 57 and 48. Further, the meter temperature signals TM3 and TM4 as derived from the devices 42 and 44 are also applied to the circuit 130. As shown in FIG. 2C, four additional room temperature measuring devices R0, R1, R2, and R3 are provided about the prover room 106 in which the meter prover system 10 as shown in FIGS. 1 and 2A is disposed; in this regard it is understood that the ambient conditions about the meter prover system 10 are well regulated in order to maintain stable as possible the ambient temperature of the meter prover system 10. It is normal practice to store the meters 38 to be tested in this environment for a time to permit them to reach the same ambient conditions at which the meter prover system 10 is disposed. As shown in FIG. 3, the temperature signals are applied to a signal conditioner and logic circuit 150 and from there via an interface circuit 151 to the I/D bus 140.

In similar fashion, the pressure signals are applied to the conditioning and interface circuit 132, which comprise a signal conditioner and logic circuit 162 and an interface circuit 164. In particular the outputs of the differential pressure measuring device 51 indicating the differential pressure PP1 of the prover 10 and of the differential pressure measuring device 46 indicating the meter pressure MP2, and the barometric pressure measuring device 109 indicating the ambient or atmospheric pressure PB of the prover room 106 are applied to the circuit 132.

The output of the meter encoder 40 and the linear optical encoder 26 are applied to the signal conditioning and interface circuit 134. In particular, the output of the meter encoder 40 is applied to a signal conditioning and logic circuit 170a, whose outputs are applied in turn to interface circuits 171 and 173. A clock circuit 175 applies a signal to the interface circuit 173. In an alternative embodiment of this invention, a proximity detector 27 is used for detecting the rotation of the meter encoder 40 and the output of the proximity detector 27 is applied to the signal conditioner and logic circuit 170a. This is illustrated in FIG. 3 by the input signals designated as rotary encoder pulses and meter test proximity detector; it is understood that only one of these inputs is made at a time to the circuit 170a. The output of the linear optical encoder 26 is applied via the signal conditioning and logic circuit 170b and interface 179 to the I/D bus 140.

In order to provide an indication of the measured parameters, such as temperature, pressure, as well as the fluid volumes drawn by the prover 10 and as measured by the meter 38, outputs are applied from the I/D bus 140 via the circuit 136 to the display unit 111 which includes a hard copy data printer as manufactured by Practical Automation, Inc. under their designation No. DMTP-3. In particular, the circuit 136 includes an interface circuit 192a for applying parameter output signals via a signal conditioner and logic circuit 190a to the hard copy printer. Further, the circuit 136 includes an interface circuit 192b providing the parameter output signals via a signal conditioner and logic circuit 190b to the CRT data terminal 112. In addition, operator input command signals as input on the terminal's keyboard are transferred via logic circuit 190b and the interface circuit 192b to the I/D bus 140. A clock circuit 193 controls the baud rate at which signals may be transferred between the CRT data terminal 112 and the computer system. The CRT data terminal 112 may illustratively take the form of a CRT display as manufactured by Hazeltine Corporation under their designation 1500. Such a terminal permits input commands via the alphanumeric keys upon its keyboard, as well as to display the commands being entered, and the operator accessed parametric data.

Finally, there is shown a signal conditioning and interface circuit 138 for interconnecting the I/D bus 140 and the inlet valve 34 and the exhaust valve 36, as well as to apply the control signals to the servomotor 20. In addition, the servomotor 20 is associated with a motor control such as the DC Servocontroller as manufactured by Control Systems Research, Inc. under their designation NC101 whereby feedback signals indicative of the speed of the servomotor 20 are applied via the logic circuit 194 to in turn affect the servomotor 20 control. In addition, signals indicating the status of the servomotor 20 as well as an input signal from a test mode switch to indicate whether the rotary encoder 40 or proximity detector 27 are to be used to measure meter flow, is entered via the logic circuit 198 and the interface circuit 200 to the I/D bus 140.

Figure 4A:
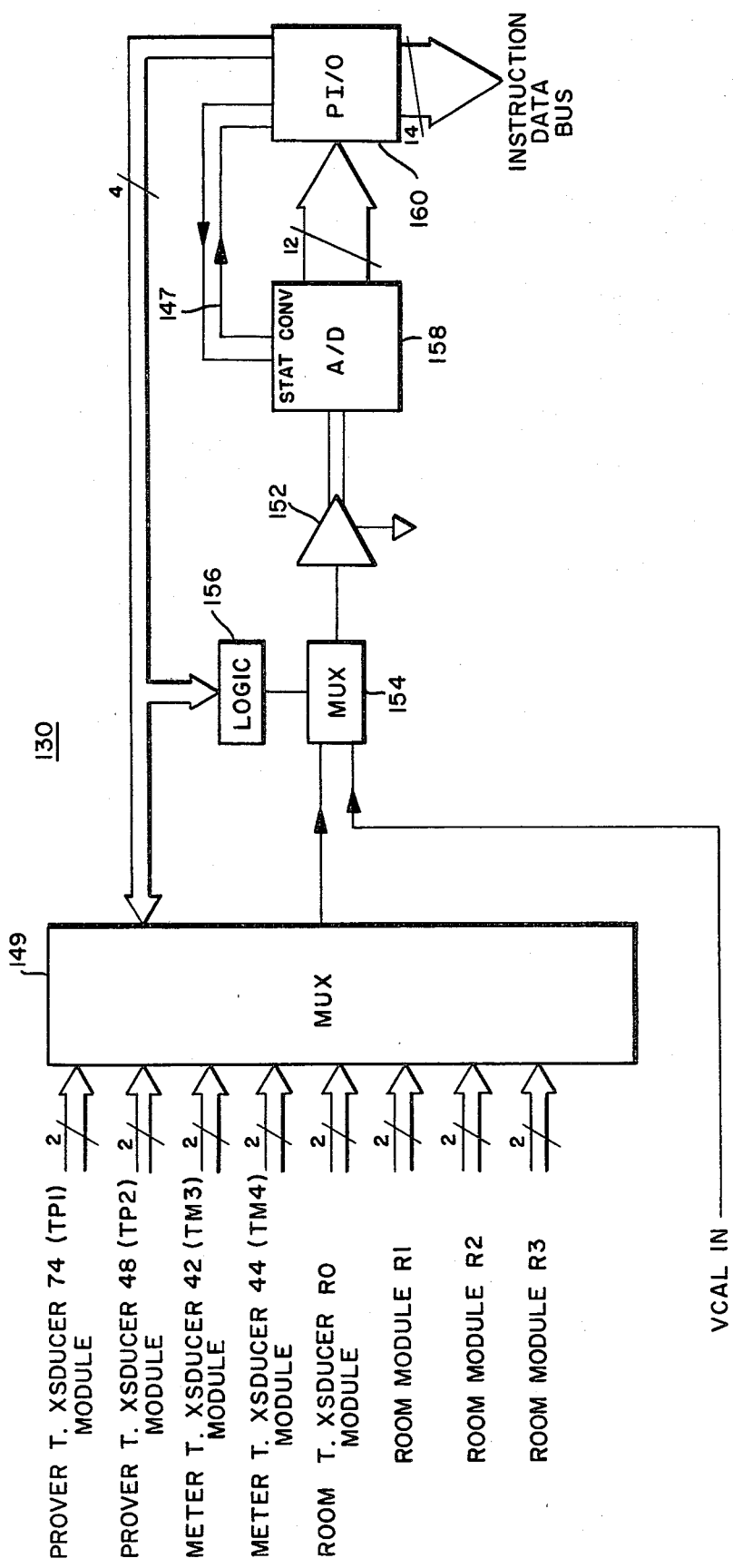

The signal conditioning and interface circuit 130 is shown in more detail in FIG. 4A, as including two line inputs derived from each of the temperature transducers 57, 48, 42, and 44 indicative respectively of the prover temperatures TP1 and TP2, and the meter temperatures TM3 and TM4, and is connected to a multiplexer 149. In addition, the four temperature transducers R0, R1, R2, and R3 disposed about the prover room 106 in which the meter prover system 10 is housed, are applied through the next four inputs to the multiplexer 149. The aforementioned temperature transducers are connected into amplifier modules that serve to develop voltage outputs proportional to the temperature sensed and to apply these outputs to the corresponding inputs of the multiplexer 149. In this manner, each temperature transducer is associated with its own amplifier module so that its output to the multiplexer 149 may be adjusted to insure a substantially uniform output in terms of voltage amplitude and off-set for each of the temperature transducers connected to the multiplexer 149. The details of the amplifier modules for each of the transducers shown in FIG. 4A will be explained below with respect to FIG. 4I along with a detailed description of the signal conditioning and logic circuit 150 as generally shown in FIG. 4A. The multiplexer 149 serves to time multiplex the inputs at each of its eight inputs and to scale the temperature signal outputs to be applied one at a time via a multiplexer 154 to an amplifier 152 taking the illustrative form of that amplifier as manufactured by Analog Devices under their designation AD522. The second multiplexer 154 is normally set to apply one of the eight temperature input signals via the operational amplifier 152 to the analog digital (A/D) converter circuit 158, which may illustratively take the form of the A/D converter as manufactured by Burr Brown under their designation ADC 80. In a calibrate mode, the multiplexer 154 is actuated to apply a precision, calibrating voltage to the A/D converter 158. As is well known in the art, the DC voltage of the analog signals is adjusted to a level which may be readily accepted by the A/D converter 158, which in turn converts these analog signals to digital outputs which are applied via its 12 output lines to a parallel input-output (PI/O) device 160 which may illustratively take the form of that device manufactured by the assignee of this invention under their designation P/N 11696. The PI/O circuit 160 permits input commands to be transferred via the I/D bus 140 to the multiplexer 149 to control which of the inputs is to be sampled at a particular time, as well as to the logic circuit 156 to enable the multiplexer 154 to apply one of the outputs of the multiplexer 149 or the voltage calibration input signal to the A/D converter circuit 158. In operation, the CPU 120 places a call signal via the I/D bus 140 to the PI/O circuit 160 which responds thereto by enabling a call for information to be read out and converted to digital data to be applied to the I/D bus 140. In addition, a command is derived from the PI/O circuit 160 to time the conversion of the analog signals to digital signals by the A/D converter circuit 158, and a signal indicative of the status of the A/D converter circuit is applied via the PI/O circuit 160 to the I/D bus 140. The voltage calibration signal permits the zero and span of the operational amplifier 152 to be adjusted so that the full amplitude of each input signal may appear at the A/D converter circuit 158.

Figure 4B:
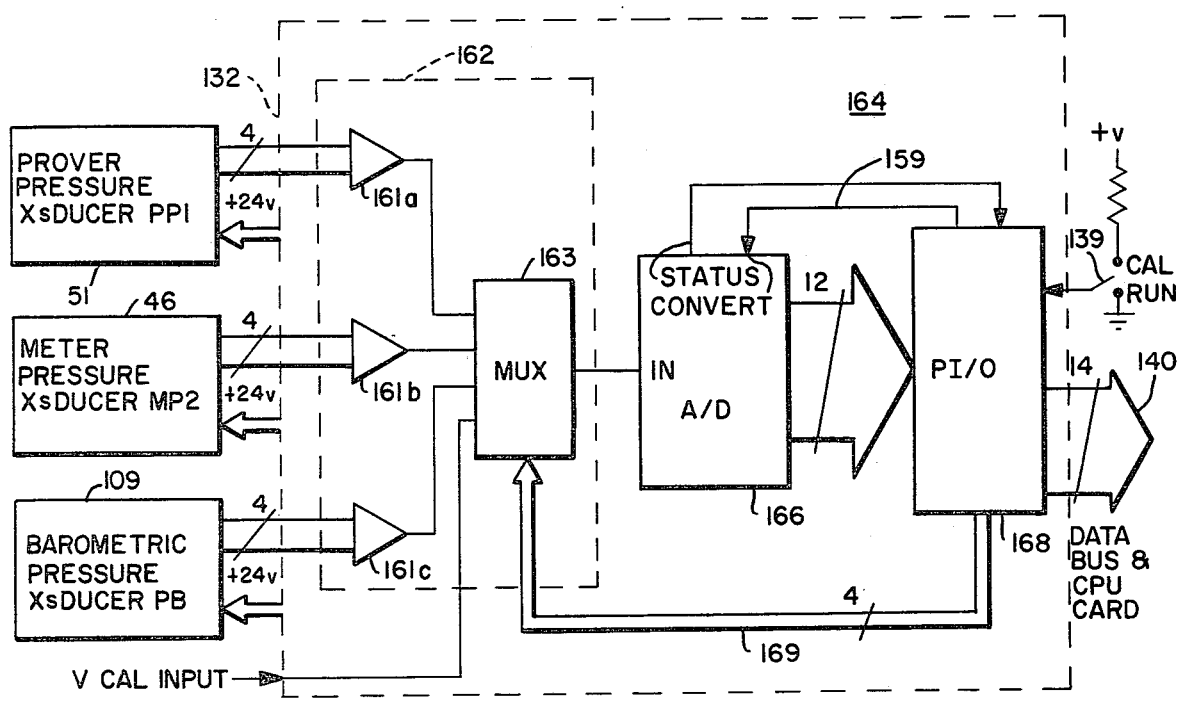

The conditioning and interface circuit 132 is more fully shown with respect to FIG. 4B wherein there is shown that the outputs of the transducer 51 and 46 indicating respectively the prover or piston pressure PP1 and the meter pressure MP2 are applied via operational amplifiers 161a and 161b to a multiplexer 163. In addition, the output from the pressure transducer 109 for measuring the barometric or ambient pressure of the prover room 106 is applied via operational amplifier 161c to the multiplexer 163. Initially, the CPU 120 transmits a command to the multiplexer 163 to select which of the outputs of the pressure transducers 51, 46 or 109 is to be read out via the I/D bus 140 and the parallel input-output (PI/O) circuit 168. In response thereto, the PI/O circuit 168 applies control signals via the four-line bus 169 to the multiplexer 163, to select one of the three pressure indicating signals or a signal indicative of the voltage calibration input signal to be applied to an A/D converter 166, which converts the input analog signal to a corresponding digital signal to be applied to the PI/O circuit 168 to be in turn transmitted via the I/D bus 140. Next, upon command of the CPU 120, the PI/O circuit 168 commands via line 159 the A/D circuit 166 to convert the selected analog pressure output signal to a corresponding digital signal to be transmitted via the I/D bus 140. The conversion of the input analog data to digital data requires a discrete time period for the A to D conversion to take place and in addition, for the digital data appearing upon the 12 output data lines of the A/D circuit 166 to stabilize before they are read by the PI/O circuit 168. When signal stabilization has occurred on the 12 data lines output from the A/D circuit 166, a status signal is generated by the A/D circuit 166. In response to the status signal, the PI/O circuit 168 reads the data appearing on the output lines of the A/D circuit 166 and applies these signals via the I/D bus 140 to the RAM 126 as shown in FIG. 3. After this process is completed, the system is able to select another pressure output as derived from another transducer, converting same to a digital signal to be transmitted to the RAM 126 as explained above.

Figure 4C:
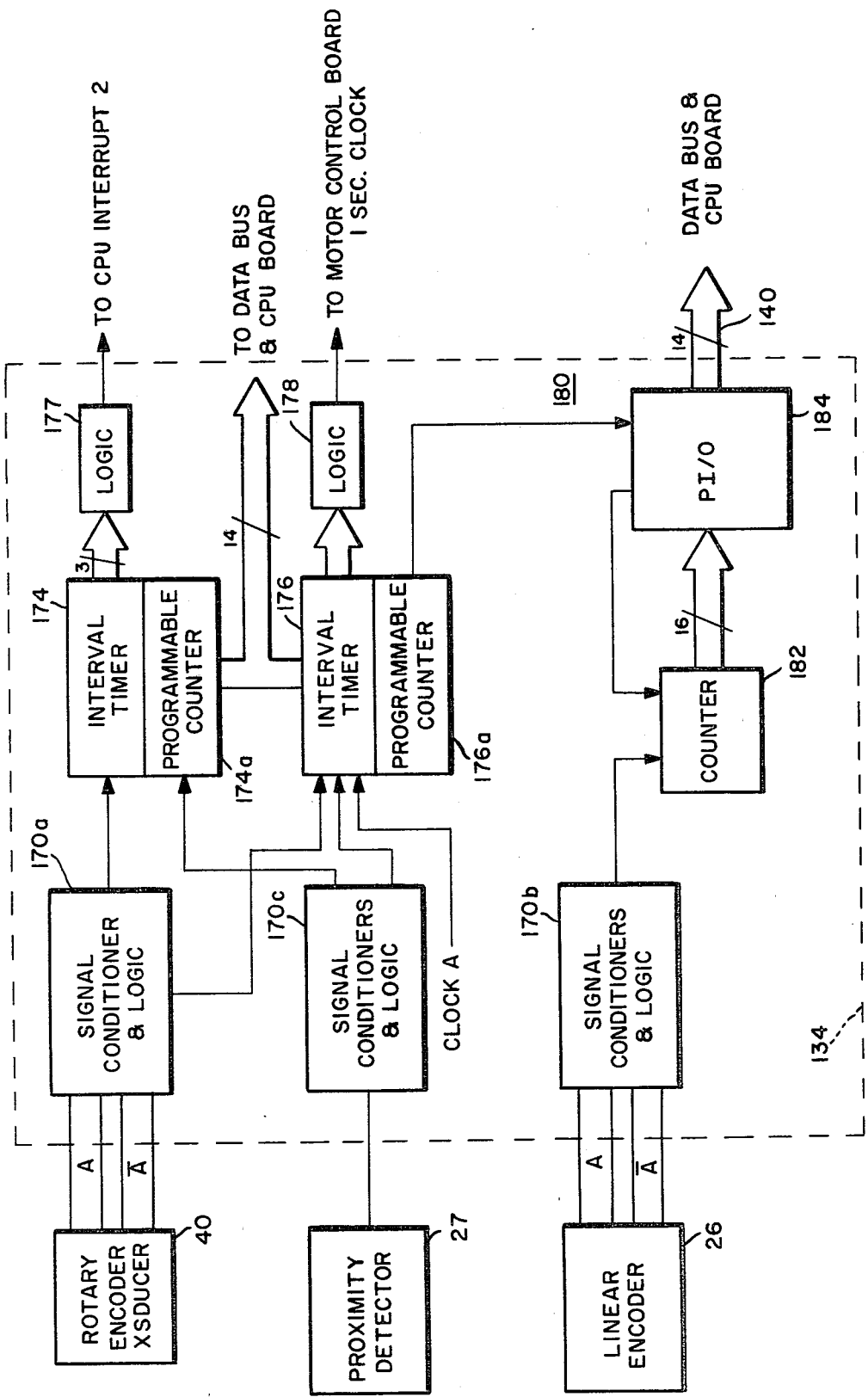

The interface and conditioning circuit 134 is more fully explained with respect to FIG. 4C. The rotary meter encoder 40 is coupled to the meter 38 to provide first and second signals A and $\overline{A}$, 90° out of phase with each other, to the signal conditioning and logic circuit 170a. In particular, the circuit 170a processes the input signals A to $\overline{A}$ to eliminate possible problems due to jitter of the signals as may be imposed by mechanical vibration upon the rotary meter encoder 40. The signal conditioner and logic circuit 170a generates a composite pulse signal corresponding to each set of input pulses of the signals A and $\overline{A}$, and applies same to an interval timer 174 including a programmable counter 174a into which is loaded a factor dependent upon the selected volume of fluid to be drawn through the meter 38, in a manner that will be explained. In particular that factor is placed in the programmable counter 174a and upon counting down to zero from that factor, a pulse is generated by the interval timer 174 and applied to a logic circuit 177 whose output is applied to initiate a CPU Interrupt 2 subroutine, whereby the testing of the meter 38 is terminated, as will be explained later in detail with respect to FIG. 9J. The logic circuit 170a is responsive to the input signal A from the rotary meter encoder 40 to apply a corresponding, conditioned pulse to an interval timer 176, which performs the operation of recognizing the leading edge of the signal A to initiate timing or counting of the programmable counter 174a as well as of the counter 176a and of the linear encoder counter 182. More specifically, the CPU 120 controls the meter prover 10 and senses that the piston 14 has been accelerated from its park position to its start-test position, as indicated by the presence of an output signal from the proximity detector 52. Upon the sensing of the output of proximity detector 52, the program as executed by the CPU 120 periodically, e.g., approximately every 40 microseconds, accesses the interval timer 176 to see whether it has received an input signal from the signal conditioner and logic circuit 170a indicative of the leading edge of the input signal A of the rotary encoder transducer 40. Upon the detection of the first leading edge of the output of the logic circuit 170a, after the piston 14 has passed the proximity detector 52, an initiate signal is applied to the PI/O circuit 184, which applies an initiate count signal to the counter 182 and also an initiate signal via the I/D bus 140 to the programmable counter 174a. In this manner, each of the counters 174a, 176a, and 182 are activated to start counting at the same time. In this illustrative example, the programmable counter 174a counts down in response to output signals of the rotary encoder transducer 40.

Figure 4F:
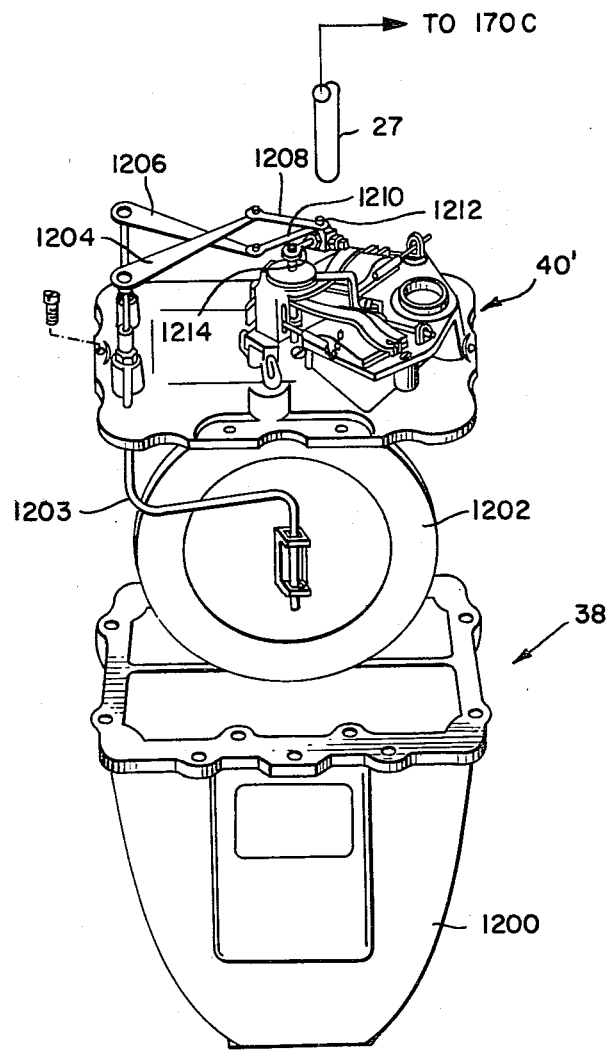
FIG. 4F shows a perspective view of the meter and the manner in which a proximity detector is disposed with regard to its encoder mechanism.

In a significant aspect of this invention, the initiating and terminating of the meter test, i.e., the counting by the programmable counter 174a and the counter 182, are made responsive to the output of the rotary encoder 40 in that the accuracy of the meter 38 is to be measured. More specifically, the rotary encoder 40 is coupled to the fluid or gas meter 38 as will be more fully described with respect to FIG. 4F and upon rotation of its rotatively mounted rod, the rotary meter encoder 40 as coupled thereto will produce a train of pulses corresponding to the rotation this tangent arm and the cycling of the meter's diaphragm. As shown in FIG. 4F, the rotary member is connected by coupling arms to the meter diaphragm and its rotation is not linear so that the output of the encoder 40 is in a sense frequency modulated. Therefore, in order to obtain an accurate measurement of the rotary meter encoder 40, it is desired to count the pulses as derived from the encoder 40 so that the counting begins and terminates at approximately the same point in the rotation of the meter's rotary member. This is accomplished by initiating the counting in response to the rotary meter encoder 40. In particular, a meter test is conducted by accelerating the piston 14 from its park position to a steady state velocity so that upon its passing the proximity detector 52, disposed at the start-test position, an output is provided therefrom to enable, as will be explained later, the detection of the leading edge of the next output signal from the logic circuit 170a corresponding to the leading edge of the next output signal A of the rotary meter encoder 40. The interval timer 176 responds to the leading edge to effect the simultaneous initiation of the counting of the programmable counter 174a and the counter 182. Upon the occurrence of the programmable counter 174a being counted down from its selected factor dependent upon the desired volume to be drawn through the meter 38, the interval timer 174 provides its output to the logic circuit 177 to enable Interrupt 2 of the CPU 120, which in turn terminates the counting of the counters 174a and 182 and transfers the respective counts to corresponding locations within the RAM 126. It is noted that the termination of counting could be implemented by software, but would involve an additional number of steps thus unduly complicating the programming of this system as well as adding to the time required to carry out the timing operation as described above. In addition, the effecting of the initiating of counting in response to the output of the rotary meter encoder 40 insures a more accurate test and calibration of the meter 38 under test.

As explained above, the output train of pulses as derived from the rotary encoder 40 is applied to count down the count initially placed in the programmable counter 174a. Significantly, the count as placed in the programmable counter 174a is variable dependent upon the volume desired to be drawn through the meter 38 and into the chamber 28. The count is based upon the structural dimensions of and characteristics of the meter 38, as well as the characteristics of the rotary meter encoder 40 in terms of the number of pulses it generates per revolution. In an illustrative embodiment of this invention, a count of 40,000 is placed in the programmable counter 174a corresponding to a volume of one cubic foot to be drawn through the meter 40. Assuming that the characteristics of the meter 38 and the encoder 40 remain the same for varying volumes, illustrative counts of 20,000 and 10,000 may be stored in the programmable counter 174a if it is desired, respectively, to draw one-half and one-fourth cubic foot of fluid through the meter 38. By entering a count based upon the characteristics of the meter 38 into the the programmable counter 174a which is counted down by pulses derived from the rotary meter encoder 40, a more accurate test of the meter is assured in that the beginning and ending of meter test will be effected at the same point in the cycle of the rotation of the meter and its rotary encoder 40, as explained above.

As indicated in FIG. 4C, a clock A is derived from the system clock 122 via the CPU 120 and the I/D bus 140 is applied to the interval timer 176. A selected factor is placed into down counter 176a to provide an output from the interval timer 176 corresponding to a sampling pulse of one pulse per second. In an illustrative embodiment of this invention, the system clock as derived from the clock 122 is in the order of 200 KHz, and the factor placed in the counter 176a is such to provide the desired one pulse per second to the logic circuit 178 and therefrom to the motor control board. As will be explained later, this sampling pulse is used to time the sampling of the measurements of pressure and temperature.

Further, the output of the linear encoder 26 is a pair of signals A and $\overline{A}$, 90° out of phase with each other, which are applied to a signal and conditioner circuit 170b. The circuit 170b is similar to circuit 170a in that it processes the inputted signal A and $\overline{A}$ to shape and condition these input signals eliminating jitter that might otherwise indicate a false output from the linear encoder 26. In addition, the circuit 170b is able to detect the direction in which the piston 14 is moving from the inputted signals A and $\overline{A}$ and if the outputted signals A and $\overline{A}$ do not indicate that the piston 14 is moving in the desired direction, no signals are outputted from the signal and conditioner circuit 170b. The circuit 170b provides a train of conditioned pulses corresponding to the linear encoder output to the counter 182, which after initiation counts and accumulates the output of linear encoder 26. The accumulated output of the counter 182 is applied to PI/O circuit 184 and upon command is transferred via the I/D bus 140 to the remaining portions of the computer system.

In one embodiment of this invention, a rotary encoder transducer 40 is coupled to the meter 38 and in particular includes an optical encoder rotatively coupled to the domestic meter tangent arm of the meter 38 to detect the rotation of the tangent arm as gas flows therethrough to provide a plurality of output signals A and $\overline{A}$ as explained above. In an alternative embodiment of this invention, the proximity detector 27 may be used to detect the mechanical rotation of the domestic meter tangent of the meter 38 by a mechanism that will be explained later to provide an output signal to a signal conditioner and logic circuit 170c, which is in turn connected to the interval timer 176 and to the interval timer 174. Due to the arrangement of the mechanical mechanism coupled to the tangent arm of the meter 38, the proximity detector 27 produces a signal of lesser resolution than that produced by the optical encoder 26, as it detects the rotation of the meter tangent arm; the particular advantage of the proximity detector arrangement is that of the relative simplicity of its mechanical and electrical structure. The choice of whether to use the proximity detector 27 or the rotary encoder transducer 40 is made by the operator by throwing a switch 191, as shown in FIG. 4K. When the operator determines to use the proximity detector 27, the programmable counter 174a is encoded with numbers of 8, 4, and 2 corresponding to measured volume flows of one cubic foot, one-half cubic foot, and one-fourth cubic foot. The operator initiates the entering of the appropriate factors whether for the proximity detector 27 or for the rotary encoder 40, by first throwing the switch 191 to the appropriate position and entering the test volume via the keyboard of the CRT terminal 112.

In FIG. 4F, there is shown a perspective view of a typical meter 38, which measures the fluid flow by the use of two diaphragms, only one of which is shown as 1202; the flow meter as shown in FIG. 4F is more fully explained in U.S. Pat. No. 2,544,665 dated March 31, 1951. As shown, a flag rod 1203 senses the flexing of the diaphragm 1202 to cause the arm 1204 to oscillate. A second diaphragm (not shown) and an associated flag rod (not shown) cause arm 1206 to oscillate in an alternate cycle. As explained in the noted patent, the combination of the arms 1206 and 1204, and the arms 1208 and 1210 cause the tangent arm 1214 to rotate as described in said patent. A metallic target 1212 at the point of intersection of the arms 1208 and 1210, is rotated past the proximity detector 27, whereby an output is provided to the logic circuit 170c to be processed as explained above.

The conditioning and interface circuit 136 is more fully shown with respect to 4D, wherein communication is made between the printer 111a, the display unit 111 for printing out desired parameters as measured by the meter prover system 10 including the measured flow rate(s) and the percentage(s) of error for the tests performed. In particular, the printer 111a is coupled to the I/D bus 140 via a first logic circuit 190b, and a parallel data controller (PDC) 192b, which may illustratively take the form of the PDC as manufactured by the assignee of this invention under their designation number 10453 and provides a two-way controlled access between the I/D bus 140 and the printer 111a. Thus, on command through the PDC 192b, a signal is developed by the logic circuit 190b whereby the printer 111a is strobed and an appropriate acknowledging signal (ACKO) is transferred via the logic circuit 190b and the PDC 192b to indicate that the printer 111a is available for printing. If the printer 111a is busy, an appropriate busy signal will be transmitted back to the I/D bus 140. If a command has been issued to print data, the control portion of the signal is transmitted via the PDC 192b and the logic circuit 190b to control the printer 111a to print that data which appears upon the data channel derived from the logic circuit 190b.

Further, the operator may enter appropriate commands upon the keyboard of the CRT terminal 112 that is interconnected via the logic circuit 190a and a serial data controller (SDC) 192a to the computer system via the I/D bus 140. The SDC 192a may illustratively take the form of that SDC as manufactured by the assignee of this invention under their model No. 10930. The SDC 192a is capable of receiving the serially oriented data as derived from the CRT terminal 112 including instructions entered by the operator upon the terminal's keyboard. The SDC 192a converts these serial signals inputted from the logic circuit 190a at an appropriate baud rate set by the clock 193, and transmits a set of digital signals via the I/D bus 140 to the CPU 120. In turn, data to be displayed upon the CRT terminal 112 is transmitted by the I/D bus 140 via the SDC 192a and by the logic circuit 190a to be displayed upon the terminal's CRT.

The signal conditioning and interface circuit 138, as shown in FIG. 4E, interfaces between the I/D bus 140 and the first or inlet valve 34 and the second or exhaust valve 36, as well as to provide signals to and from the motor control. Motor control signals in terms of speed and direction are applied via the I/D bus 140 to be received and transmitted via the PI/O circuit 196 to a logic circuit 194a whereby these digital signals are applied to the motor control to effect a corresponding action of the servomotor 20. Similarly, at the appropriate time under the control of the executed program, signals are developed to close or to open the valves 34 and 36 by actuating their corresponding solenoids 66 and 64, respectively; these valve control signals are applied via the PI/O circuit 196 and the logic circuit 194b to a pair of pneumatic valves disposed within the control room 105 as seen in FIG. 2C, whereby a 50 psi supply of air is selectively applied to each of the valve solenoids 66 and 64, respectively, to open and close these valves upon command. In this manner, the heat generated by the valve solenoids is removed from the temperature controlled prover room 106. In addition, each of the solenoids 66 and 64 includes a proximity detector to determine whether the valve is open or closed. The output signals developed by the proximity detectors 50, 52, and 54 to determine the approximate position of the piston 14 are applied via a logic circuit 194c and the PI/O 196 to the I/D bus 140. A one second sampling clock is developed from the encoder board (as explained above) and is applied via the logic circuit 194d to the PI/O circuit 196. Similarly, the operator may actuate a switch to determine whether the meter fluid flow is to be obtained from the proximity detector 27 or from the encoder 26, as shown in FIG. 4C; this command signal is applied via the PI/O circuit 196 to the I/D bus 140. In order to achieve proper control over the servomotor 20, the motor status in terms of its speed, direction, and measured torque is applied via the logic circuit 198b and the PI/O circuit 200 to the I/D bus 140.

Figure 2D:
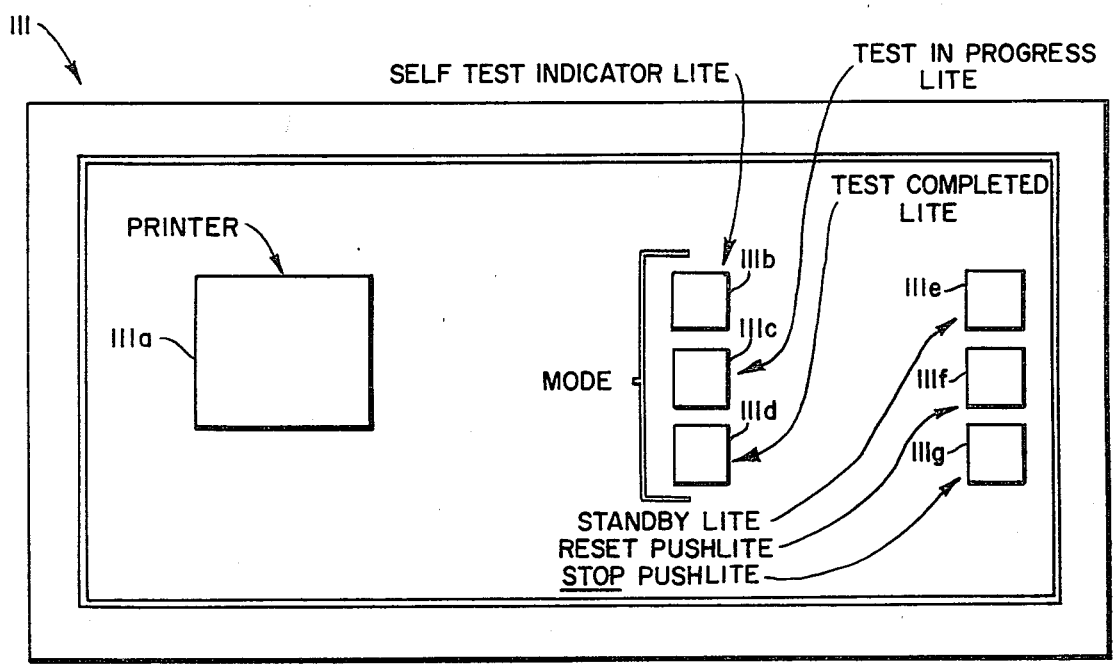

The display unit 111 includes a front panel as shown in FIG. 2D and is provided to display a series of lights and backlighted pushbuttons variously indicating the condition of the system. As shown in FIG. 2D, the display panel includes the printer 111a for providing printouts of the flow rate and the percentage of the fluid through the meter 38. In addition, there is included a plurality of lights 111b to 111e. The light 111b is energized to indicate that a self-test of the meter prover 10 is being run, as will be explained. The standby light 111e indicates that power has been applied to the meter prover 10 and that an initialization process has been started to place the prover 10 in its standby mode. While in this standby mode, a series of keyboard responses are required of the operator and upon completion of entry of the data via the keyboard of the CRT terminal 112, the meter prover 10 will automatically go into the test in progress mode as indicated by the energization of the test in progress light 111c; in this mode, the meter 38 is actually being tested. Upon completion of a meter test, the test completed indicator light 111d is energized. At this time, the final percent accuracy is calculated and is printed out on the hard copy printer 111a. In addition, there is included a backlit stop pushbutton 111g and a backlit reset pushbutton 111f. If during any phase of the operation, the restart pushbutton 111f is depressed, the meter prover 10 will respond as if power is initially applied, as will be more fully explained with respect to FIG. 9H. The stop pushbutton 111g is depressed only when an emergency situation occurs that may cause damage to the prover 10. Upon depressing the stop pushbutton 111g, the servomotor 20 is quickly decelerated to a halt and the prover 10 is locked up in its stop mode until primary power is removed and reapplied. Upon reapplication of power, the meter prover 10 will return to the standby mode. During the course of the execution of the program, appropriate signals are generated and applied via the I/D bus 140, the PI/O circuit 200, and the logic and driver circuit 198a to energize the appropriate indicator lights 111b and 111e.

The signal conditioning circuits as shown in the functional block diagrams of FIGS. 4A to 4E are shown in more detail in the schematic diagrams of FIGS. 4G to M. The signal conditioning circuit 130 as generally shown in FIG. 4A is more specifically shown in the schematic diagrams of FIGS. 4G, 4H, and 4I.

Figure 4G:
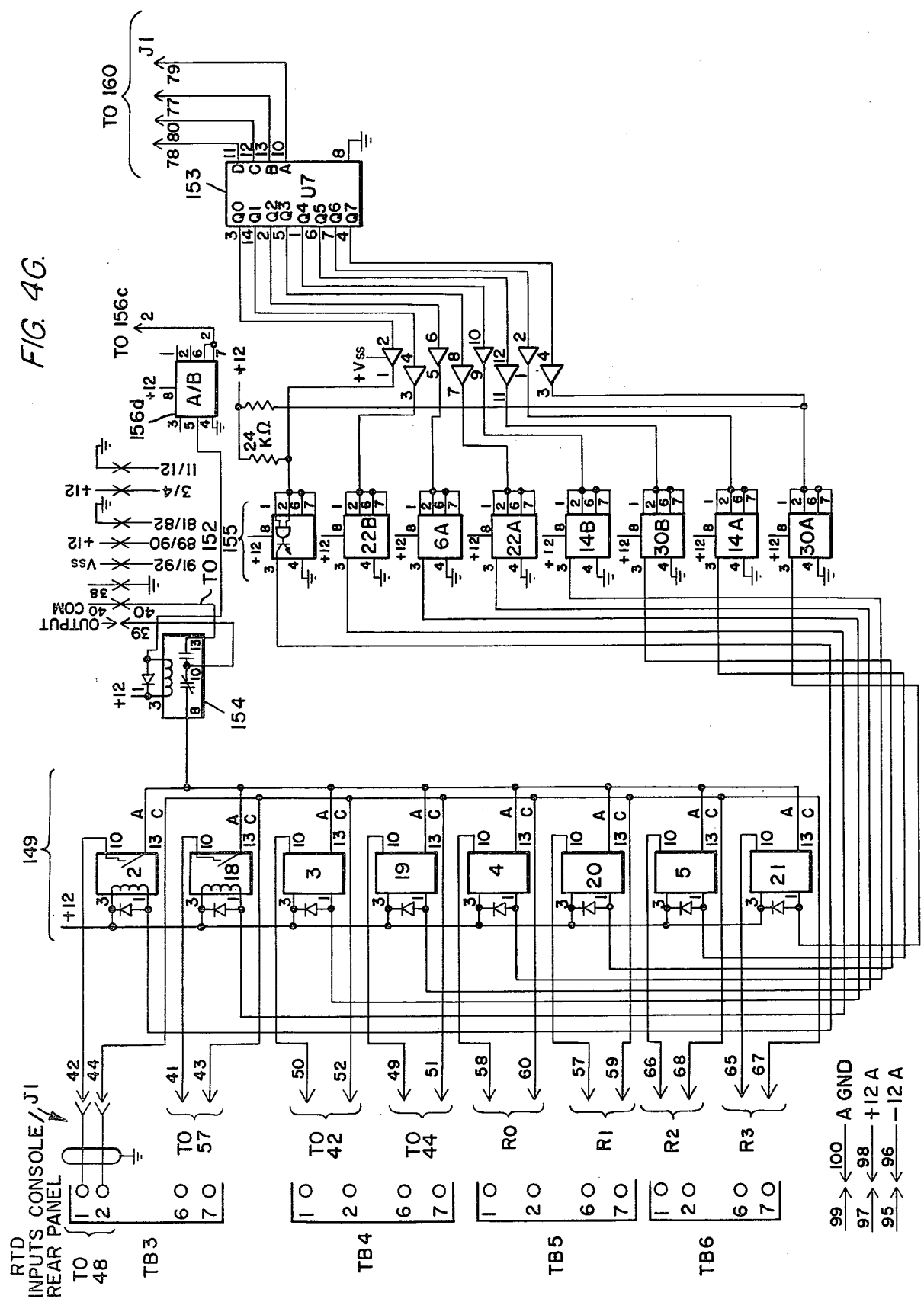
Figure 4H:
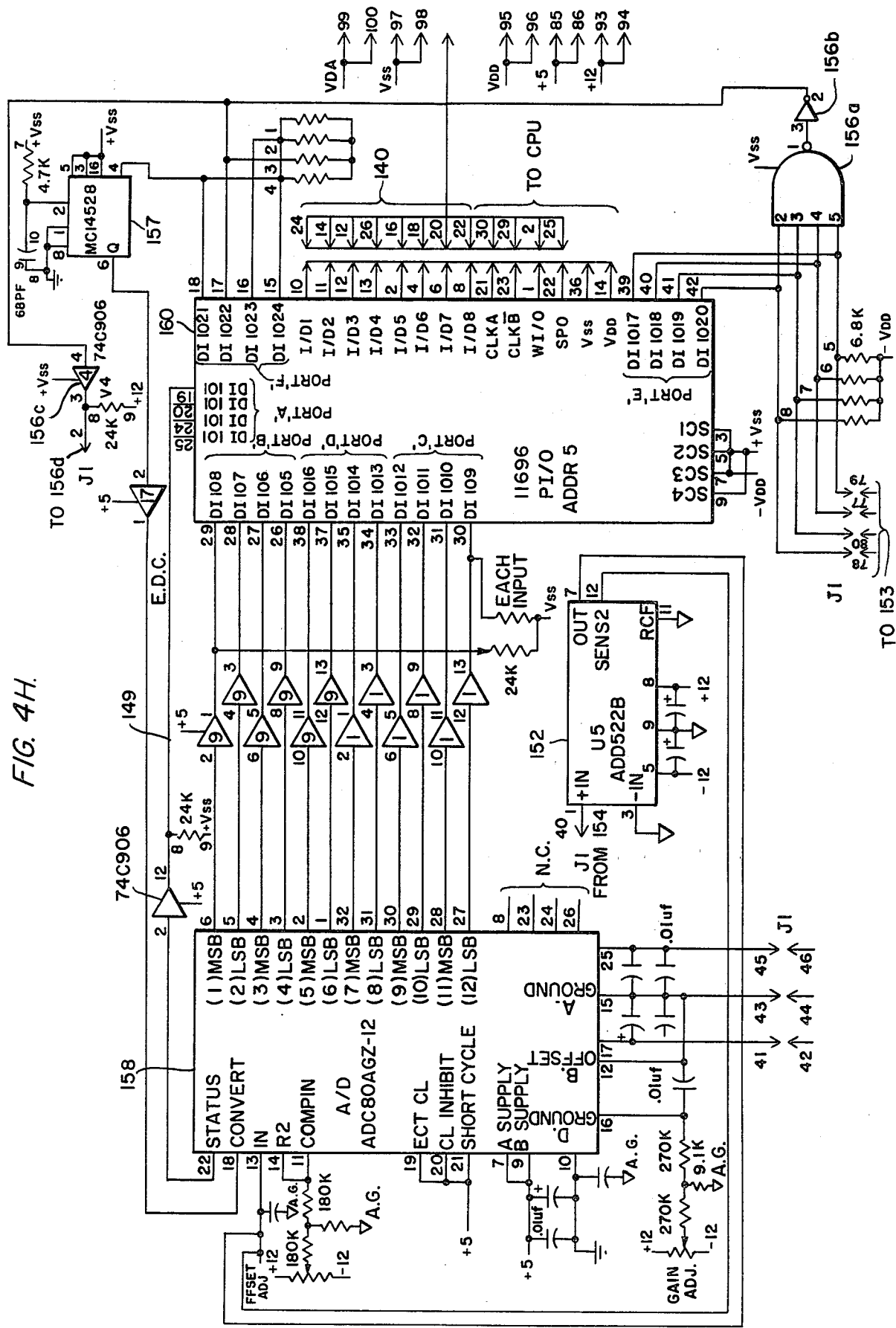

In FIG. 4G, there is shown the multiplexer 149 as comprising a plurality of relays having mercury wetted relay contacts, which reduce resistance presented thereby and are coupled to the channels connected to the amplifier modules for providing to its relay of the multiplexer 149, a voltage corresponding to the temperature as measured by one of the prover temperature transducers 57 or 48, the meter temperature transducers 44 or 42, or one of the room temperature transducers R0 to R3. A selected channel is applied by the energized relay of the multiplexer 149 via the second multiplexer 154, as shown in FIG. 4G, and the amplifier 152 to the A/D converter 158, as shown in FIG. 4H. In FIG. 4H, there is shown the PI/O circuit 160 as being coupled by the I/D bus 140 to the CPU 120. In addition, an output is derived from the PI/O circuit 160 to be applied to a HEX to one decoder 153, as shown in FIG. 4G, which in turn energizes one of a plurality of drivers 155 to close the corresponding relay of the multiplexer 149; the PI/O circuit output is also applied via the logic circuit 156 as comprised of an AND gate 156a, an inverter 156b, and a logic translator 156c to the multiplexer 154. Further, with respect to FIG. 4H, when the output of a selected one of the temperature measuring modules applied to the A/D converter 158, a convert signal is applied to the A/D converter 158 from the PI/O circuit 160 via the expander circuit 153. In response to this convert signal, the A/D converter 158 converts the inputted analog temperature signal to a corresponding digital signal to be transmitted via the PI/O circuit 160 to the I/D bus 140, and transmits an end of conversion status signal via the conductor 147 to the PI/O 160.

Figure 4I:
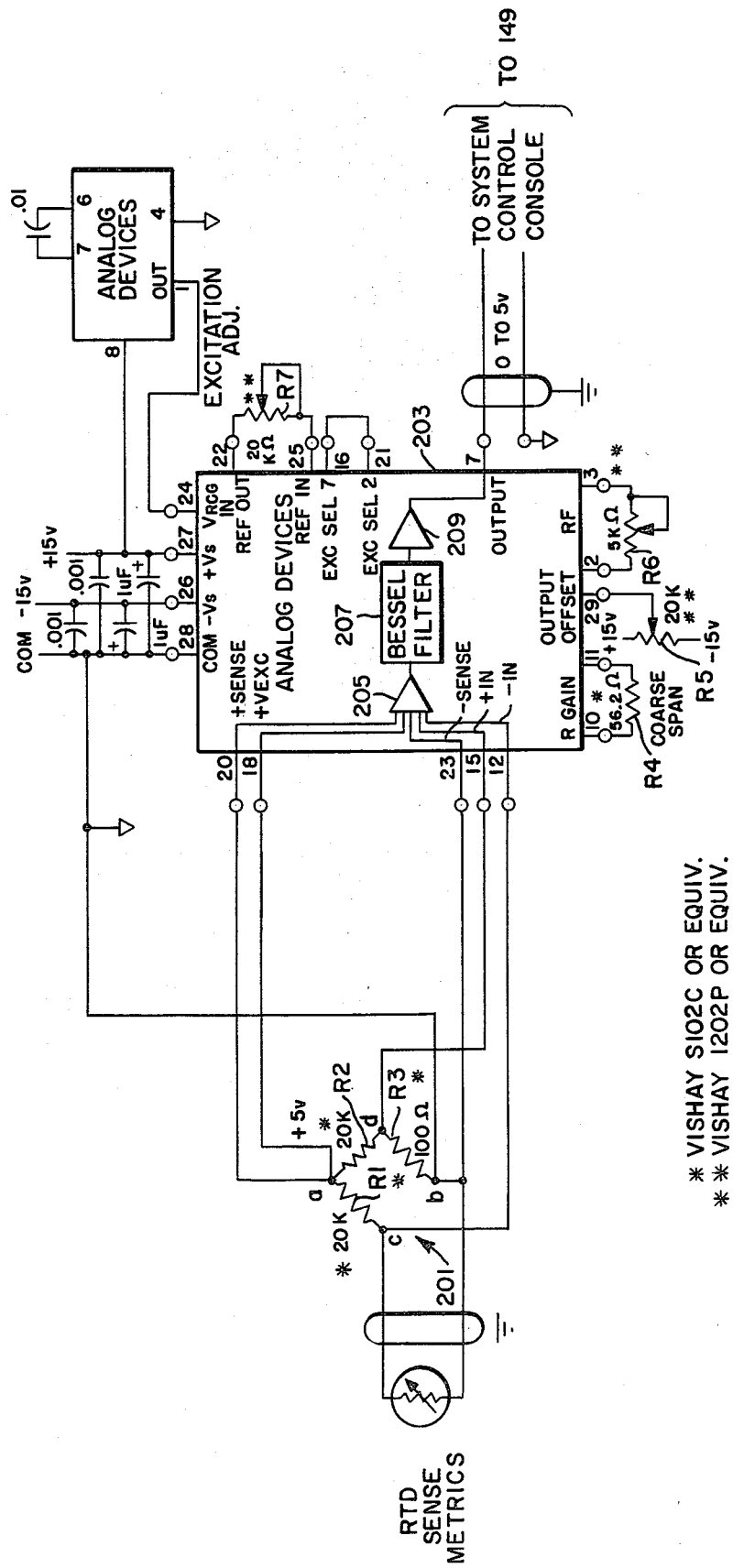
Figure 4K:
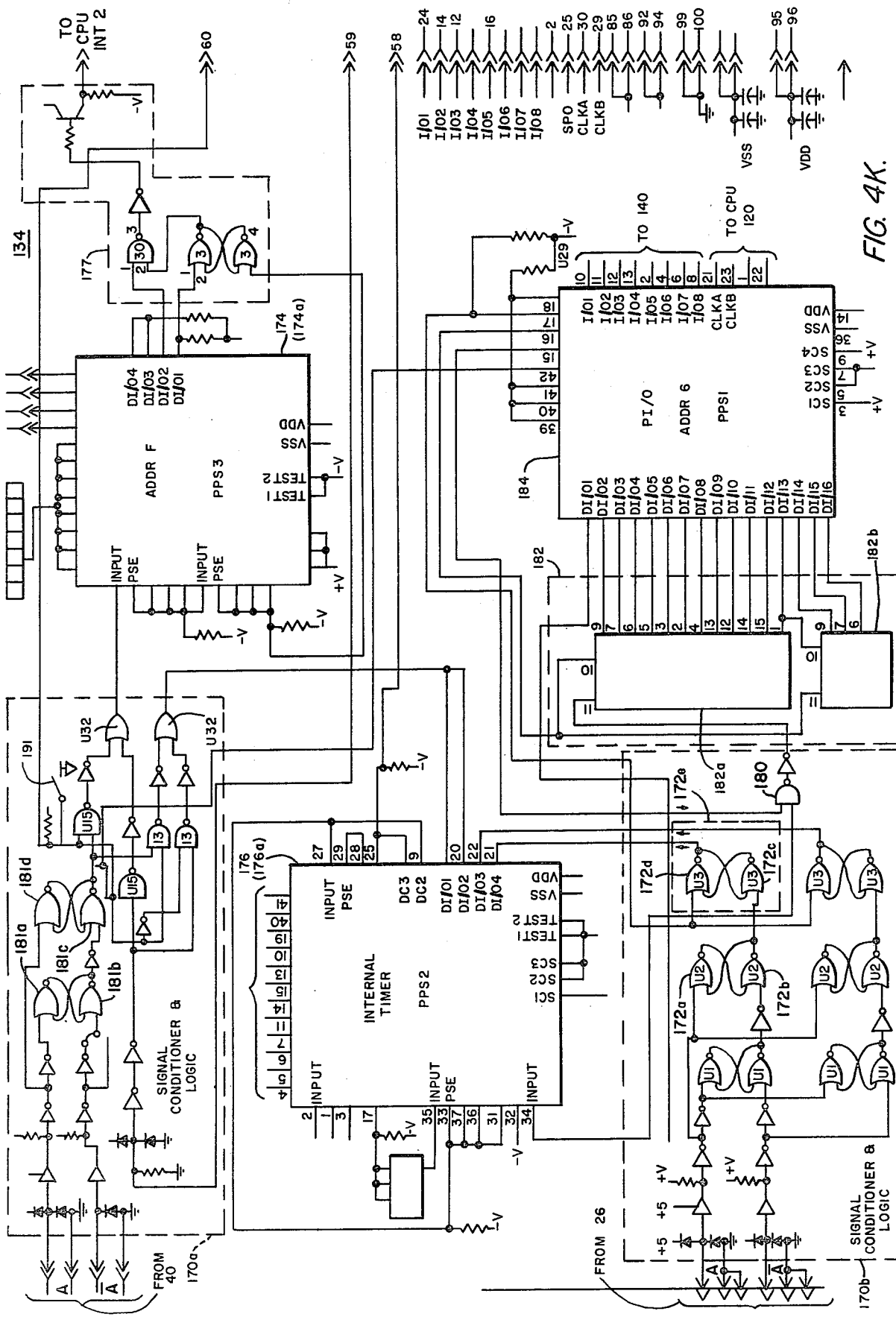

Referring now to FIG. 4I, there is shown a schematic diagram of an amplifier module to which each of the temperature measuring devices may be applied and amplified to provide a voltage output signal to be applied via a corresponding channel to the multiplexer 149. Illustratively, the temperature measuring devices may comprise a resistance temperature device as manufactured by Senso-Metrics under their designation No. 601222. The resistance temperature device (RTD) is coupled as one arm of a resistance bridge 201 comprised of the RTD, and resistors R1, R2, and R3. The excitation voltage, as applied to the a and b terminals of the bridge 201, as well as the output voltage as derived from the terminals c and d thereof are coupled to a conditioning circuit 203 as illustratively made by Analog Devices under their designation Model 2B31. Basically, the conditioning circuit 203 includes an operational amplifier 205 to which is applied the output of the bridge 201 to be amplified before being applied to a Bessel filter 207 whereby selected frequencies may be removed before being further amplified by an operational amplifier 209 to be applied to a corresponding channel of the multiplexer 149. An extremely stable voltage supply serves to energize the circuit 203 and may illustratively comprise a voltage supply as manufactured by Analog Devices under their designation AD584. As indicated in FIG. 4I, the gain of the operational amplifier 205 is controlled by the resistance placed between terminals 10 and 11 of the circuit 203, while the output offset is adjusted by setting the potentiometer coupled to the terminal 29 of the circuit 203. In addition, the voltage and current as applied to energize the bridge 201 are respectively controlled by adjusting the potentiometers R7 and R6.

The signal conditioning circuit 164 as generally shown in FIG. 4B is shown in more detail by the schematic diagram of FIG. 4J. The PI/O circuit 168 is shown as being coupled to the I/D bus 140 and to the CPU 120 to provide transmission of data therebetween. A further input is made from the A/D converter 166 via corresponding set of inverters 167 to the PI/O circuit 168. The pressure transducers 51, 46, and PB are connected respectively via the amplifiers 161a, b, and c to the multiplexer 163. As indicated in FIG. 4J, the multiplexer 163 is made up of a corresponding plurality of relays which are energized to apply a selected output as derived from one of the pressure transducers to the A/D converter 166. The PI/O circuit 168 determines which of the relays of the multiplexer 163 is to be energized by applying control signals via the bus 169 to the logic circuit 165 comprised of a binary coded decimal to decimal converter and decoder 165a, which in effect selects which of the relays of the multiplexer 163 to be energized and applies a high going signal via a corresponding output via a set 165b of logic translators to a corresponding set 165c of power drivers, whereby a corresponding relay of the multiplexer 163 is energized to apply the corresponding temperature output to the A/D converter 166. Next, the PI/O 168 applies a convert signal via conductor 159 to the A/D converter 166, which converts the inputted analog signal to a corresponding digital signal, and transmits a status signal to the PI/O circuit 168.

In FIG. 4K, there is shown a schematic diagram of the conditioning circuit 134 as generally shown in the functional block diagram of FIG. 4C. The PI/O circuit 184 is shown as being coupled by the I/D bus 140 to the CPU 120 and being coupled to the counter 182 comprised of a pair of counters 182a, 182b. In turn, the signal conditioner and logic circuit 170b is shown as comprised of a series of NOR gates 172 whose output is applied via a NAND gate 180 and an inverter to an input of the counter 182a. The output of the linear encoder 26 is applied via corresponding logic translators and inverters to the aforementioned NOR gates 172 of the signal conditioner and logic circuit 170b. The rotary meter encoder 40 is applied to the signal conditioner and logic circuit 170a that is similar to the signal conditioner and logic circuit 170b to provide a composite signal to the interval timer 174 and a conditioned signal corresponding to the A signal to the interval timer 176. It is understood that the I/D circuits designated 174 and 176 of FIG. 4K, also include the programmable counters 174a and 176a, respectively. The output of the interval timer 174 is applied via the logic circuit 177 comprised of a NAND gate and a pair of NOR gates as shown in FIG. 4K, to the Interrupt 2 input of CPU 120. The output of interval timer 176 is applied to the control board of the servomotor 20.

Figure 11:
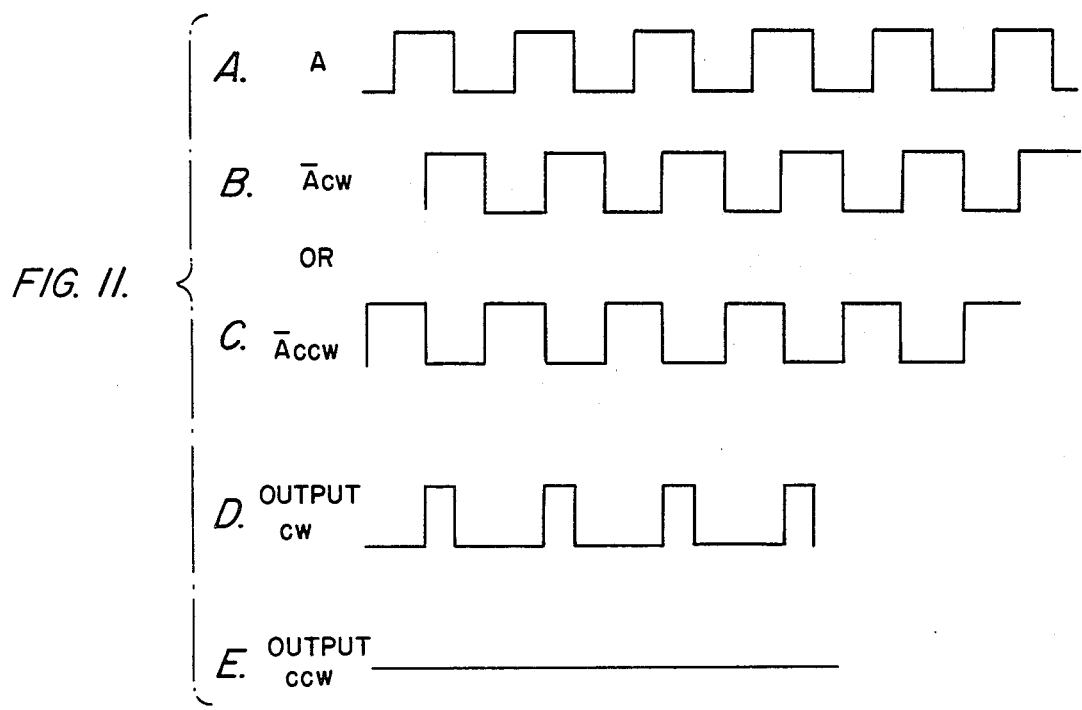
FIGS. 11A through E show variously the input signals applied to and the output signal as developed by the signal conditioner and logic circuits 170a and 170b as shown generally in FIG. 4C and more specifically in FIG. 4K.

As shown in FIG. 4K, the signal conditioner and logic circuit 170a is comprised of first and second inputs receiving respectively the output signals A and $\overline{A}$ as developed by the rotary meter encoder 40. As shown respectively in FIGS. 11A and 11B, the $\overline{A}$ signal lags the A signal to provide, as will be explained, an indication of the direction of rotation in which the meter encoder 40 is moving. It is understood that the meter encoder 40 is designed for this particular system to rotate in a clockwise direction, and if jitter or mechanical vibration is imposed upon the meter encoder 40, at least momentarily, the $\overline{A}$ signal may appear to be leading the A signal; FIG. 11C shows the output signal $\overline{A}$ as it would appear as if it leads the A signal by 90°, this condition being undesired, indicating an erroneous signal condition. The signal conditioner and logic circuit 170a is designed to eliminate such conditions as will now be explained. The A and $\overline{A}$ signal are each applied through a level shifter and inverter circuits to NOR gates 181a and 181b, respectively. The output of the NOR gate 181a is coupled to an input of the NOR gate 181b and the output of the NOR gate 181b is coupled via an inverter to an input of a NOR gate 181c. As shown in FIG. 4K, an inverted signal, i.e., 180° out of phase with an input to the NOR gate 181a, is supplied to a NOR gate 181d, whose output is applied to the other input of the NOR gate 181c. The effective output of the signal conditioner and logic circuit 170a is derived from the output of the NOR gate 181c as shown in FIG. 11D, assuming that the meter encoder 40 is rotated in a clockwise or desired direction, and is applied to the interval timer 174 to be counted as explained above. However, if even on a relatively short time basis, the $\overline{A}$ signal appears to be leading the A signal, a DC (or logic zero signal) output signal will be derived from the NOR gate 181c indicating the presence of jitter or some other erroneous signal. In similar fashion, the signal conditioner and logic circuit 170b receives the A and $\overline{A}$ signal as derived from the linear encoder 26, these signals being also illustrated by FIGS. 11A and 11B respectively. In similar fashion, the A and $\overline{A}$ signals are applied to a similar set of NOR gates 169a, b, c, and d. The output of NOR gates 169c is applied to a latch as comprised of a pair of NOR gates interconnected as shown in FIG. 4K. In similar fashion, if the $\overline{A}$ signal as derived from the linear encoder 26 is lagging its A signal, the output as shown in FIG. 11C will be applied via the latch 169e to the interval timer 176 to be counted by its counter 176a. A further set of NOR gates is also included in the signal conditioner and logic circuit 170b to provide an output signal as applied to the input 22 of the interval timer 176 to indicate the occurrence of the $\overline{A}$ signal leading the A signal as derived from the linear encoder 26, indicating that the piston 14 is being driven in a reverse condition, i.e., is being driven by the servomotor 20 in a downward direction toward its park position.

Figure 4L:
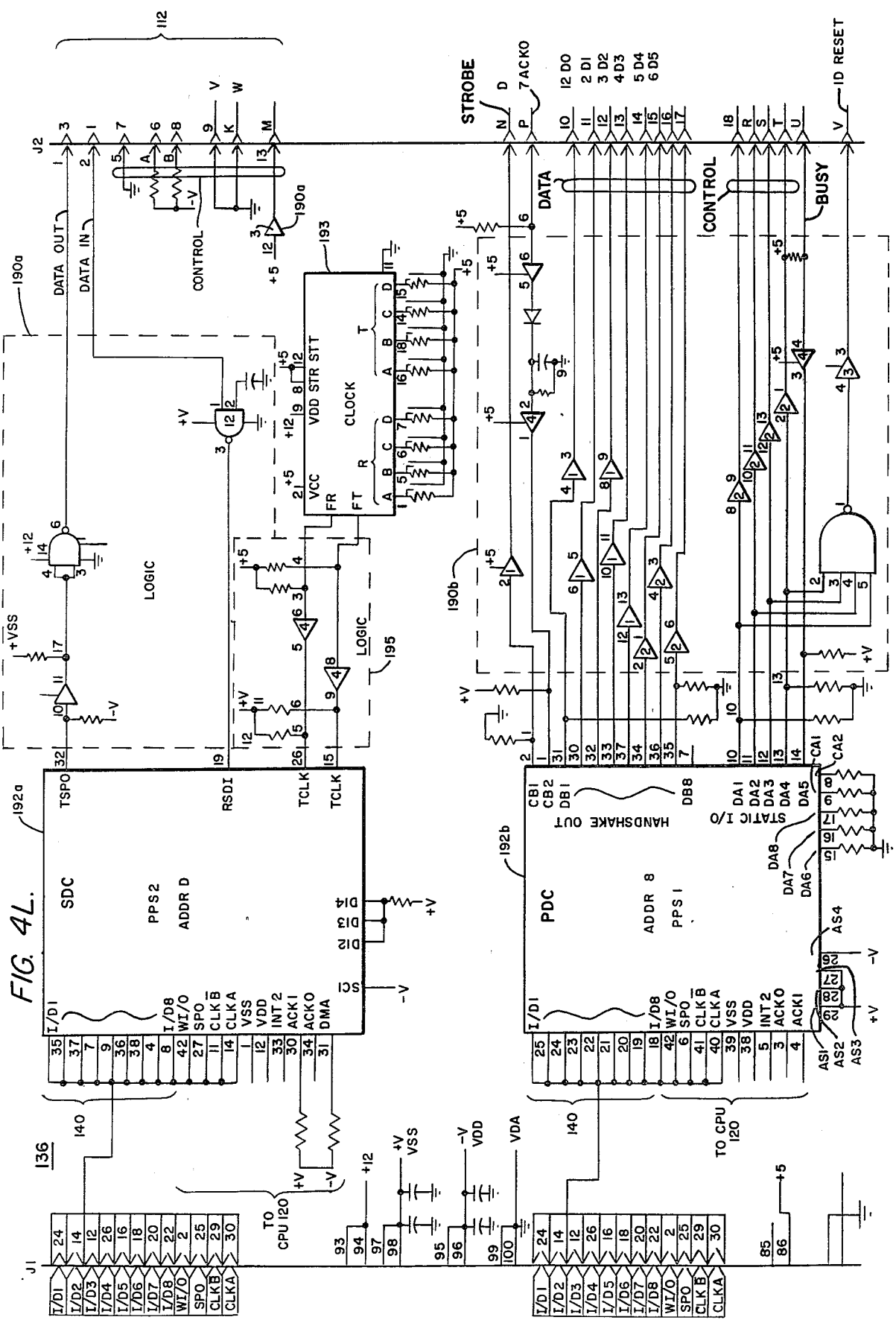

In FIG. 4L, there is shown a schematic diagram of the signal conditioner and logic circuit 136 as generally shown in FIG. 4D. Data is transferred between the parallel data controller (PDC) 192b and the CPU 120 via the I/D bus 140 and direct connections to the CPU 120. The output of the PDC circuit 192b is coupled to a logic circuit 190b and by a plurality of lines as shown on the right-hand side of the PDC 192b. The logic circuit 190b is primarily comprised of a logic translator connected to each of its output. A NAND gate is incorporated into the logic circuit 190b to provide a reset signal to the printer 111a. As shown in FIG. 4L, a strobe signal is applied to the printer 111a which in turn applies an acknowledge signal (ACKO) to the PDC circuit 192b, whereby data may be transmitted to be printed by the printer 111a under the control of a set of signals so marked. In addition, a busy signal may be developed by the printer 111a to inhibit the transmission of data from the PDC circuit 192b to the printer 111a. Further, the SDC circuit 192a is coupled via the I/D bus 140 and direct connections to the CPU 120; its output as taken from the right-hand side of the SDC circuit 192a is applied via the logic circuit 190a to provide data into and from the CRT terminal 112 under the control of preselected signals as provided by the circuitry as shown on the left-hand side and designated control; briefly, the control signals provide fixed signals to determine the mode of operation of the CRT terminal 112. The logic circuit 190a coupled to the data out signal comprises a logic translator and an inverter circuit in the form of a line driver while the data input line is processed to invert the signal before application to the SDC circuit 192a. The clock circuit 193 applies a signal via a logic circuit 195 comprised of logic translators to the clock inputs of the SDC circuit 192a.

Figure 4M:
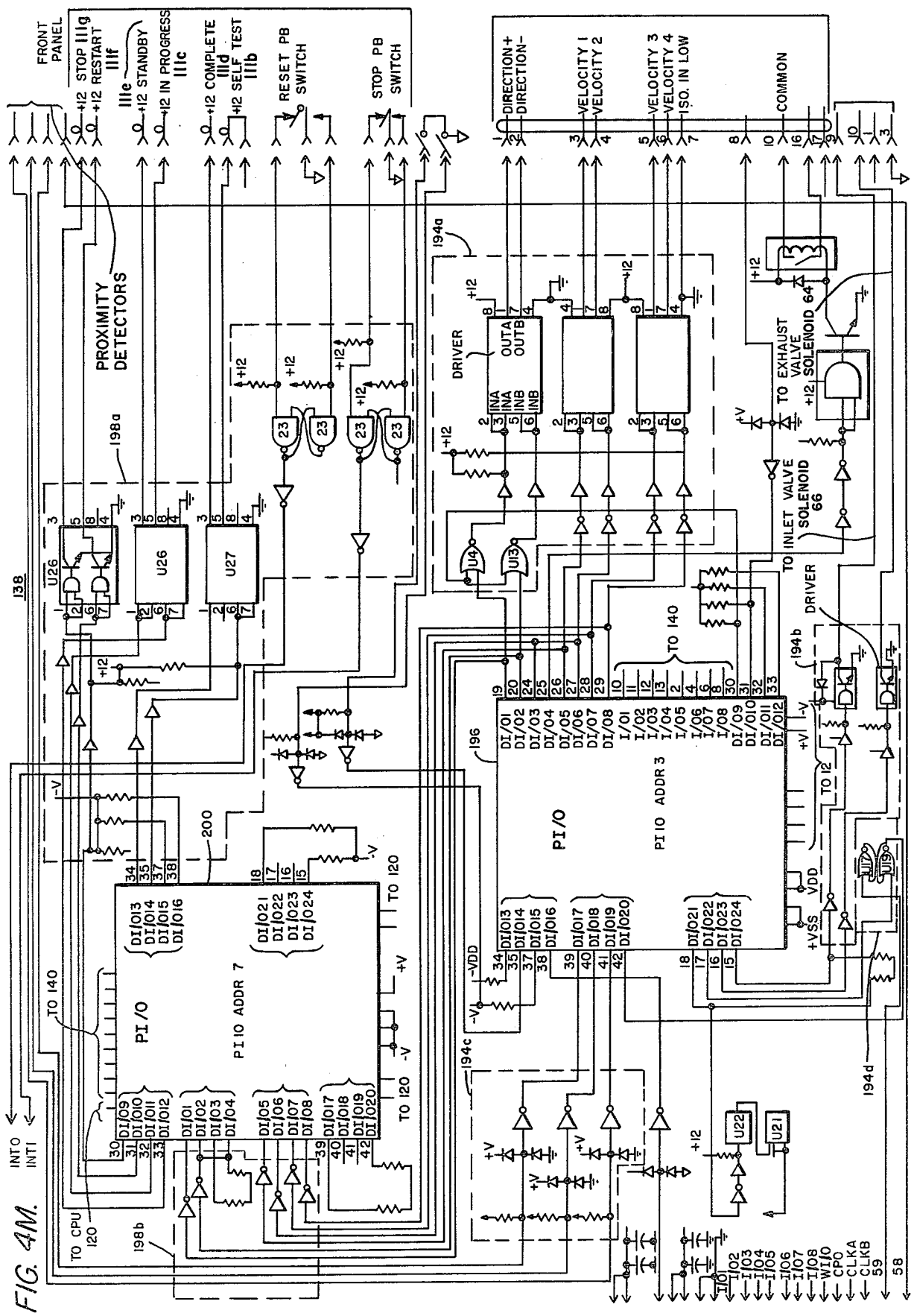

The signal conditioning circuit 138 as generally shown in FIG. 4E is more completely shown in the schematic drawing of FIG. 4M. The PI/O circuit 200 is coupled to the CPU 120 by the I/D data bus 140 and those direct connections at the top and bottom so indicated. The outputs as variously taken from the PI/O circuit 200 are coupled by the logic circuit 198a to variously energize the lights as shown on the system control and display unit 111. The logic circuit 198a is comprised of a logic translator for each output of the PI/O circuit 200 and a plurality of drivers to energize the corresponding lights. In addition, signals from the switch mechanisms of reset and stop pushlites 111f and 111g are applied via the logic circuit 198a and in particular to a set of NAND gates as shown in FIG. 4M whose outputs are applied via inverters to the PI/O circuit 200. A second PI/O circuit 196 is coupled by the I/D data bus 140 and direct connections to the CPU 120. A set of its outputs are applied via a logic circuit 194a to control various functions including direction and velocity of the servomotor 20; the logic circuit 194a receives seven inputs that are coupled via a set of NOR gates and series connected inverters and logic translators to a corresponding plurality of drivers, whose outputs serve to control the direction and velocity of the servomotor 20. Further, two outputs of the PI/O circuit 196 are applied via a logic circuit 194b comprised of a series connected inverter and a logic translator to a driver before being applied to control the pneumatic solenoids 66 and 64 associated with the valves 34 and 36. A set of five inputs are derived from the logic circuit 194c which processes inputs from the proximity detectors 50, 52, and 54; the logic circuit 194c comprises a circuit of resistors and diodes as coupled via inverters to corresponding inputs of the PI/O circuit 196. The logic circuit 194d is coupled to the logic circuit 170a shown in FIG. 4C and comprises a series of NOR gates, the input signal comprising a one-second clock signal to control the sampling of the various pressure and temperature signals.

Figure 5:
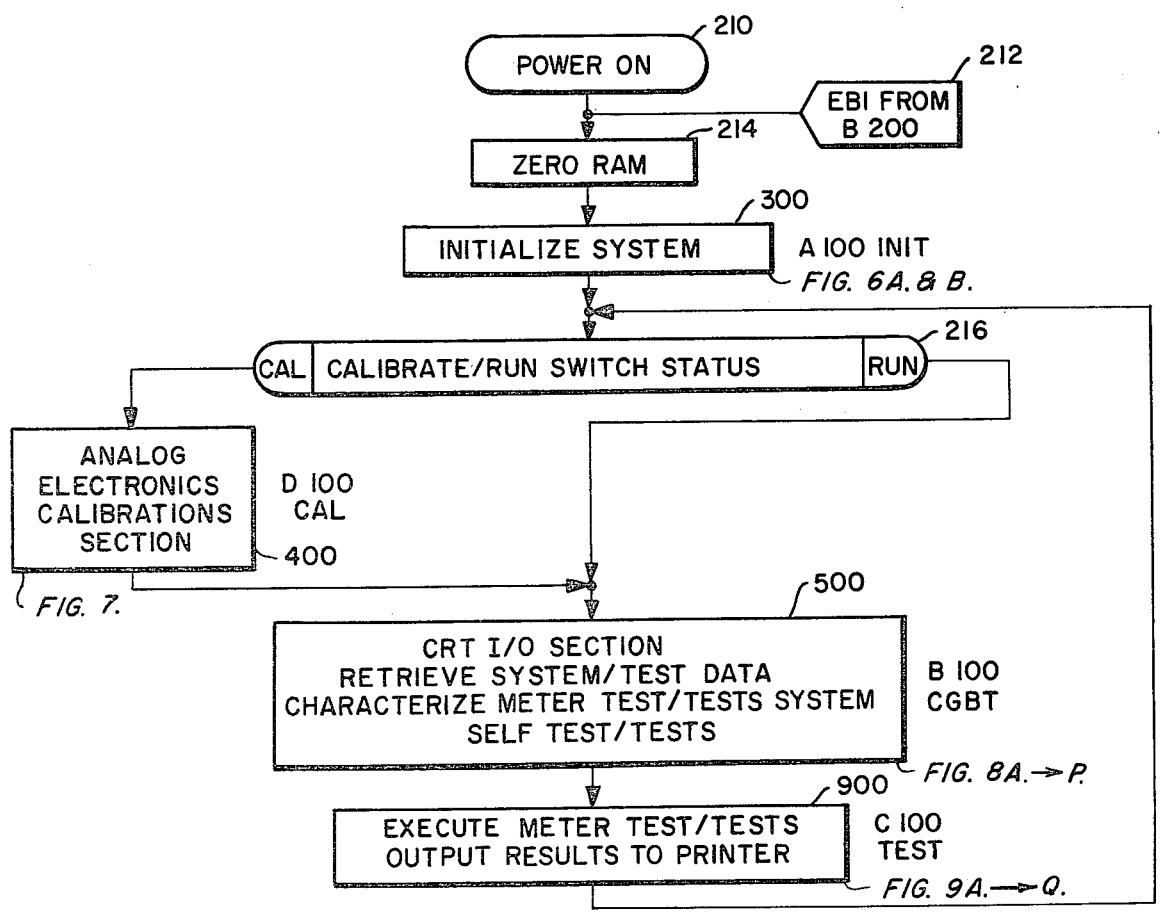
FIG. 5 shows a high level diagram of the program as executed by the computer system of FIG. 3.

Referring now to FIG. 5, there is shown a high level flow diagram of the various steps of the program as stored within the PROM 124 and executed under the control of the CPU 120 using data as entered into the RAM 126. Initially, the power is applied to the computer system in step 210. Typically, the power supply for the computer system as shown in FIG. 3 can take the form of that supply as manufactured by Power Mate under their designations Power Mate EMA 18/24B and EMA 12/5D; Analog Devices-925; Datel-MPS 5/12, MPS 5/3, and MPD 12/3; and Practical Automation-PS6-28. Thereafter, step 214 zeroes or erases the storage locations within RAM 126, before entering an initializing subroutine 300, whereby the various portions of the computer system are initialized as will be explained later in detail with respect to FIGS. 6A and 6B. It is noted that at various points during the course of the program, a return is made via entrance point 212 to step 214 to restart the operation of the program. As shown in FIG. 4B, there is a switch 139 to be set to indicate whether it is desired to calibrate parts of the prover system 10 or to run a meter test. If the switch 139 is disposed to its calibrate mode, the decision step 216 moves to step 400 wherein a subroutine is executed to calibrate the various analog inputs such as derived from the temperature and pressure measuring devices as shown in FIGS. 1 and 2A, and the corresponding A/D converters to which these signals are applied, as will be explained in more detail with respect to FIG. 7. As the system moves to step 500, the operator can recall data from the various input measuring devices such as temperature measuring devices 42, 44, 48, and 57; the pressure measuring devices 51 and 46; and the output of the linear encoder 26. In addition, the operator may also initiate various of the meter self-tests. This subroutine will be described in more detail with respect to FIGS. 8A to P. After gathering the appropriate data, the program moves to step or routine 900 wherein a test or a series of tests of a meter 38 is carried out by the meter prover system 10 and the results thereof displayed or recorded upon the CRT or printer. The routine 900 will be explained in more detail with respect to FIGS. 9A to Q.

Figure 6B:
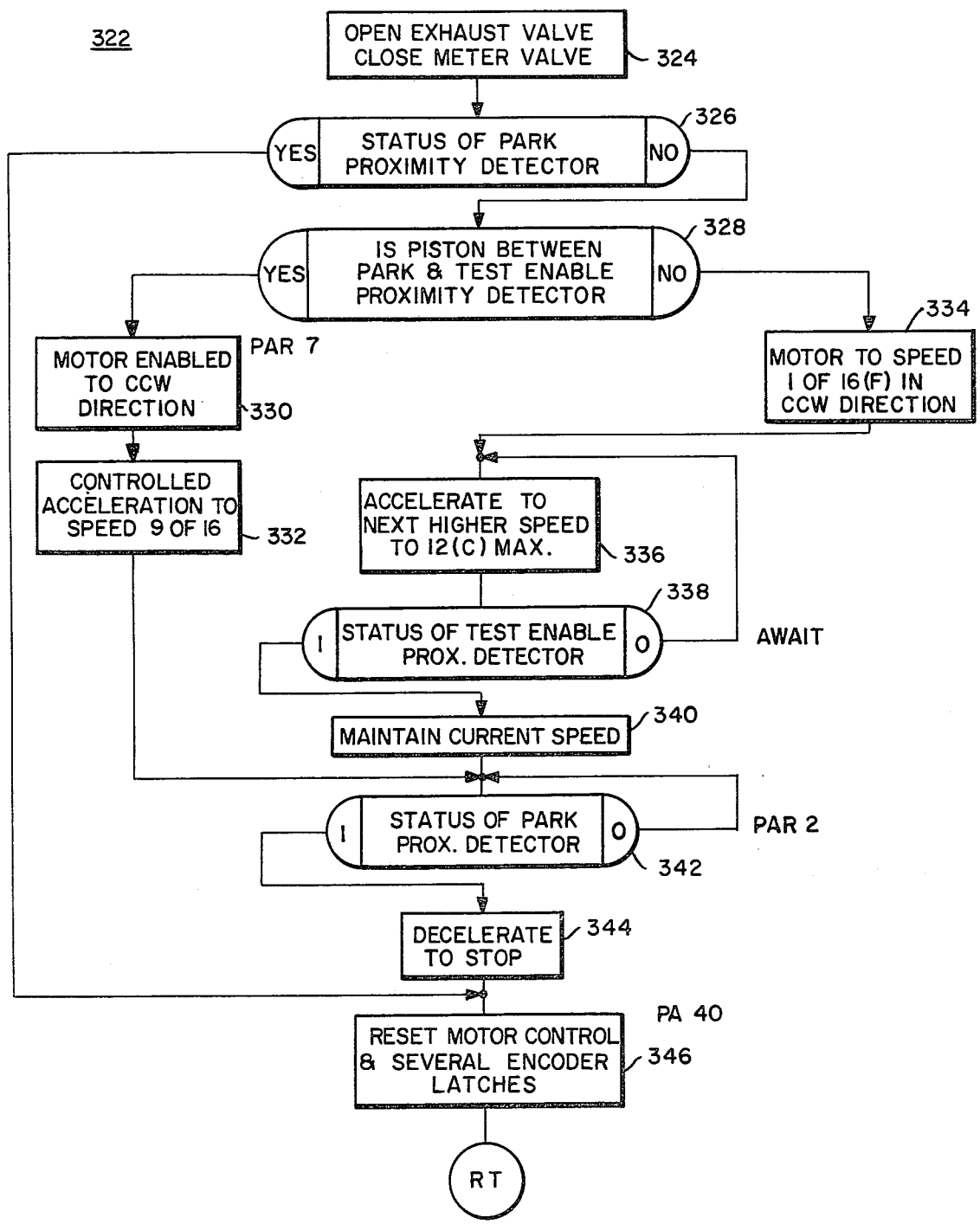

Referring now to FIGS. 6A and 6B, there is shown the initializing routine 300 wherein in step 302, a command is sent via the I/D bus 140 to cause the logic circuit 198a, as shown in FIG. 4E, to energize the standby lite 111e. In step 304, a scaling factor corresponding to a one cubic foot test is transferred from the RAM 126 to the programmable counter 174a within the interval timer 174 as shown in 4C, to appropriately scale the output of the meter encoder counter 179a whereby upon counting an appropriate number of pulses, e.g., 40,000, the logic circuit 177 outputs a pulse indicative that one cubic foot of fluid has been drawn through the meter 38. Next, in step 306, the interrupts associated with the CPU 120 are enabled to permit at any time later in the program the interrupts to be executed if the operator, for example, depresses the reset pushbutton 111f or the stop pushbutton 111g. Up to this point in the initialization subroutine 300, the interrupts associated with the pushbuttons 111f and 111g could not be enabled, but after execution of step 306, these interrupts are available to be serviced. Next in step 308, the circuitry shown in FIG. 4C as associated with the rotary meter encoder 40 is initialized. In particular, the logic circuit 170a is initialized, the interval timers 174 and 176 are cleared, the PI/O circuit 184 is disposed to a selected mode, the logic circuits 177 and 178 are reset and the programmable counters 174a and 176a are programmed with the factors to be entered therein to be counted down. In step 310, a command is sent via the PI/O circuit 196 to the logic circuit 194b to effect opening of the second exhaust valve 36. In particular, the proximity detector associated with the valve 36 is accessed and if the valve 36 is not open, the program will wait until the valve 36 is open. Further in step 310, the control circuitry associated with the servomotor 20 is initialized in that the speed of the servomotor 20 is set to zero, and a signal is applied to the servomotor 20 to maintain it in a stationary condition, while a logic circuit for sensing the torque of the servo-motor 20 is reset; the noted logic circuit is coupled to sense the control current flowing to the servomotor 20. In step 312, the logic circuit 192b is initialized to its static I/O mode with "hand-shaking" output capabilities, and the logic circuit 190b clears and prepares the associated printer 111a to begin printing. In step 314, the SDC 192a is programmed to insure that the data may be transmitted between the CRT terminal 112 and the CPU 120, and the logic circuit 190a of FIG. 4D similarly instructs CRT terminal 112 to clear and prepare itself for operation to receive data as well as to clear the CRT display. Next in step 316, any data stored in the A/D converter 166, as shown in FIG. 4B, is cleared and the multiplexer 163 is set to its first channel whereby the output of the transducer 51 is applied by the multiplexer 163 to the A/D converter 166. Step 318 clears the conditioning and interface circuit 130, and in particular clears any data stored in the A/D circuit 158, as shown in FIG. 4A, as well as to set the multiplexers 149 and 154 to their first channels whereby the output voltage of the prover temperature transducer module is applied via the multiplexers 149 and 154, and the operational amplifier 152 to the A/D circuit 158. In step 320, command signals are sent via the I/D bus 140, and the PI/O circuit 196, as seen in FIG. 4E, to cause the logic circuit 194b to actuate the solenoid 66 to open and then close the first or meter valve 34 and to actuate the solenoid 64 to close the second or exhaust valve 36. When it is desired to open or close one of the valves 34 or 36, the proximity detector associated therewith is interrogated and if it is determined to be in the desired position, no further action is taken; if, however, the valve is not in the desired position, the logic circuit 194b provides an output to actuate the associated pneumatic solenoid to cause the valve to open or close, as desired. In steps 322, the program continues to a subroutine as will be explained with respect to FIG. 6B whereby the piston 14 is returned to its park position, i.e., the lowermost position corresponding to the position of the proximity detector 50 as seen in FIGS. 1, 2A and 2B.

In FIG. 6B, the subroutine 322 for returning the piston 14 to its lowermost position is shown. In step 324, a control signal is sent via the I/D bus 140, the PI/O circuit 196 to cause the logic circuit 194b to close the first or meter valve 32. Next, step 326 determines the position of the piston 14 which may be anywhere from its lowermost to its topmost position as seen in FIG. 1; in particular, step 326 causes the PI/O circuit 196 to interrogate the logic circuit 194c to determine if the output of the proximity detector 50 as seen in FIGS. 1 and 2 is high or one, and if so, the subroutine moves to the final step 346 wherein a command is sent to the PI/O circuit 196 of FIG. 4E to condition the logic circuits 194a and 198b so that the motor control for the servomotor 20 is set for zero speed and further to set the interval timer 176 as seen in FIG. 4C to indicate that the output of the encoder is in its starting position, i.e., to set the counter 176a to zero preparing it to start generating one second sampling pulses. If the piston 14 is not at its park position, the subroutine proceeds to step 328, wherein a determination is made as to whether the piston 14 is disposed in an intermediate position, i.e., the abutment 92 is disposed between the proximity detectors 50 and 52 as shown in FIGS. 1 and 2A and B; if piston 14 is so disposed, the subroutine moves to step 330, whereby control signals are sent via the PI/O circuit 196 to set the logic circuit 194a to drive the servomotor 20 in a counterclockwise direction, and further in step 332, the speed is controlled to accelerate to a selected speed, i.e., the ninth of sixteen speeds. However, if step 328 determines that the piston 14 is in its uppermost position, i.e., its abutment 92 is above the proximity detector 52, step 334 sets the logic circuit 194a of FIG. 4E to set the lowest speed, i.e., speed 1 of 16 and to rotate the servomotor 20 in a counterclockwise direction, before proceeding to step 336 wherein the logic circuit 194a effects acceleration of the servomotor 20 to its next highest speed up to a maximum of its twelfth speed. At that point in step 338, the logic circuit 194c is accessed to determine whether the piston 14 is disposed at the proximity detector 52 and if not, step 336 accelerates the piston to its next higher speed until step 338 determines that the piston 14 is at the proximity detector 52. At that point, the logic circuit 194a maintains the current speed of servomotor 20, until in step 342, the park proximity detector 50 detects the presence of the piston 14 at which time, step 344 controls the logic circuit 194a to decelerate the piston 14 to a stop position before entering the step 346 wherein the motor control is set for zero speed.

If the operator has set the calibrate/run switch to its calibrate position, the program moves to the subroutine 400 as more fully shown in FIG. 7. Initially in step 402, a command is sent to the logic circuit 190a of FIG. 4D to clear the CRT terminal 112. Step 404 displays a suitable message upon the CRT screen indicating the meter prover system 10 has entered into a calibrate mode indicating, as shown in FIG. 7, the various parameters that may be so calibrated. Next, step 406 returns the cursor as displayed upon the CRT to its left-hand margin waiting for the operator to make a suitable entry. Next after operator entry via the keyboard of the CRT terminal 112, step 408 interrogates the keyboard to determine which of the possible keys has been depressed. For example, if it is determined that one of the sets of keys T and O, T and 1, T and 2, T and 3, T and 4, T and 5, T and 6, or T and 7 has been depressed, the subroutine moves to step 410, wherein a corresponding channel is selected by the multiplexer 149. Next in step 412, a select command signal is transmitted via the PI/O circuit 160 to the multiplexer 149, whereby the selected channel is connected via the multiplexers 149 and 154, the amplifier 152, to the A/D converter 158. Next, step 414 applies a convert signal to the A/D circuit 158 whereby in step 416 the temperature as measured is displayed. At this point, the operator can calibrate the selected temperature transducer module to provide a correct reading by adjusting the zero and span of the operational amplifier of the module, this procedure being repeated until an accurate reading is displayed upon the CRT. Though detailed explanation will not be given, it is realized that the similar keys P and 1, P and 2, and P and B may be also operator activated, whereby the gains of the operational amplifiers 161a, 161b, 161c of FIG. 4B may be similarly adjusted in order to give accurate readings. In similar fashion, the keys T and O, T and 1, T and 2, T and 3, T and 4, T and 5, T and 6, T and 7, may be depressed and their respective amplifiers and circuits may be adjusted to provide accurate readings. Upon pressing of the keys V and P, as determined by step 408, the routine moves via step 450 to step 452, whereby a command signal is sent via the PI/O circuit 168 of FIG. 4B to cause the multiplexer 163 to apply the voltage calibrate input signal V to the A/D converter circuit 166, which converts these inputs in step 454 to digital values. The voltage calibrate input signal is adjusted to set the zero and full scale values of the A/D converter 166, these values being appropriately displayed in step 456 upon the CRT terminal 112. In similar fashion if the V and T keys of the keyboard is depressed, the routine proceeds via step 442 to step 444, wherein the voltage calibrate input signal VT is applied to the A/D converter circuit 158 of FIG. 4A and its zero and full scale values may be similarly adjusted. If any other key is depressed upon the keyboard, step 408 branches via step 456 to step 458, wherein that character is rejected to return to the starting point of step 408 again.

The data input and retrieval subroutine as broadly shown in FIG. 5 as step or routine 500, is more fully explained with respect to FIGS. 8A to 8P, an overview of the routine 500 being shown in FIG. 8A. Initially, a command is given via the I/D bus 140 to the logic and driver circuit 198a of FIG. 4E to energize the standby light 111e. Next in step 504, which is more fully shown in FIG. 8C, a determination is made if a self-test is desired, and if so, that subroutine is executed. Next in step 506, it is determined whether it is desired to display the room termperatures, and if so, a display upon the CRT of the terminal 112 is made, as will be more fully explained with regard to FIG. 8H. In step 508, an examination of the keyboard is made to see if the operator wishes to recall data pertaining to previous meter accuracy tests and if any data is required, that data is displayed upon the CRT display; the subroutine 508 will be more fully explained with regard to FIG. 8J. In step 510, appropriate flags are set automatically to permit, at a later time during the meter test, the pressure and temperature parameters to be monitored and displayed; the subroutine for executing such display is more fully explained with respect to FIG. 8K. In step 512, the subroutine for setting the test volume desired and the manner in which it is entered into the programmable counter 174a of the interval timer 174 is set out in more detail with the subroutine as shown in FIG. 8L. Next, it is necessary for the operator to enter via the CRT terminal keyboard a select test flow rate or rates, as will be more fully explained with regard to the subroutine of FIG. 8M. In step 516, the operator sets the number of times to repeat a certain test; for example, the meter may be tested three times for a flow rate or for a selected volume and flow rate. The entry of the repeat commands is explained with respect to the subroutine of FIG. 8N. Thereafter, step 518 sends clear commands via the logic circuit 190a whereby any data stored in the buffers associated with the CRT terminal 112 are cleared. At this point, step 520 makes a decision as to whether the volume of the meter 38 is to be determined with the output of the proximity detector 27 or with the output of the rotary encoder 40. If the switch is set to a logic "zero", a flag is set in step 522 to conduct an encoder type test, whereas if the switch is set to a logic "one" position, a flag is set in step 524 to conduct the proximity detector type test.

Continuing the routine 500 as shown in FIG. 8B, the system obtains and displays upon the CRT the meter temperature and pressure, and the prover temperature and pressure as measured during the meter test, as follows. Next, step 528 displays, if instructed, upon the CRT data indicative of the pressure and temperature within the meter 38 and the prover 10. Once the test volume, either one cubic foot, one-half cubic foot, or one-fourth cubic foot, has been set by entry of the operator upon the CRT terminal 112, the entered value is decoded in step 530, the chosen value is displayed in step 532 by the CRT as: TEST VOL.=x CU. FT. Thereafter, the desired flow rate or rates that are entered upon the keyboard are decoded in step 534 and the chosen rates are displayed upon the CRT in step 536 as: FLOW RATES are QX, QX - - QX. In similar fashion in step 538, the number of repeats for any particular test(s) with respect to flow rates or volumes are decoded and in step 539, the selected number of repeats per flow rate or volume is displayed upon the CRT as: NO. OF TESTS PER FLOW RATE=X. At this point, a carriage return line feed instruction is carried out in step 540 whereby a cursor as placed by the CRT terminal upon the CRT is removed.

Figure 8D:
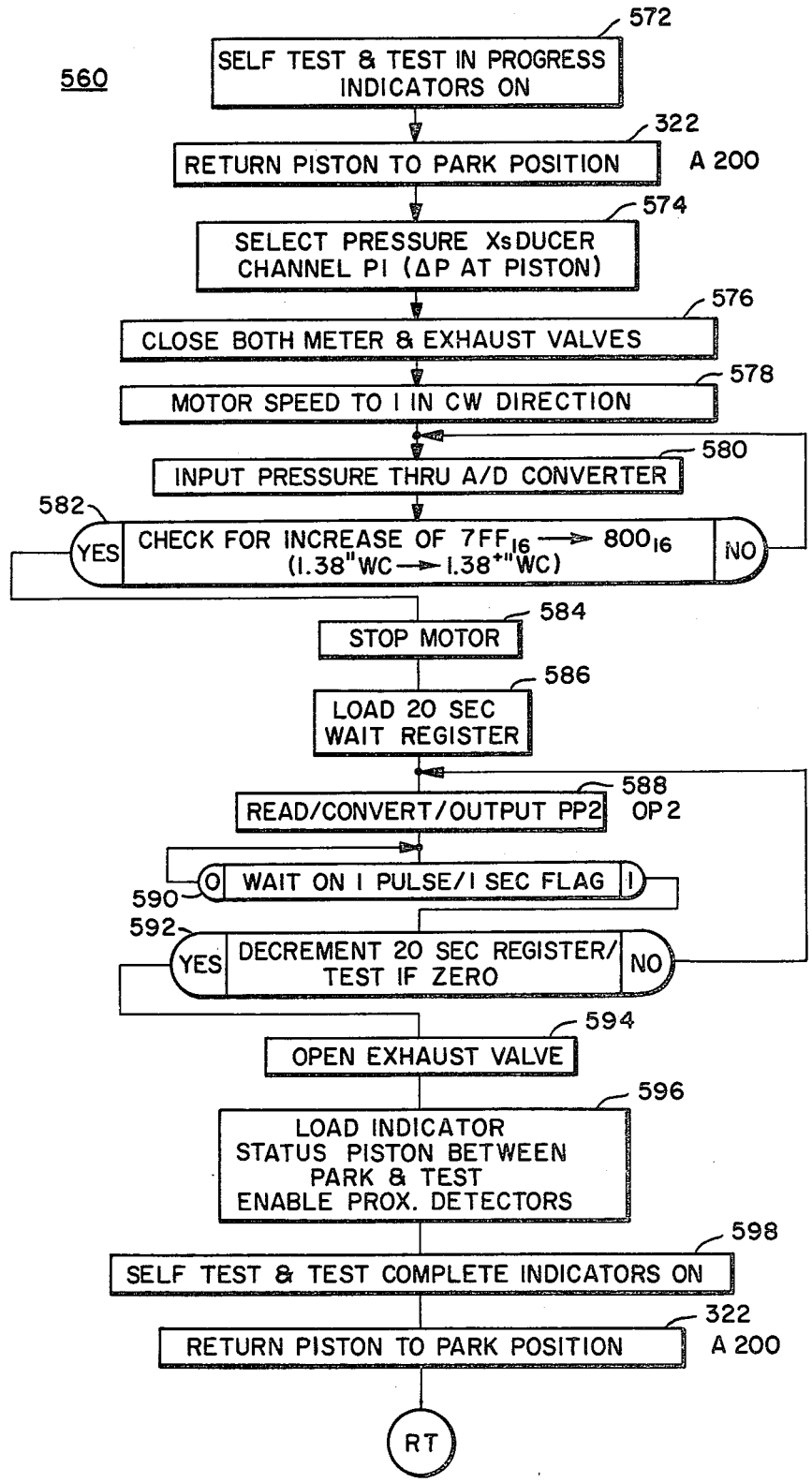
FIGS. 8A through 8P disclose in detail the flow diagram for reading out data stored within the computer system and to enter the conditions under which the meter prover system will test a given meter (the letters I and O are not used for clarity sake)

The subroutine 504 is more fully shown in FIG. 8C, wherein a desired self-test(s) is selected. Initially in step 542, the data storage buffers associated with the CRT of the CRT terminal 112 are cleared by commands generated by the logic circuit 190a. In step 544, the CRT displays, as shown in FIG. 8C, an indication of the various self-tests that may be conducted, e.g., volume V, leakage L, or NO; the operator selects one of these self-tests by depressing the appropriate key of the keyboard. In step 546, the cursors, as shown in FIG. 8C, are flashed to prompt the operator to respond to select the self-tests, whether volume V, leak L or NO. In step 548, the subroutine moves to the desired self-test dependent upon which key has been selected in step 544. If for example, the volume self-test V has been selected, a volume self-test sequence is output to the CRT in step 552 and the volume self-test is executed in step 554 as will be more fully explained with respect to FIG. 8E. If a leak test has been chosen, the subroutine moves through step 558 to provide a display upon the CRT indicating the selected test and to initiate the leak self-test, which is executed in step 560 as will more fully be described with respect to the subroutine of FIG. 8D. Next the subroutine determines in step 556 whether there is another input to be dealt with and the subroutine returns to step 546. If the operator pressed the escape key as determined by step 548, the subroutine exits via step 562 to the entry point 212 of the main diagram as shown in FIG. 5 wherein the program begins. If the operator strikes the N and O keys, as detected by the steps 548, the subroutine exits via step 566 and returns to the routine as shown in FIG. 8A to continue with the next step 506. If any other key is struck, the subroutine exits via step 568 to reject that character in step 570 and to return to step 548 to recognize another key.

The leak self-testing subroutine 560 is more completely shown with respect to FIG. 8D. The leak self-test is a test to provide an indication of the integrity of the prover system's seal. Initially in step 572, the logic circuit 198a in FIG. 4E energizes the self-test and test in progress lights 111b and 111c. Next, the subroutine 322 for returning the piston to its park position as explained above with respect to FIG. 6B, is executed. Next, a command signal is issued in step 574 via the PI/O circuit 168 to set the multiplexer 163 to receive the signal via the second channel from the pressure transducer 51 (pressure PP1). Next, the logic circuit 194b is commanded to apply actuating signals to the solenoids for effecting the closing of the first inlet and second exhaust valves 34 and 36. In step 578, a command is issued via the PI/O circuit 196 to actuate the logic circuit 194a of FIG. 4E to direct the servomotor 20 to drive the lead screw 18 in a clockwise direction at a relatively slow speed corresponding to "1". The servomotor 20 cannot be energized as directed by step 578, until the prohibition built into the program is defeated as by depressing a momentary switch (not shown) coupled to the logic circuit 194c, thereby permitting the operation of the servomotor 20 with both valves 34 and 36 closed. Normally, the servomotor 20 may not be operated if the valves 34 and 36 are closed, thus preventing possible damage to the piston seal. Next, an indication of pressure is input into the A/D converter 166 in step 580 and a check is made in step 582 to determine whether the pressure has increased by a certain amount as indicated by the data stored in the A/D circuit 166, i.e., has the vacuum increase exceeded 1.38 inches of water? If the vacuum has not increased to beyond 1.38 inches of water, the subroutine cycles back and repeats step 580. If the vacuum inside the chamber 28 has increased to beyond 1.38 inches of water, the subroutine moves to step 584 whereby a command is given through the PI/O circuit 196 to cause the servomotor 20 to stop. In step 586, a 20-second wait is loaded into a register within the RAM 126 and counted down to provide a time for leakage to occur in the chamber 28. Next, in step 588, a convert signal is applied to the A/D converter 166 of FIG. 4B, to determine the pressure now being sensed by the pressure transducer 51. In step 590, the subroutine waits for the one-second clock signal which is developed from the logic circuit 178 of FIG. 4C and is applied via the logic circuit 194d of FIG. 4E to decrement in step 592 the 20-second count placed in the register within the RAM 126. Step 592 determines whether this register in the RAM 126 has been decremented to zero, and if not, the subroutine returns to step 588, whereby for each second of a 20-second interval, the piston pressure as derived from the transducer 51 is obtained and is displayed upon the CRT thus providing a continuous monitor of the prover pressure so that the operator may determine whether there are any leaks within the chamber 28 during the 20-second test. The count decrementing continues until the register is zero as determined by step 592, at which time a command is issued in step 594 to cause the logic circuit 194b to actuate the solenoid to open the second exhaust valve 36. At this point, the position of the piston 14 is determined in step 596 by checking the status of the proximity detectors 50 and 52 by accessing the logic circuit 194c. At this time the test is complete and a command is issued to the logic circuit 190a to energize the test complete and self-test indicators. Finally, in step 322, the piston 14 is returned to its park position by the subroutine as shown in FIG. 6B, before returning to step 556 as shown in FIG. 8C.

Figure 8E:
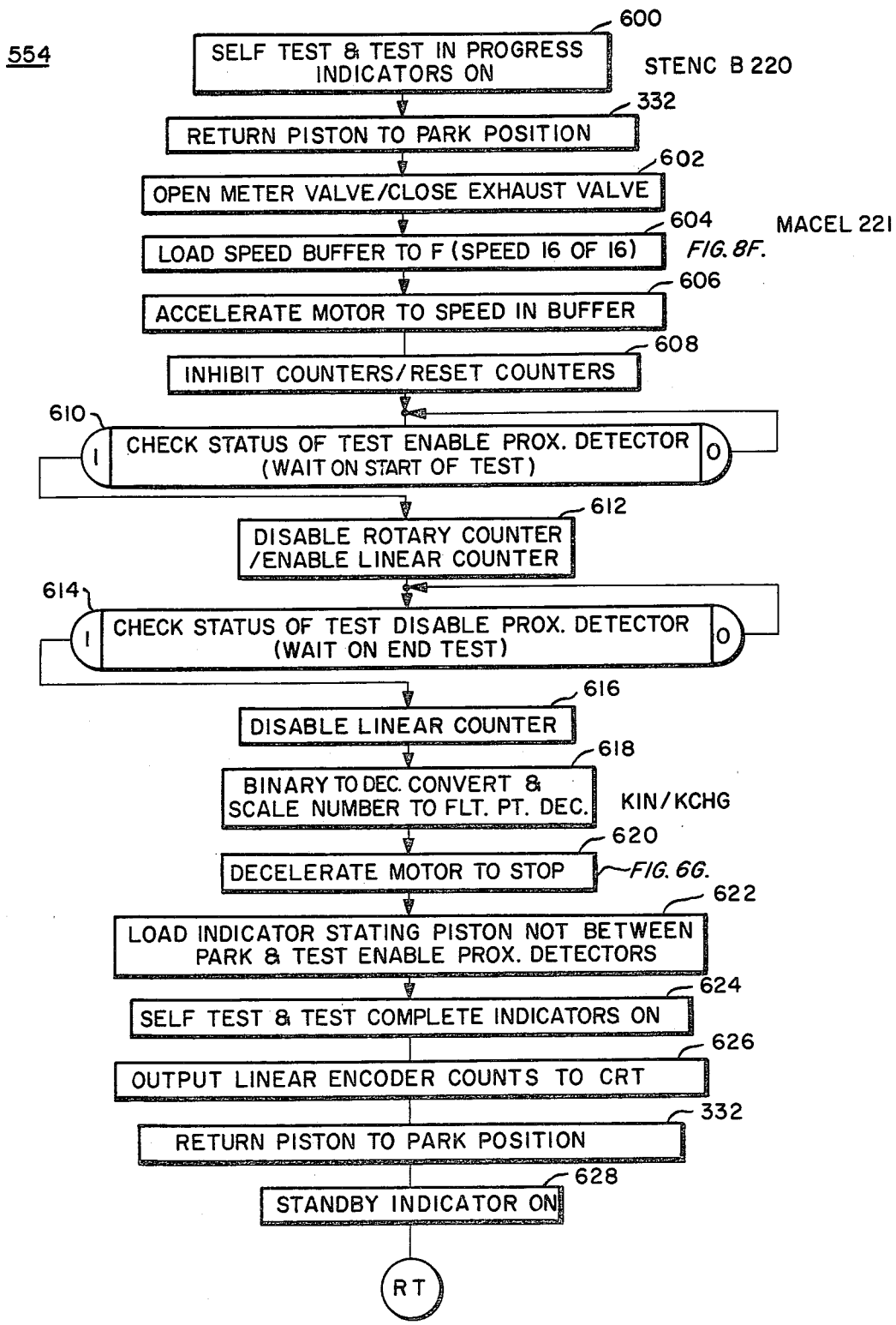

In FIG. 8E, the volume self-test subroutine 554 is shown in more detail. First, step 600 commands the logic circuit 198a to energize the self-test and test in progress indicators 111b and 111c. The volume self-test is entered to obtain an indication of the accuracy of the linear encoder 40. Step 332, as shown in FIG. 6B, returns the piston 14 to its park position before command signals are issued in step 602 via the logic circuit 194b to actuate the solenoids to open the first, inlet valve 34 and to actuate the solenoid to close the second exhaust valve 36. Next, a command is made in step 604 to load the speed buffer, i.e., an addressed portion within the RAM 126, with its maximum speed of 16. Next in step 606, the servomotor 20 is accelerated to the speed as stored in this buffer in accordance with the subroutine as will be discussed with respect to FIG. 8F. Next in step 608, the counter 182 and the programmable counter 174a as shown in FIG. 4C are inhibited and are reset to zero. Step 610 checks the status of the proximity detector 52 to determine whether the piston 14 has been drawn to its start-test position, and if not, the check is repeated until the piston 14 reaches this position. When the piston 14 has reached its start-test position, the program moves to step 612 wherein the programmable counter 174a is disabled and the linear counter 182 is enabled to count the linear encoder pulses as the piston 14 is drawn from the proximity detector 52 to proximity detector 54. In step 614, the status of the disabled proximity detector 54 is checked periodically until the piston 14 is disposed thereat, at which time the subroutine moves to step 616 to disable the linear counter 182. In step 618, the cumulative number or count from linear encoder counter 182 is transmitted via the PI/O circuit 184 to a designated location within the RAM 126. In step 620, a suitable series of command signals are transmitted to the logic circuit 194a whereby the servomotor 20 is decelerated to a stop condition as will be described with respect to the subroutine shown in FIG. 8G. Next in step 622, flags are set indicating that the piston 14 is not between the proximity detectors 50 and 52. In step 624, the logic and driver circuit 198a energizes the self-test and test complete lights 111b and 111d. At this point in step 626, the count of the counter 182 indicative of the travel of the piston 14 between the proximity detectors 52 and 54 is transferred from its location within RAM 126 to be displayed by the CRT of the terminal 112 and at the same time clears counter 182. Next, the piston 14 is returned to its park position by step 332 as shown in FIG. 6B, and step 628 causes the logic and driver circuit 198a to energize the standby light 111e, before returning to step 556 as shown in FIG. 8C.

Figure 8F:
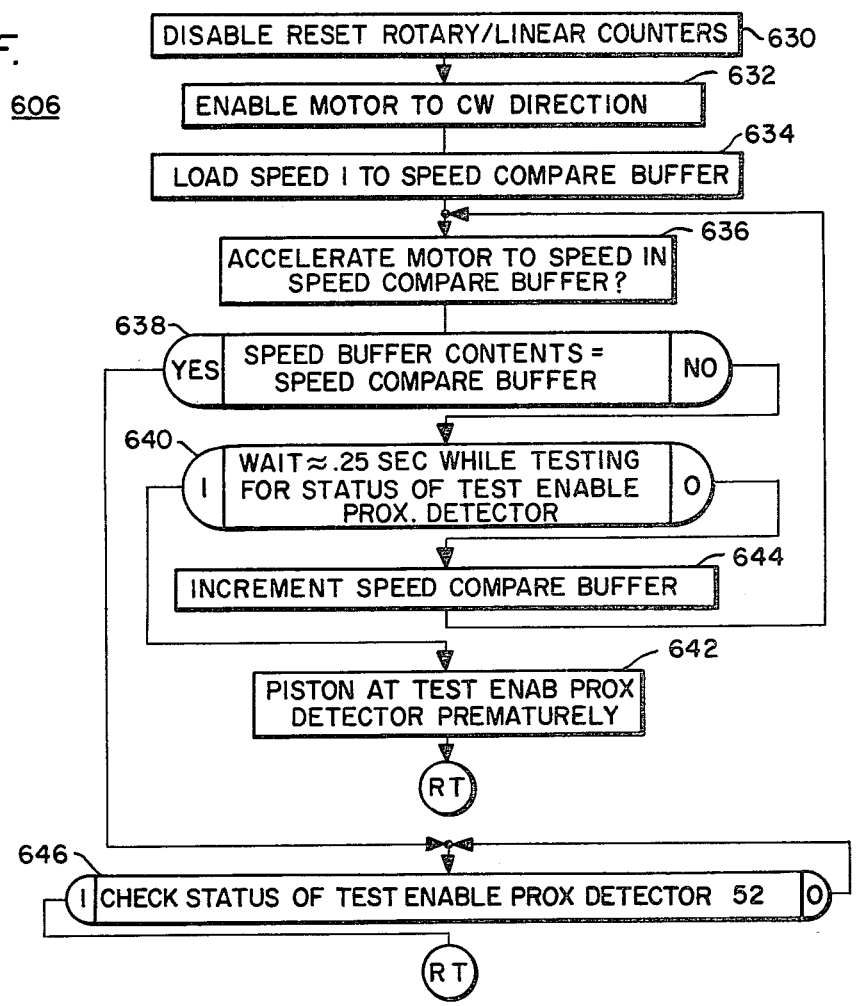

The accelerating motor subroutine generally indicated in FIG. 8E by the numeral 606 is shown in more detail in FIG. 8F, wherein in step 630 a command is sent via the I/D bus 140 to disable the counters 182 and 174a of FIG. 4C. Next, an enable command is sent to the logic circuit 194a by step 632 to command the servomotor 20 to rotate in a clockwise direction, thus raising the piston 14. At this point, speed 1, i.e., the lowest speed, is loaded into a speed compare buffer within the RAM 126 by step 634. In step 636, a command is given to the logic circuit 194a to increase incrementally the speed of the servomotor 20 and the actual speed as stored in the speed compare buffer of the RAM 126 is compared with the final designated speed stored in the speed buffer and if they are equal, i.e., the servomotor 20 has been accelerated to the desired speed, the subroutine moves to step 646. If not, step 640 implements a wait period of approximately 0.25 seconds before sampling via the logic circuit 194c the status of the proximity detector 52 and if not at this position, step 644 increments the desired speed by 1 before returning to step 636 in which the new speed is disposed in the speed compare buffer of the RAM 126. If the piston 14 has been driven into its intermediate position as detected by step 640, the subroutine moves to step 642, to set a flag indicating that the piston 14 has been prematurely brought to its intermediate position and the subroutine is returned to step 604, as shown in FIG. 8E. As seen in FIG. 8F, the normal operation is for the piston 14 to be accelerated to the desired speed and then to periodically test the output of the proximity detector 52. Upon determining in step 646 that the piston 14 has reached the start-test position as indicated by the output of the proximity detector 52, the subroutine branches to step 970 as will be explained with respect to FIG. 9E to assess and determine the occurrence of the rising edge of the next pulse A from the rotary meter encoder 40, whereby as will be explained further the meter test is begun by applying the pulse outputs derived from the rotary meter encoder 40 and the linear encoder 26 into their respective counters 174a and 182.

Figure 8G:
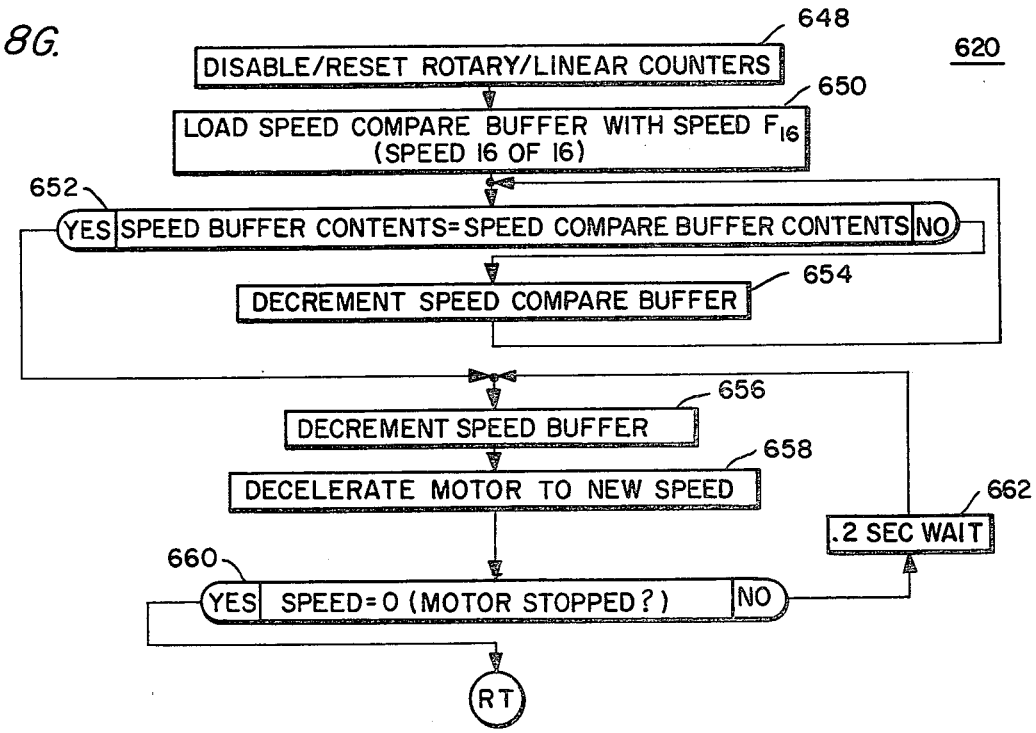

The subroutine to decelerate the servomotor 20 as indicated in step 620 of FIG. 8E is more fully explained with respect to the subroutine shown in FIG. 8G. Initially in step 648, the counter 174a and the counter 182 as seen in FIG. 4C for respectively receiving the rotary and linear encoder outputs are first disabled and then reset. In step 650, the load speed compare buffer within the RAM 126 is loaded with the speed, 16, i.e., the highest speed available. Next, in step 652, the actual speed as stored in the speed buffer of RAM 126, is compared with the high speed 16 as loaded into the speed compare buffer and if not equal, the speed as loaded into the speed compare buffer is decremented until the actual speed equals the speed loaded into the speed compare buffer, at which time the subroutine moves to step 656 and the speed as stored in the speed compare buffer is decremented. In step 658, a command is issued to the logic circuit 194a to decelerate the servomotor 20 to that new speed as disposed within the speed buffer of the RAM 126. In step 660, the actual speed is compared with zero, i.e., the servomotor 20 is stopped, and if not stopped, a 0.2 second wait or delay is implemented in step 662, before again decrementing the motor speed by steps 656 and 658. This process continues until the servomotor 20 has been brought to a stop, i.e., the speed equals zero at which time step 660 returns the subroutine to step 622 of FIG. 8E.

In FIG. 8H, there is shown the subroutine 506 for operator entry via the keyboard of the CRT terminal 112 of the selected temperatures within the prover room 106 to be displayed and the steps for so displaying them upon the terminal's CRT. It has been shown that knowledge of the temperature within the prover room 106 is helpful to investigate the level of control that may be exercised upon the meter prover 10 within the room 106. The subroutine as shown in FIG. 8H permits the operator to display any of the four room temperature outputs R0, R1, R2, and R3, from the temperature measuring devices shown within FIG. 2C as being disposed about the prover room 106. These temperatures can continue to be accessed and displayed upon the CRT of the terminal 112 until the operator terminates this action by pressing the N and O keys of the terminal's keyboard. Initially in step 664, a command is sent to the logic circuit 190a, whereby via the control input, the buffers associated with the CRT terminal 112 are cleared. Thereafter, step 666 causes the logic circuit 190a to display an indication, as shown in FIG. 8H, of the possible room temperature devices that may be accessed, i.e., the room temperature devices R0, R1, R2, or R3. If the operator does not desire to access and display any of these temperatures, the N and O keys are struck. In step 668, a carriage return line feed is output so that the cursor is flashed, indicating that an operator response is required. In step 670, an interrogation is made of which key is actuated via the logic circuit 190a and if the keys R and O corresponding to the room temperature device R0, are actuated, the subroutine moves via step 672a to step 674a whereby a control signal is issued via the I/D bus 140, PI/O circuit 160 to cause the multiplexer 149 to select its fifth input whereby a voltage representative of the room temperature transducer R0 is applied via the multiplexers 149 and 154 to the A/D converter 158. In step 676a, a convert signal is applied via the PI/O circuit 160 to the A/D converter circuit 158 to convert the analog input signal to binary digital data. Next, step 678a converts the binary digital data to decimal data and, step 680a converts that data to a floating point decimal format by processes well known in the art. In step 682a, the digital floating point decimal data is converted to digital F° in accordance with the formula:

$$\frac{[(RAW\ DIGITAL\ NUMBER)(7.326007326 \times 10^{-3})(9)]}{5} +$$

$$32 = F.°$$

In step 684a, suitable data is generated out from the logic circuit 190a to display the room temperature in degrees Fahrenheit upon the CRT display. In similar fashion, step 670 is able to detect the operator actuation of each of the pairs of keys corresponding to R0, R1, R2, and R3 room detectors to access these detectors as connected to the multiplexer 149 of FIG. 4A and to process and display the selected data upon the CRT display. In step 694, a determination is made as to whether another input is desired, and the process returns to the beginning of step 670. If the operator presses the escape key, the routine moves through step 686 to return via entry point 212 to the beginning of the program as seen in FIG. 5. If the N and O keys are depressed, the program proceeds to step 688 and returns to the next subroutine or step 508 as seen in FIG. 8A. If an extraneous key is depressed, the subroutine exits through step 690 and rejects the character in step 692 before returning to the beginning of step 670.

Figure 8J:
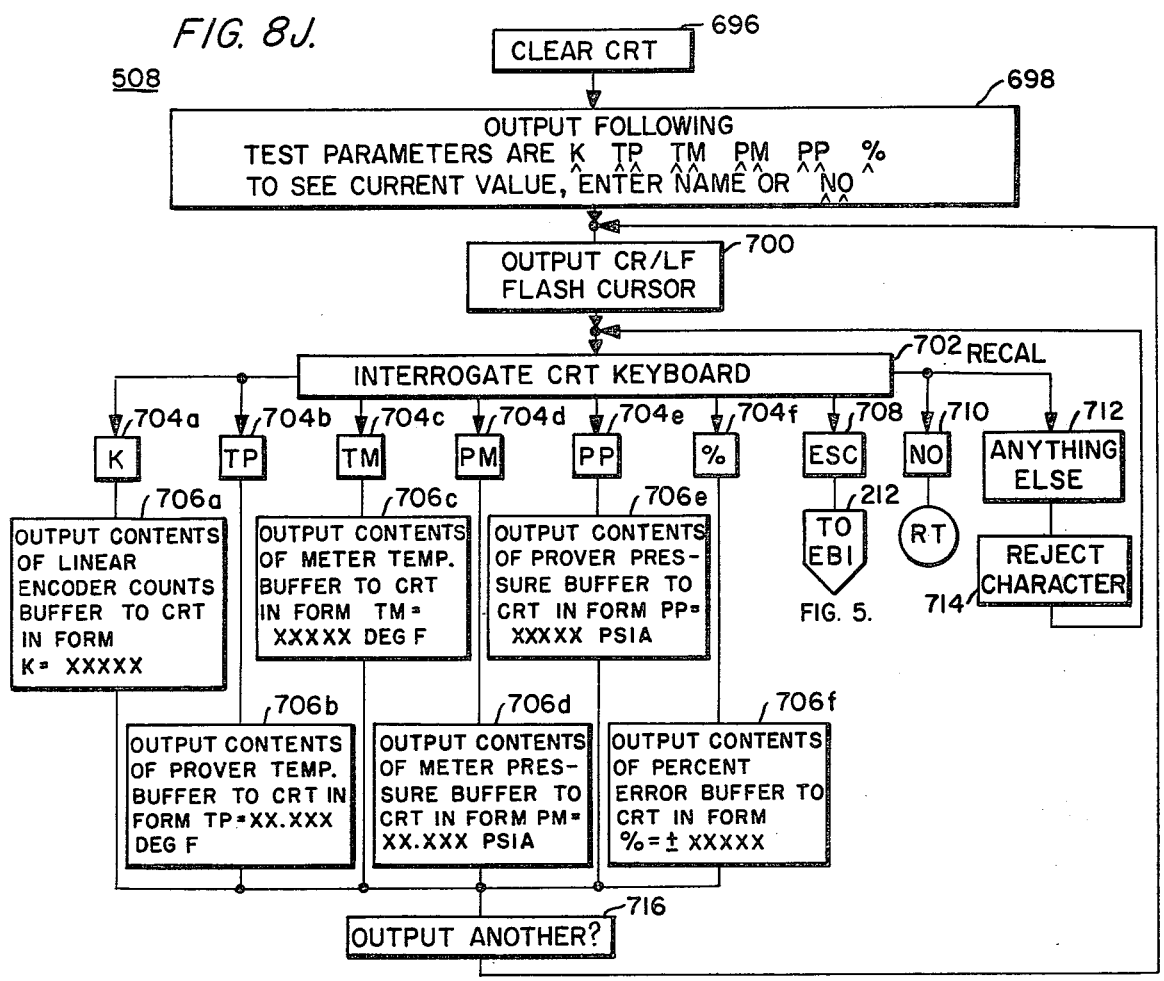
Figure 8L:
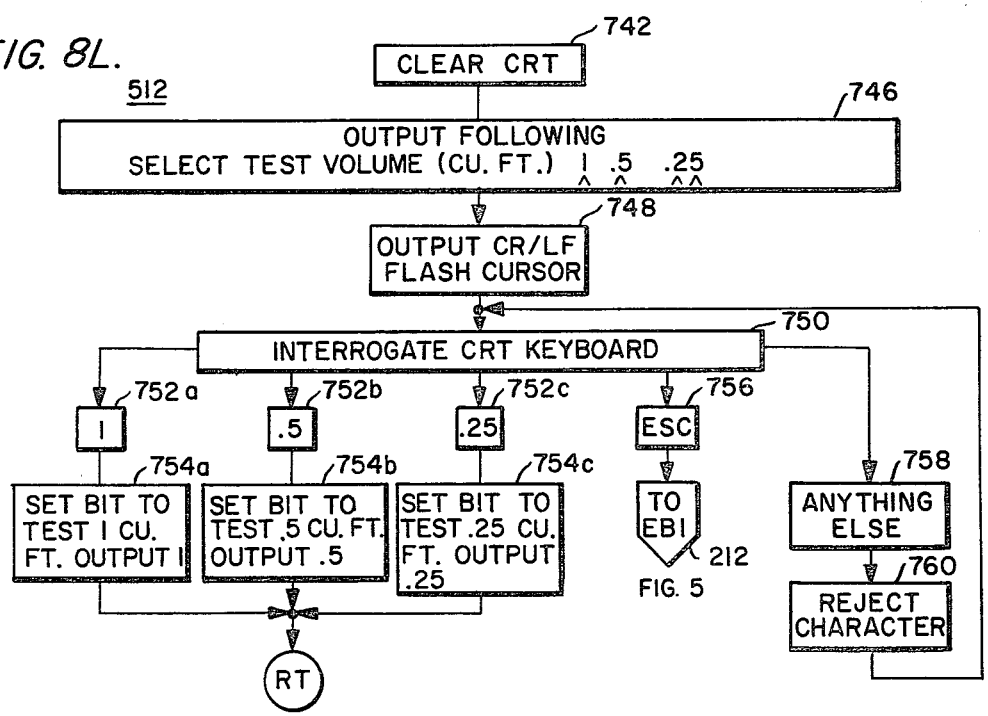

The subroutine 508 as generally indicated in FIG. 8A for sampling data from previously conducted tests is carried out by the subroutine 508 which is more clearly shown in FIG. 8J. The subroutine may be entered after a meter test has been executed. First, in step 696, the CRT, in particular its buffers and display, are cleared of previously stored data. Next, step 698 displays by actuating the logic circuit 190a to have the CRT display the possible test parameters that may be accessed and displayed, namely K, the number of counts from the linear encoder 26; TP, the temperature of the prover; TM, the temperature of the meter; PM, the pressure of the meter; PP, the pressure of the prover; and the percentage of error from the previous test. If none of these values are desired to be displayed, the operator may depress keys N and O corresponding to NO at which time the program advances to the next step. In step 700, the cursor is flashed indicating to the operator to select one of these parameters or NO by pressing the corresponding key. In step 702, if the linear encoder counts are selected by depressing the key K, the subroutine branches through step 704a to step 706a, whereby the count of the linear encoder register within the RAM 126 is accessed and read out and applied via the logic circuit 190a to be displayed upon the CRT. In similar fashion, if the keys corresponding to the temperature of the meter prover are actuated upon the keyboard by the operator, the process proceeds from step 702 via step 704b to step 706b wherein the contents of the prover temperature buffer, a designated location within the RAM 126, is transferred from the RAM 126 to be displayed upon the CRT. In similar fashion, each of the meter temperature TM, the prover temperature TP, the prover pressure PP, or the meter pressure PM may be similarly accessed from a corresponding location within the RAM 126 and displayed upon the CRT. Also the percentage of error of the difference between the standard volume as drawn by the prover system 10 and that actually measured by the meter 38 is calculated with respect to the standard volume and may be likewise displayed upon the CRT. If a second or further key has been pressed, step 716 returns the subroutine to the beginning of step 700. If the escape key has been depressed, the subroutine moves through step 708 to exit via entry point 212 to the beginning of the program as shown in FIG. 5. If any extraneous key is depressed, the routine proceeds through step 712 to reject the mistaken character in step 714 before returning to the beginning of step 702. After the operator has observed any and all parameters that he desires to observe upon the CRT, he presses the N and O keys whereby the program returns to the next step or subroutine.

Routine 510 as generally shown in FIG. 8A is capable of accessing and displaying the parameters as are automatically measured and monitored during the course of a test, and is shown in greater detail in FIG. 8K. First in step 718, the buffers associated with the CRT are cleared, before steps 720, 722, 724, and 726 set flags in appropriate locations within the RAM 126 to access the prover and meter temperatures and the meter and prover pressures. Thus, the flags are set to permit display upon the CRT of these parameters automatically, and thereafter the routine 510 returns to step 512 as shown in FIG. 8A.

Step 512, as generally shown in FIG. 8A, for setting the desired volume to be drawn through the meter 38 is more fully explained with respect to the subroutine shown in FIG. 8L. Initially, the CRT terminal 112 is cleared in step 742, before in step 746 displaying upon the CRT the possible volumes, e.g., one cubic foot, 0.5 and 0.25 cubic feet, that may be selected by the operator to be drawn through the meter 38 to be tested. In step 748, the cursor is flashed to prompt the operator to make his volume selection. Upon actuation by the operator of the key corresponding to each of the selectable volumes, the subroutine 512 moves to enter the corresponding volume. For example, if the appropriate key is depressed indicating a desire to enter a value corresponding to one cubic foot, the subroutine moves via step 752a to step 754a wherein the scaling factor corresponding to one cubic foot is set in a known position in the RAM 126. The scaling factor will be subsequently transferred from this RAM location to the rotary encoder counter 174a. After selection of any of the desired test volumes, the subroutine returns to the next step 514 as shown in FIG. 8A. If the escape key is selected, the subroutine moves through step 756 to return to the main program via entry point 212. If a wrong key is accidentally depressed, the subroutine moves through step 758 to reject that entered character in step 760 before returning to the beginning of step 750.

Figure 8M:
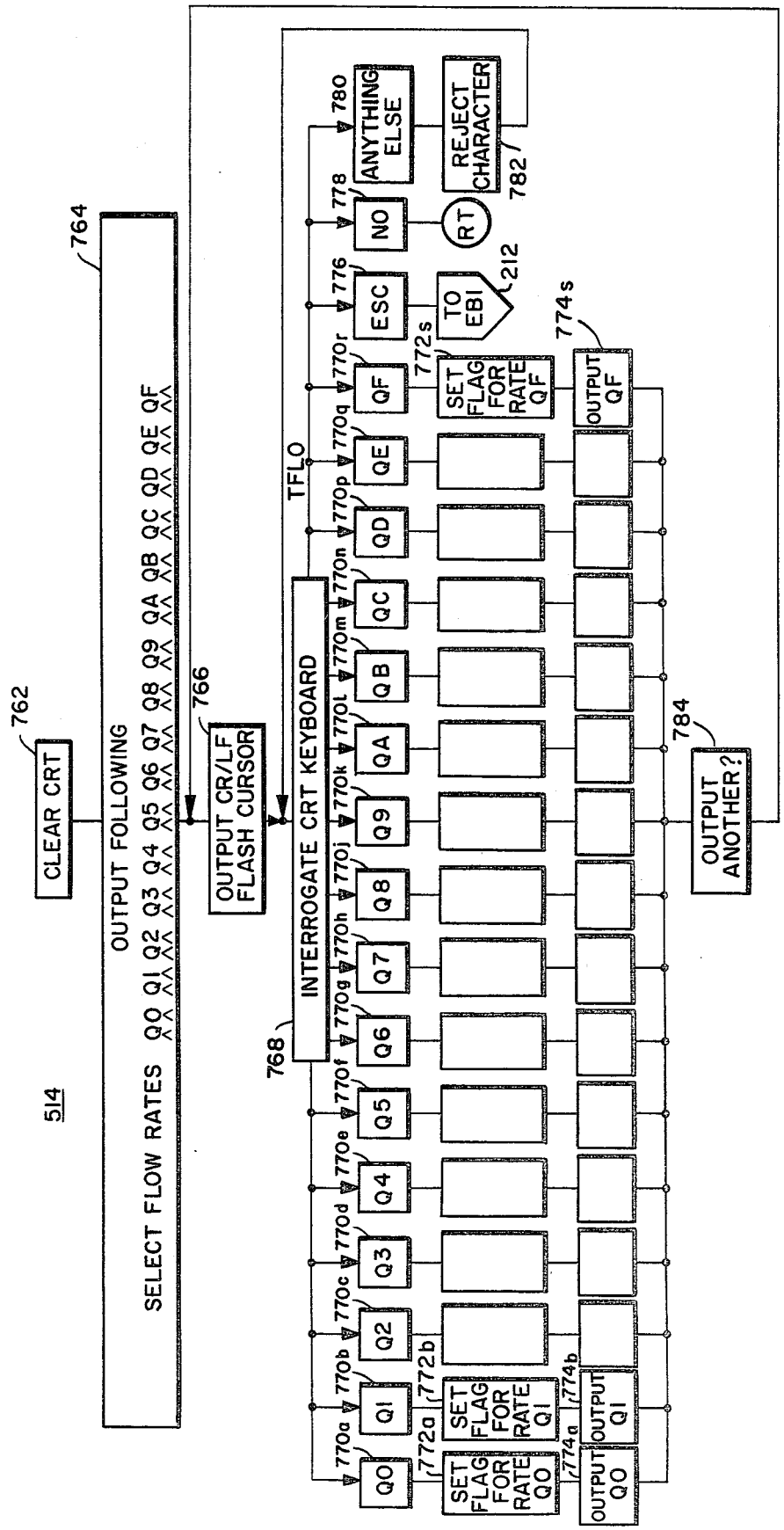

Next in the program is step or subroutine 514 wherein the desired flow rate at which the fluid is to be drawn through the meter 38 is set; as explained above, the selected flow rate in turn determines the speed at which the servomotor 20 is controlled to rotate and raise the piston 14 as shown in FIG. 1. Referring now to FIG. 8M, step 762 initially clears the buffers associated with the CRT terminal 112 and in step 764, the possible flow rates from Q0 to QF are displayed upon the CRT, it being understood that Q0 corresponds to a minimum flow rate, e.g., 20 cubic feet per minute, and QF corresponds to a maximum flow rate, e.g., 400 cubic feet per minute. Step 766 causes the cursor to flash on and off to prompt the operator to make his selection of flow rate. In step 768, an interrogation is made of the keyboard to determine which key the operator has depressed and if for example, the flow rate Q0 is depressed, the subroutine exits via step 770a to step 772a wherein the flag for the particular rate Q0 is set in a designated location within the RAM 126. Next, step 774a causes the selected flow rate Q0 to be displayed upon the CRT; then, the system returns with the response of "ANOTHER?" and flashes the cursor to indicate that a user response is required. If a further rate is to be also tested, step 784 returns the routine to the beginning of step 766 whereby a second and perhaps further flow rates may be tested within a single set of tests. If the operator depresses the escape key, the routine moves through step 776 and entry point 212 to the main program as shown in FIG. 5. If a wrong key of the keyboard of the CRT terminal 112 is depressed, the routine moves through step 780 to reject the incorrect character in step 782 before returning to the beginning of step 768. If no further flow rates are to be selected to test the meter 38, the operator presses the N and O keys, whereby the routine returns via step 778 to the next step 516 as shown in FIG. 8A.

Step or routine 516 for setting the number of repeat tests that is to be set for each of the selected flow rates may be entered via the operator keyboard in a manner more specifically shown in FIG. 8N. Initially, the buffers associated with the CRT terminal 112 and the display screen of the CRT are cleared in step 786, before the possible number of tests or retests for flow rate, i.e., 1, 2, or 3, is displayed upon the CRT. Step 790 flashes the cursor on the CRT to prompt the operator to make his selection of the flow rate. Step 792 detects which of the terminal keys is depressed and if for example, a key is depressed indicating only one test per flow rate is to be conducted, the subroutine proceeds through step 794a to step 793a, wherein the output "1" is displayed upon the CRT before returning to the next step 518 of the main program as seen in FIG. 8A. If two tests are to be made, the subroutine exits via step 794b to step 793b wherein a command is made to copy the flow rate flags for one repeat and in step 796b to set a flag for a second repeat in a designated area of the RAM 126. In step 796b, an indication of 2 is displayed upon the CRT. If a selected test is to be repeated three times, the subroutine carries out a similar series of steps 794c, 793c, and 796c. If an incorrect character is depressed upon the keyboard, the routine moves through step 795 to reject the incorrect character in step 797 before returning to the beginning of step 792. If the operator presses the escape key, the routine exits via step 798 to entry point 212 whereby a return is made to the main program as shown in FIG. 5.

Subroutine 528, as generally shown in FIG. 8A, displays temperature and pressure data as the meter test is being conducted, as more fully shown by the subroutine illustrated in FIG. 8P. Initially, the CRT cursor is moved to a home position and the CPU 120 addresses that location within the RAM 126 where the TM flag has been set automatically during the previous subroutine 510. Since the TM flag has been set, the content of the meter temperature buffer, i.e., an addressable location within the RAM 126, is transferred via the logic circuit 190a to be displayed upon the CRT as indicated in step 802. After the display, the subroutine moves to step 806 which examines that location of the RAM 126 where the TP out flag indicating that there was an indication to monitor during a test the prover temperature TP has been set, and the output of the prover temperature buffer is transferred to be displayed upon the CRT. After such display, the subroutine moves to step 810, which accesses the previously set meter pressue PM flag and outputs the content of the pressure buffer, i.e., a known location in the RAM 126 to be displayed upon the CRT. After display, step 814 accesses the previously set PP out buffer flag, and the contents of the prover pressure buffer is transferred to be displayed upon the CRT. After the display of such information, the subroutine returns to the next step 530 as indicated in FIG. 8B. The values output at this time correspond to the values currently stored in the RAM buffers. If a test has not yet been run, zeroes are initially stored in the RAM 126 and will be output and displayed as TM-0.0 Deg. F. This step formats the display so that when a test begins, the system will replace the zeroes with appropriate numbers.

The execution of the tests of the meter 38 by the meter prover system 10 as well as the output of the results to the printer and CRT is performed by the routine generally shown in FIG. 5 by the numeral 900, as will now be explained in greater detail with respect to FIGS. 9A to 9P. In FIG. 9A, there is shown a high level diagram of the various steps or subroutines that are necessary to effect the test of the meter 38 starting with step 322 as shown above with respect to FIG. 6B to return the piston 14 to its park position, i.e., its bottommost normal position with respect to the cylinder 12 as shown in FIGS. 1 and 2A. Next, routine 902, as will be more fully explained with respect to FIG. 9B, determines the type of test, i.e., will the volume measured by the meter 38 be determined by the proximity detector 27, or by the rotary optical encoder 40 as shown in FIG. 4C, and the particular volume that is to be drawn through the meter 38; in particular step 902 loads the appropriate volume factor into the programmable counter 174a as well as to store the appropriate divisor in the buffer EORP of the RAM 126. Next, step 904 determines for the condition that one test per flow rate is to be made, the flow rate to be executed for that test; in particular the system addresses that location where the flow rate flags are stored within the RAM 126 to determine the appropriate flow rate to be used in the particular test. If the flow rate is so located, the routine moves to step or routine 906a to determine which flow rate is to be executed and to obtain that flow rate and execute that subroutine as more specifically shown in FIGS. 9C and D. If it is decided in step 908 that two tests for each flow rate are to be conducted, the routine addresses those areas in the RAM 126 for the corresponding flow rate flags and executes the tests at the programmed flow rate in step 906b. If three tests per flow rate are called for, it is first determined in step 912 whether the flow rate for the three corresponding rates have been entered, and if yes, step 906c calls the flow rate flags from the designated locations within the RAM 126 and executes the tests of the meter 38 at these flow rate(s). Thereafter, the command is sent to the logic and driver circuit 198a to energize the standby indicator before returning to step 216 as shown in FIG. 5.

Determining of the test type and volume to be measured is generally shown as subroutine 902 in FIG. 9A, and will be more fully explained with respect to FIG. 9B wherein initially the programmable counter 174a and the counter 182, as shown in FIG. 4C, are disabled and reset in step 918. At this point, in step 919, the status of the encoder/proximity detector switch is determined to decide whether the fluid volume passing through the meter 38 is to be determined by the output of the proximity detector 27 or by the output of the rotary encoder 40. If the output of the rotary encoder is chosen, the subroutine moves to step 920 to test for the presence or status of the one cubic foot flag within the designated location of the RAM 126, and if present, that factor which is equivalent to one cubic foot of output pulses from the output of the optical rotary encoder 40, is stored by step 922 in the RAM EORP, i.e., a designated location of the RAM 126, and the factor number is loaded into the programmable counter 174a. At this point, the subroutine moves to return to the next step 904 of the program shown in FIG. 9A. If the one cubic foot flag is not present, step 924 checks the status of the one-half cubic bit or flag and if present as determined by step 924, the programmable counter 174a as shown in FIG. 4C is loaded by step 926 with an equivalent count and a corresponding factor is stored in the EORP buffer location of the RAM 126, before returning to step 904 of FIG. 9A. If the one or one-half cubic foot flags are not present, step 928 looks for the presence of the one-fourth cubic foot flag as previously entered by the operator into its system RAM 126, and step 930 loads the programmable counter 174a with a count corresponding to one-fourth cubic foot, and a corresponding factor is stored in the EORP buffer location of the RAM 126. If no flag is present corresponding to one cubic foot, one-half cubic foot, or one-fourth cubic foot, step 932 automatically determines that a one cubic foot test should be run to test the meter 38.

If on the other hand, step 919 determines that the output of proximity detector 27 is to be used to measure the fluid flow through the meter 38, the subroutine moves to step 934 wherein the status of the one cubic foot flag within the RAM 126 is checked and if set, the programmable counter 174a of FIG. 4C is set by step 936 with a binary number equivalent to one cubic foot of volume and a factor, normally to 8, is set in the EORP buffer location of RAM 126 before returning to the main program. If the one cubic foot flag has not been set, the subroutine moves to step 938 wherein a check of the status of the one-half cubic foot flag is made and if present, a factor corresponding to one-half of one cubic foot, normally 4, is stored in step 940 in the programmable counter 174a and also within the EORP buffer location of the RAM 126, before returning to the main program. If the one-half cubic foot flag has not been set, the subroutine moves to step 942, wherein the status of the one-fourth cubic foot flag is checked and if present, a factor equivalent to one-fourth of a cubic foot, normally 2, is entered by step 944 into the programmable counter 174a and in the EORP buffer location of RAM 126 before returning to the main program. If none of the one, one-half, or one-fourth cubic foot flags have been set, the subroutine automatically in step 946 sets the meter prover system 10 to conduct a test drawing one cubic foot of fluid through the meter 38.

Figure 9D:
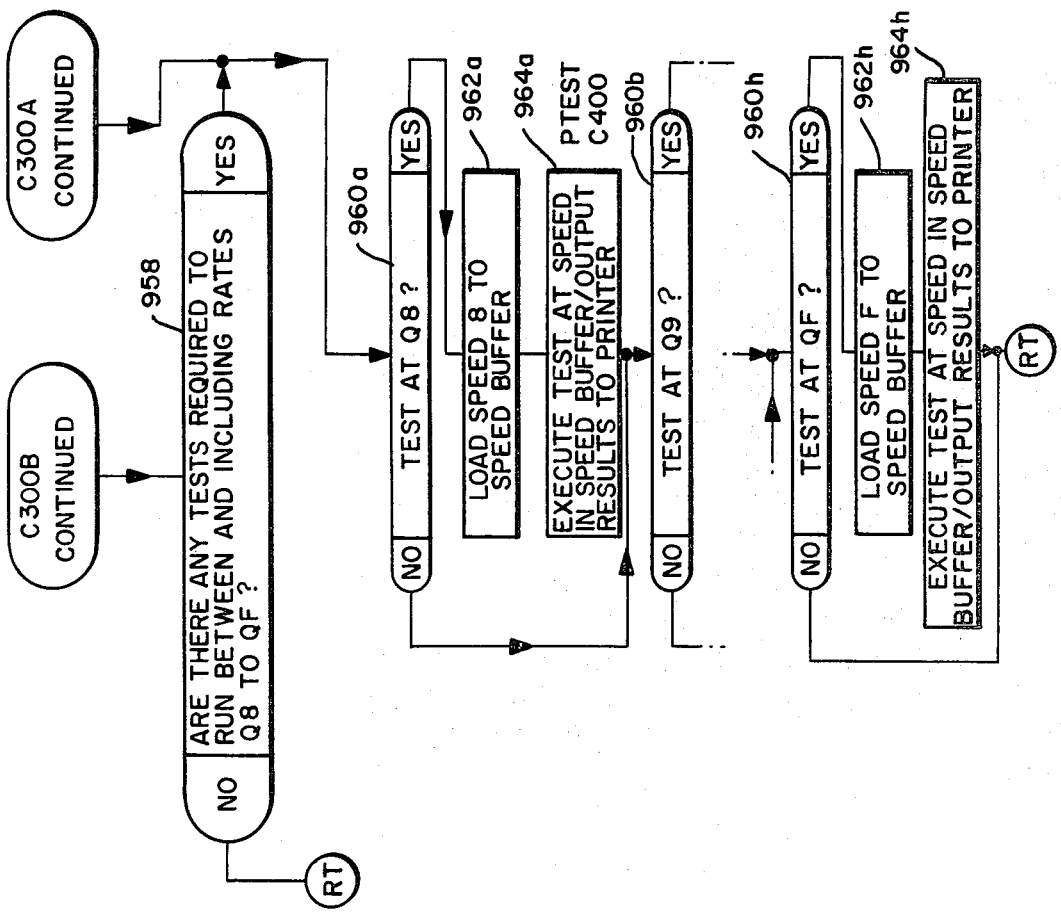
FIGS. 9A to 9Q show the steps effected by the computer system of FIG. 3 to carry out the various tasks and to provide manifestations thereof (the letters I and O are not used for clarity sake)
Figure 9C:
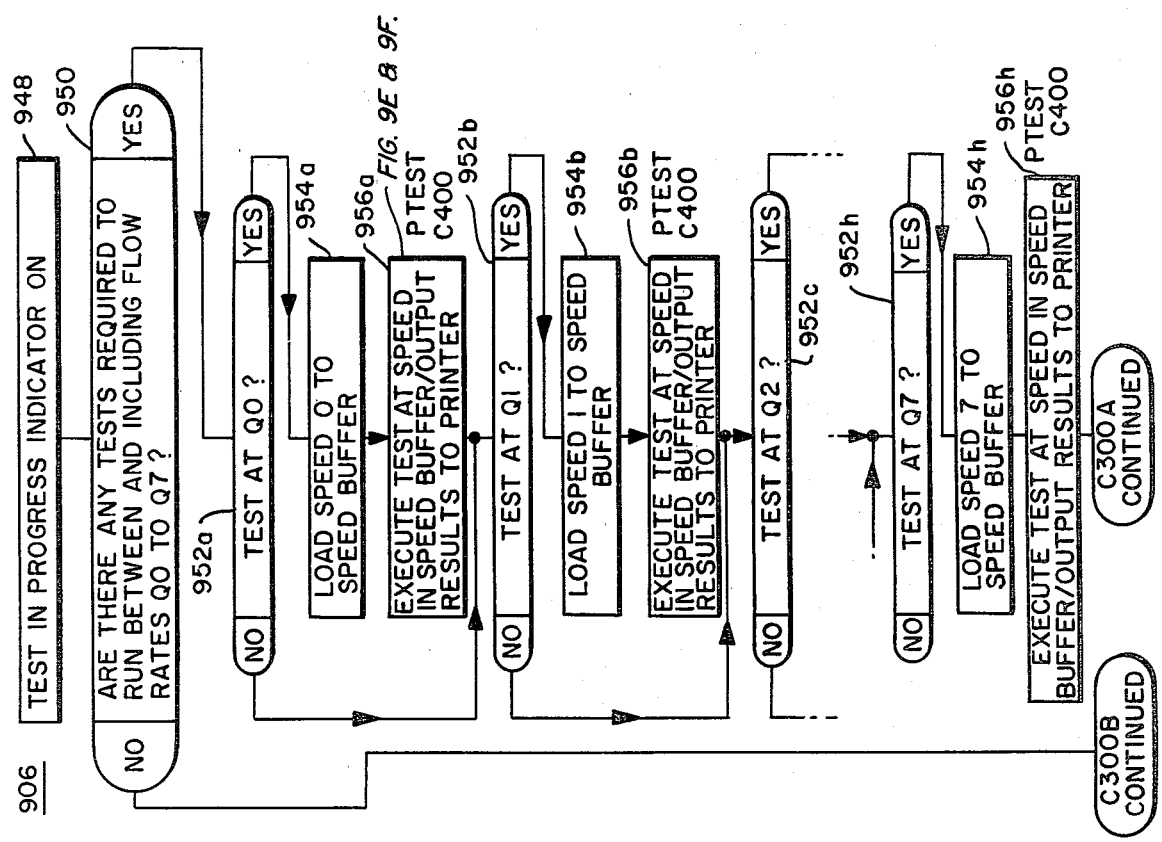

The next routine 904 and the following routines, as shown in FIG. 9A are a series of steps to determine which of the flow rates are to be conducted and how many times each flow rate is to be tested. Referring now to FIG. 9C, step 948 actuates the logic and driver circuit 198a to energize its test in progress light 111c before moving to step 950 to determine whether the fow rate(s) as stored in the RAM 126 to be conducted is one of Q0 to Q7 and if so, the routine moves to step 952a wherein it is determined whether the test is to be conducted at the Q0 flow rate and if yes, a speed 0 is loaded in step 954a into the speed buffer location of RAM 126 and thereafter in step 956a, the meter prover system 10 executes the test of the meter 38 at that selected flow rate and outputs the results to the printer, as will be more fully explained with respect to FIGS. 9E and F. However, if the test is to be conducted at the Q1 rate, a similar set of steps 954b and 956b are conducted whereby the speed 1 is loaded and is executed in these respective steps. Similar sets of steps 952c to 952h, 954c to 954h, and 956c to 956h are conducted whereby corresponding flow rates are entered into the speed buffer and are executed. If the decision in step 950 was no, the routine proceeds immediately to step 958 are shown in FIG. 9D, wherein a decision is made by examining the flags disposed in the designated areas of the RAM 126 to determine whether a flow rate of Q8 to QF has been selected and if yes, the subroutine continues to step 960a; if not, the subroutine returns to the next step 908 as seen in FIG. 9A. Step 960a determines whether a meter is to be tested at the flow rate corresponding to the flow rate Q8 and if yes, step 962a loads a speed 8 into the speed buffer of the RAM 126 and at that point executes by step 964a the testing of the meter 38 by the meter prover system 10 at that specific servomotor speed and flow rate. In similar fashion, steps 960b to 960h, 962b to 962h, and 964b to 964h are conducted whereby tests at the various flow rates and corresponding motor speeds are conducted before returning to the next step which may be step 908 or 912 to determine the number of tests per flow rate that are to be conducted.

Figure 9E:
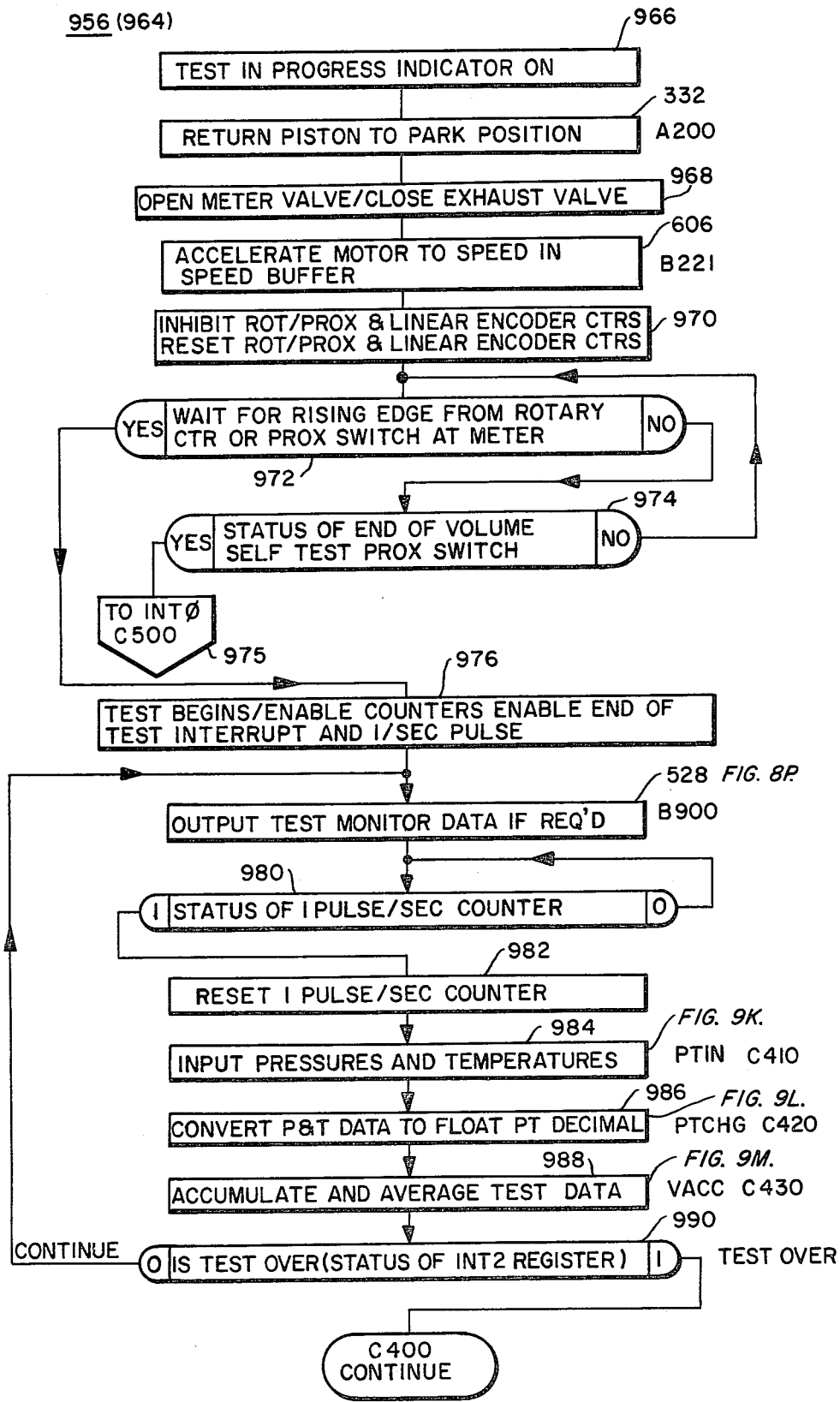
Figure 9F:
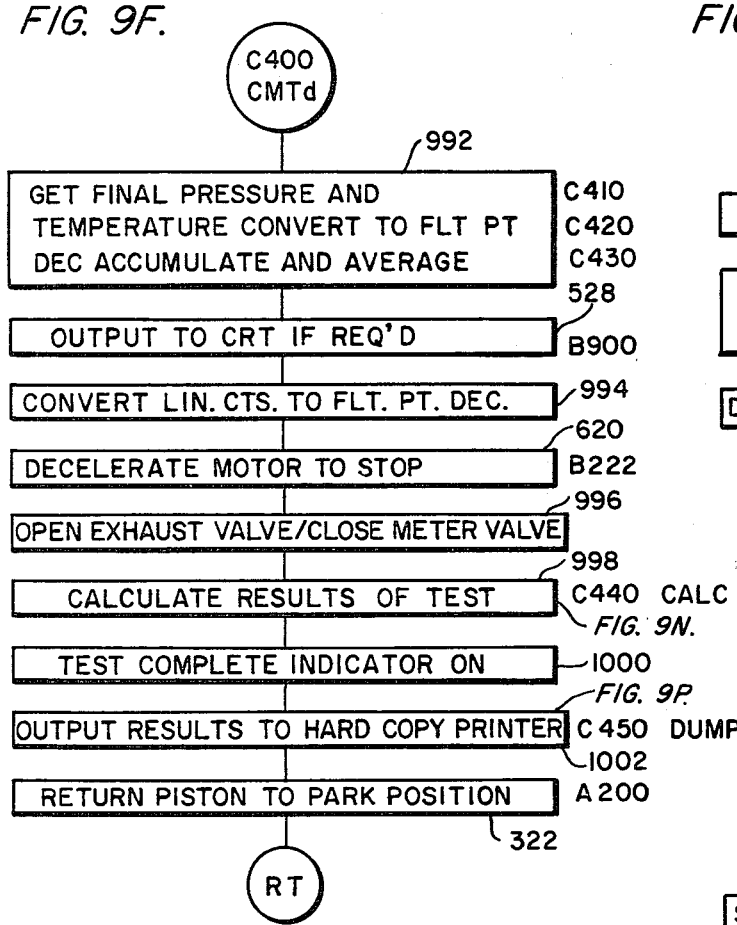
Figure 9H:
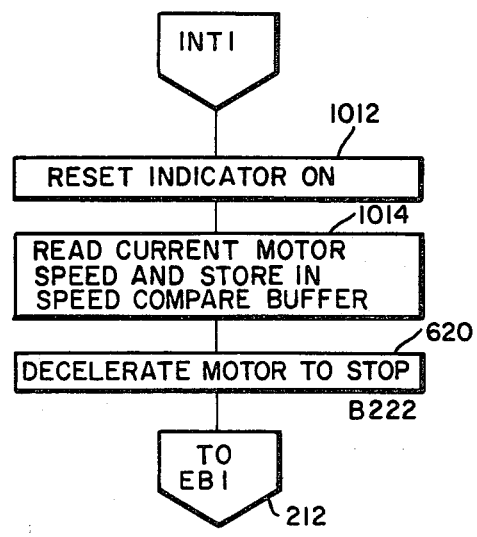
Figure 9G:
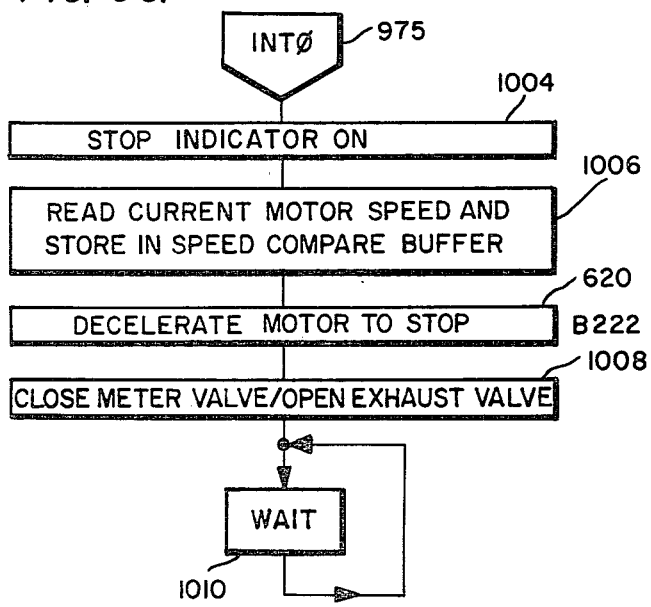
Figure 9J:
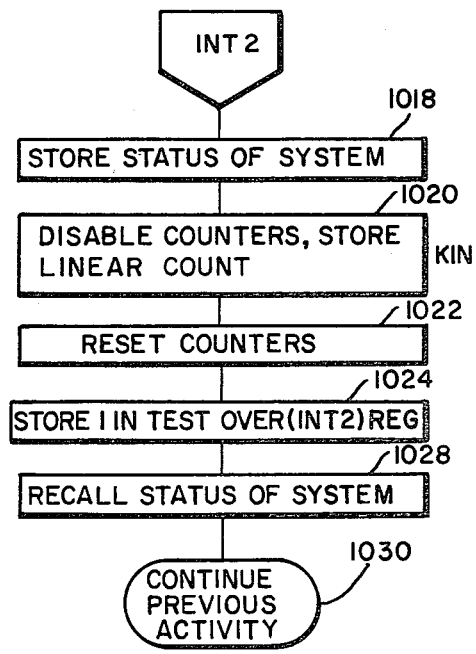
Figure 9L:
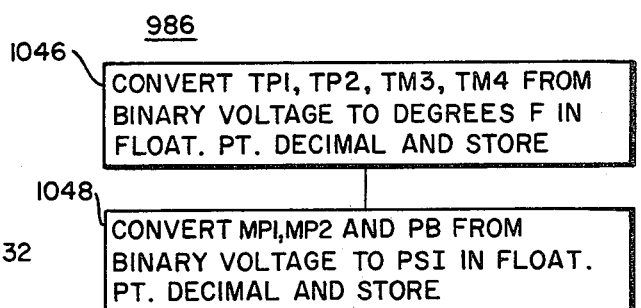
Figure 9M:
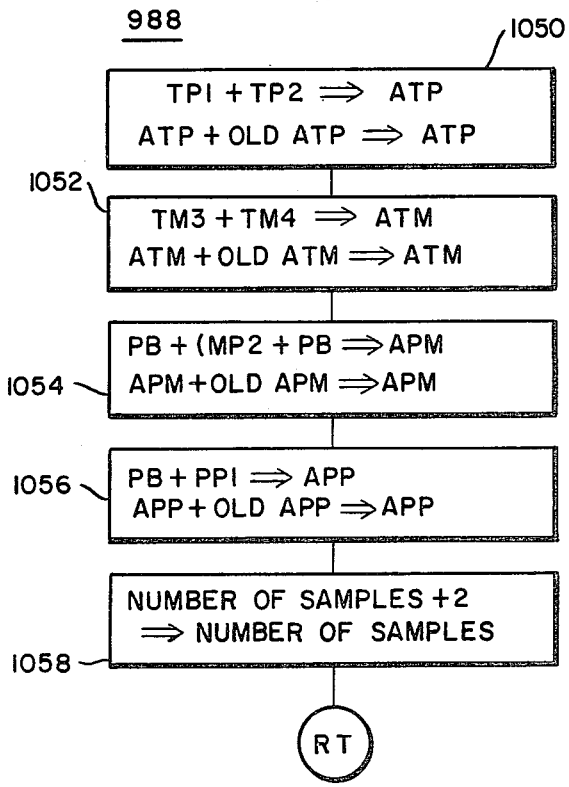
Figure 10:
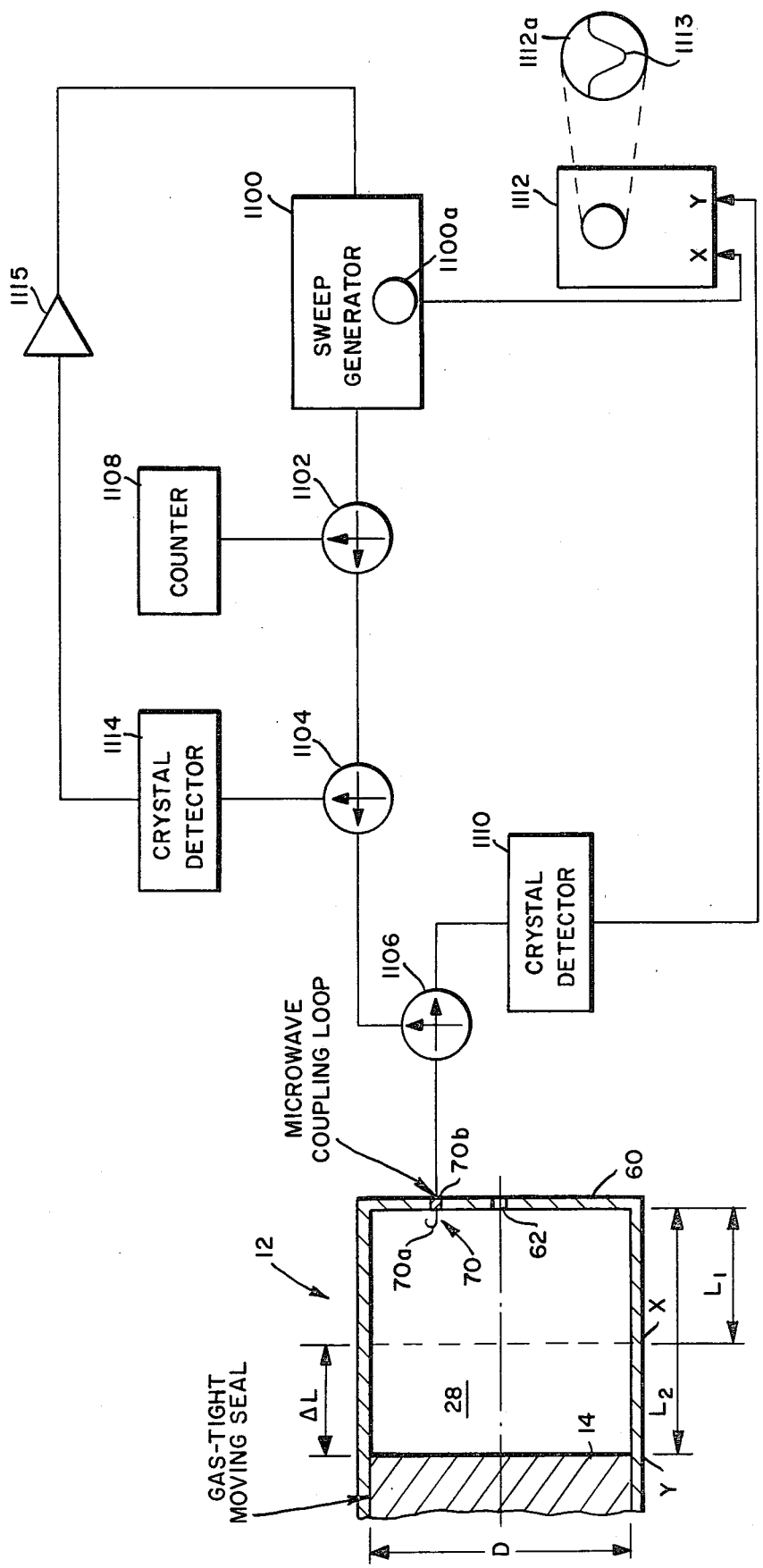
FIG. 10 is a schematic diagram of a circuit for applying a high frequency signal to the microwave antenna within the cylinder of the meter prover as shown in FIGS. 1 and 2A, for varying the signal's frequency as applied to the antenna whereby the volume of the cylinder may be determined with great accuracy to thereby accurately encode the output of the meter prover's linear encoder.

In FIGS. 9C and 10 after the flow rate at which a particular meter is to be tested was chosen, the actual test was conducted by steps 956 and 964. The actual meter test conducted by the meter prover system 10 is carried out in the subroutine shown in FIGS. 9E and F. First, step 966 commands the logic and driver circuit 198a of FIG. 4E to energize the test in progress light 111c. Next, step 332, as shown in FIG. 6B, returns the piston 14 to its park or lowermost position, as shown in FIGS. 1 and 2A. Step 968 commands the logic circuit 194b to effect the opening of the inlet valve 34 and closure of the exhaust valve 36. As indicated above, a particular speed has been stored in the speed buffer of the RAM 126 and the servomotor 20 is driven under the control of the logic circuit 194a to that speed in accordance with the subroutine 606 as shown in FIG. 8F. Of significance, routine 606 senses that the piston 14 has been accelerated from its park position to the start-test position as indicated by the output of the proximity detector 52, and that the piston velocity has stabilized. Next in step 970, the outputs as derived from the rotary encoder 40 and the linear optical encoder 26, are inhibited by the signal and logic conditioning circuits 170 a and 170b, respectively, from being entered into their respective counters 174a and 182, and the time divisors or factors as originally selected based on the test volume are entered into the programmable counter 174a. In step 972, after the piston has reached the start-test position as determined by step 600, the output of the rotary encoder 40 is accessed periodically, e.g., every 40 microseconds, to detect the occurrence of the rising edge of the next pulse therefrom as provided at the input to the interval timer 176. If this has not occurred, the subroutine checks in step 974 the status of the proximity switch 54 and if the piston 14 is at that position, i.e., towards its uppermost position within the cylinder 12, there is an indication of a failure and the subroutine exits via exit point 975 into an interrupt subroutine as will be explained with respect to FIG. 9G. Otherwise, upon occurrence of the leading edge of the output of the rotary encoder transducer 40, the routine moves to step 976, wherein the A output of the rotary transducer 40 is applied by the signal conditioner and logic circuit 170a to the interval timer 174 and in particular to its programmable counter 174a. Further, step 976 enables the counter 182 to start counting the pulses derived from the linear encoder 26, and the programmable counter 174a to count the pulses from the rotary encoder 40. In addition, step 976 enables at this point in time the counter 176a to count the system clock indicated in FIG. 4C as clock A (e.g., 200 KHz) by dividing the system clock by an appropriate factor to output via the logic circuit 178 a one-second sampling signal, whereby the various values of temperature and pressure are sampled. In addition, an output is derived via the interval timer 174 to enable the logic circuit 177, which is otherwise disabled, thus permitting an end of test interrupt to be developed and in particular to apply a one logic or high signal upon the counting down of the inputted count by the programmable counter 174a to apply a signal to the Interrupt 2 input of the CPU 120 to initiate an interrupt subroutine which will be explained in detail later with respect to FIG. 9J. Next in step 528, the data in terms of the pressures and temperatures currently being measured in the meter 38 and in the chamber 28 are outputted as discussed above with respect to FIG. 8P. Next, in step 980, the status of the counter 176a within the interval timer 176 is tested, and if no pulses have been accumulated, the subroutine returns to the beginning of step 980 to wait for the occurrence of the first pulse output from the counter 176a. If a pulse or pulses have been detected at the output of the counter 176a, the subroutine moves to step 982 wherein the counter 176a is reset to zero. Thus, the counter 176a will be reset to zero upon the occurrence of the one per second pulse output from the logic circuit 178. Next in step 984, the meter pressure MP2 as derived from the outputs of the pressure transducer 46, the prover room pressure derived from the pressure transducer PB, the prover pressure PP1 as derived from pressure transducer 51, the meter temperatures TM3 and TM 4 as derived from the temperature transducers 42 and 44, respectively, and the prover temperatures TP1 and TP2 as derived from the temperature transducers 57 and 48, are placed within designated locations within the RAM 126 to be available for the calculations to be performed upon them, as will be explained. Next in step 986, which will be more fully explained with respect to FIG. 9L, the pressure and temperature data is converted to a floating point decimal form and in step 988, as more fully explained with respect to FIG. 9M, the data is accumulated and averaged. As will be explained in detail later, the values of pressure and temperature within the meter 40 and within the chamber 28 are accumulated periodically, e.g., every second, from a point in time when the volume meter test is begun until it is terminated, whereby each of the samples so taken may be summed and divided by the number of samples to time average the temperature and pressure parameters. Thus, the temperature and pressure parameters are considered to be taken or monitored continuously during the test of a fluid flow meter. A final sample of these parameters is taken even after the programmable counter 174a has counted down. Next in step 990, a determination is made of whether the test is over by interrogating the INT2 register and if the test is over, the routine moves on to the further steps as shown in FIG. 9F; if not, the subroutine returns to the beginning of step 528 to output the current values in the pressure and temperature buffers of the RAM 126 and to continue the meter test. The generation and storing of an end of test flag permits the meter test to end anywhere in the interval between the sampling pulses for taking the measurements of pressure and temperature. Thus, as will be explained with respect to FIG. 9J, the end of test flag is set upon the occurrence counting down the meter encoder register 174a within a designation portion of the RAM 126 indicating that the test has ended. However, the one-second sampling pulses derived from the logic circuit 178 of FIG. 4C is still to occur in order to obtain the last pieces of temperature and pressure data. Thus, the subroutine as seen in FIG. 9E and in particular step 990 permits the test to end and the final items of pressure and temperature data to be gathered before the meter prover system 10 is shut down. The use of the logic circuit 177 to sense the timing out of the meter encoder counter 174a permits a rapid and efficient end of test signal or flag to be generated. If software were employed, it would be necessary to repeatedly access the status of the programmable counter 174a to determine whether it has counted down, thus consideraly complicating the program to be stored within the PROM 124 and reducing the accuracy of the timing of test termination.

From the above, it is seen that a meter test is initiated and terminated in response to the output of the meter rotary encoder 40. As explained above, the mechanism coupling the encoder 40 to the diaphragm of the meter 38 generates, in a sense, a frequency modulated signal thus making it desirable to initiate and to terminate the counting of its output at approximately the same point in the cycle of rotation of the rotary encoder 40. To this end, the piston 14 is accelerated from its park position to a substantially constant velocity before passing the start-test position as determined in step 646, at which point the test assesses periodically, e.g., every 40 microseconds, the occurrence of the rising edge of the next A pulse from the rotary meter encoder 40. That next pulse A from the rotary meter encoder 40 initiates the counting down of the programmable counter 174a into which has been loaded a count indicative of the test volume to be drawn through the meter 38 under test and at the same time to initiate the counting of the counter 182, which counts the output of the linear encoder 26 to provide an accurate indication of the test volume drawn into the prover 10. Upon the counting down of the counter 174a, a signal is applied to the logic circuit 177 to effect a CPU Interrupt 2 which as shown in FIG. 9J disables the counters 174a and 182, thus terminating the counting of each. Thus, the count as stored within the counter 182 indicative of the pulses derived from the linear encoder 26, is actuated to initiate and to terminate its counting in response to the output of the rotary meter encoder 40, thereby insuring that the count stored in the counter 182 accurately corresponds to a count as stored within the programmable counter 174a, which is indicative of the fluid measurement made by the test meter 38.

Referring now to FIG. 9F, in step 992 the final values of the aforementioned pressures are obtained after the end of test flag has been set and are converted to a floating point decimal before being accumulated and averaged. The final values of pressure and temperature are outputted via the logic circuit 190a of FIG. 4D to be displayed upon the CRT terminal 112 in a manner in accordance with the subroutine as described above with regard to FIG. 8P. Next in step 994, the count accumulated in the counter 182 is converted to a floating point decimal form and in step 620, the servomotor 20 is decelerated to a stop in accordance with the subroutine 620 discussed above with respect to FIG. 8G. Thereafter, step 996 provides command signals via the PI/O circuit 196 and logic circuit 194b to actuate the solenoid associated with the second exhaust valve 36 to open same and to actuate the solenoid associated with the first, inlet valve 34 to close the inlet valve. Next in step 998, the various parameters as have now been finally collected are used to calculate the volumes as indicated by the output of the linear optical encoder 26 and the meter rotary optical encoder 40 in a manner that will be explained in greater detail with respect to FIG. 9N. In step 1000, a command is sent to the logic and driver circuit 198a to energize the test complete indicator 111d and thereafter, in step 1002, the output results as calculated in step 998 are transferred to the hard copy printer as will be more fully explained with respect to FIG. 9P, and the piston 14 is returned to its lowermost normal, or park position by step 322, as more fully shown in FIG. 6B. At this point the program returns to the beginning of step 952a of FIG. 9C to determine whether repeated or different flow rate tests are to be made.

In FIG. 9G, the interrupt subroutine 975 is shown and is entered primarily when the stop pushbutton 111g is depressed by the operator, or when in step 974 of FIG. 9E there has been a determination of failure due to the combination of an absence of rotary encoder counts, and the presence of the cylinder at its upper position corresponding to the placement of the proximity switch 54. Upon pressing the stop button 111g, the servomotor 20 is quickly decelerated to a halt and the system is "locked up" in its stop mode until the primary power is removed and then reapplied. Upon reapplication of power, the meter prover system 10 will return to its standby mode. Under either condition, the program enters via point 975 as shown in FIG. 9G and in step 1004, causes the logic and driver circuit 198a to actuate a light behind the stop pushbutton 111g. In step 1006, the current motor speed as derived from the logic circuit 198b is stored in the speed compare buffer of the RAM 126. Next, the servomotor 20 is decelerated in accordance with the deceleration subroutine 620 as shown in FIG. 8G. Thereafter, step 1008 sends commands to the logic circuit 194b to cause the associated solenoid to open the second exhaust valve 36 and to actuate the associated solenoid to close the first, inlet valve 34. At this point the subroutine goes into a wait step 1010 until power is removed and then reapplied.

As shown in FIG. 9H, an Interrupt 1 routine is entered when the operator presses the reset button 111g of the system control and status module 111 whereby the program being conducted is interrupted and exits to step 1012, wherein the logic and driver circuit 198a is controlled to energize the light behind the reset button 111g. Next in step 1014, the current speed of the servomotor 20 is read via the logic circuit 198b and is stored in the speed compare buffer, i.e., an addressable location of the RAM 126. At that point, the servomotor 20 under the control of the logic circuit 194a is decelerated to a stop condition by the subroutine 620 as shown in FIG. 8G, and the return is made to the program via point 212 and in particular to the step 214 as shown in FIG. 5.

A third interrupt subroutine, as referred to above with respect to steps 976 and 990 of FIG. 9E, is shown in FIG. 9J as automatically implemented at the end of the meter test when the interval timer 174 outputs a pulse via its logic circuit 177 to the Interrupt 2 input of the CPU 120, this pulse occurring after the down counting of the input of one of the factors corresponding to one, one-half, or one-fourth cubic foot of the test volume to be drawn by the meter prover system 10 through the meter 38. Initially, the status of the system is stored in step 1018 in appropriate locations within the RAM 126 and in step 1020, the counters 174a and 182 of FIG. 4C are disabled and the stored count of the linear counter 182 is stored in appropriate locations within the RAM 126, before each of the counters 174a and 182 is reset. In step 1024, a one or flag is disposed within the test over register of RAM 126, upon the occurrence of the counting down of one of the aforementioned factors or parameters by the counter 174a. Thus, the end of a test may occur midway between the one-second sampling pulses that are used to obtain measurements of pressure and temperature. Thus, it is necessary to wait to obtain that final set of measurements of pressure and temperature and this is done by setting the end of test flag immediately upon the occurrence of the down counting of the aforementioned factors. The meter prover system 10 will continue to operate to accumulate data as indicated in FIG. 9E until step 990 occurs, at which time the test over register of the RAM 126 is accessed to see whether a test over flag has been set and if so, then the test is brought to a half. If still running, in step 1028, the status of the system is recalled and the meter prover system operation continues at the point of interruption within the meter test routine as shown in FIG. 9E.

Figure 9K:
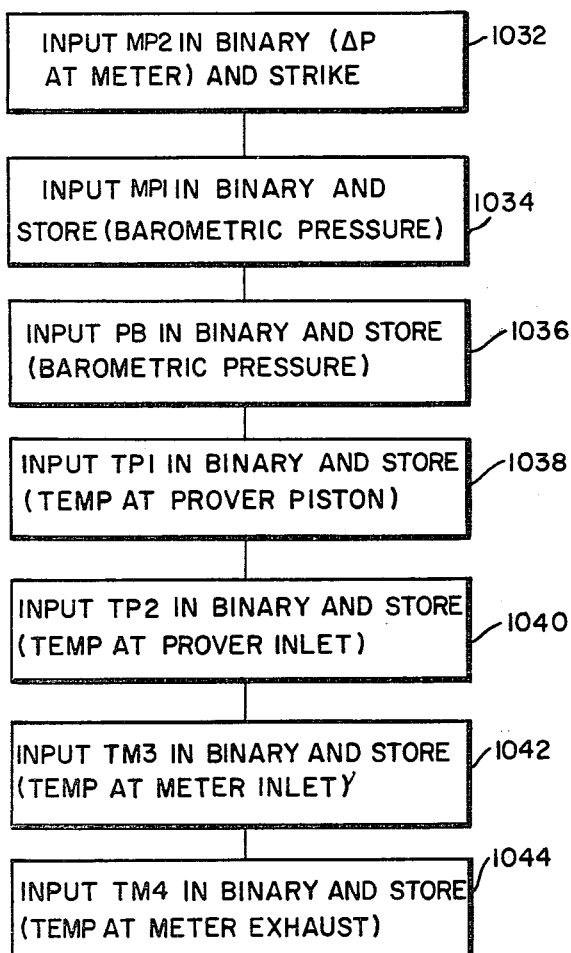

The routine 984 generally indicated in FIG. 9E for inputting the values of pressure and temperature is more fully shown in the subroutine shown in FIG. 9K, wherein the initial step 1032, an indication of the differential pressure as obtained from the differential pressure measuring device 46 is converted into binary data by the A/D converter 166 and is stored in a designated location within the RAM 126. Similarly, a differential pressure as measured by the piston pressure transducer 51 is converted by the A/D converter 166 into binary data and is stored by step 1034 in a designated location of the RAM 126. Similarly, the barometric pressure as measured by the transducer 109 disposed in the prover room 106 in which the meter prover system 10 is housed, is converted by the A/D converter 166 into binary data and is stored by step 1036 in a designated location in the RAM 126. Similarly in steps 1038, 1040, 1042, the temperature inputs TP1, TP2, TM3, and TM 4 from the temperature measuring devices 57, 48, 42, and 44, are converted to binary data by the A/D converter 158 and are stored within designated locations at the RAM 126, before returning to step 986 of FIG. 9E.

Step 986 as generally shown in FIG. 9E is more fully shown in the subroutine of FIG. 9L where in step 1046, each of the temperatures corresponding to the prover temperatures TP1 and TP2, and the meter temperatures TM3 and TM4 is converted from a binary voltage to degrees Fahrenheit in a floating decimal format and then is stored in a designated location within the RAM 126. Next in step 1048, in similar fashion, the binary voltages indicative of the pressures MP1, MP2, and the barometric pressure PB are taken from their designated locations within the RAM 126 and are converted to pounds per square inch (psi) in a floating point decimal format and are restored in designated locations in the RAM 126, before returning to step 988 as shown in FIG. 9E.

The subroutine or step 988 as shown in FIG. 9E for accumulating and averaging the test data is more fully shown with respect to the subroutine shown in FIG. 9M. In step 1050, the digital values of the first and second prover temperatures TP1 and TP2 are added together to provide an Average Prover Temperature (ATP). This value is in turn added to the accumulated previous values of ATP, thus accumulating a series of N samples of the Average Prover Temperature during the conducting of a meter test. In step 1052, the meter temperatures TM3 and TM4 are added together to obtain an Average Meter Temperature (ATM) and this new value is added to the previously accumulated values of the Average Meter Temperature ATM to obtain a quantity indicative of N consecutive samples of the ATM taken during the course of a meter test. In step 1054, a value of the ambient or barometric pressure PB is added to the sum of the barometric pressure PB plus the differential pressure MP2 taken between the ambient pressure and the pressure established within the meter 38 to obtain an Average Meter Pressure (APM). The Average Meter Pressure is added to the previously accumulated values of the Average Meter Pressure to obtain a quantity indicative of N consecutive samples of the APM taken during the meter test. In step 1056, a value of the ambient or barometric pressure PB is added to that differential pressure as obtained from the differential pressure PP1 transducer 51 to obtain an Average Prover Pressure (APP). The Average Prover Pressure (APP) is added to the previously accumulated values of the Average Prover Pressure to obtain a quantity indicative of N consecutive samplings of the APP taken during the meter test. In step 1058, the number of samples of each of the values taken above in steps 1050, 1052, 1054, and 1056 is added to determine the total number N of samples, whereby in succeeding steps an average value of each of these parameters may be obtained by dividing the accumulated quantity by the factor N.

Step 998, as shown in FIG. 9F, will now be explained in more detail with respect to FIG. 9N. As indicated above, the accumulated values of average pressure temperature (ATP), average meter temperature (ATM), average meter pressure (AMP), and average prover pressure (APP) are indicative of N samples taken during the course of the meter test and in step 1060 these average values are obtained for each of the temperatures and pressures. Next, in step 1062, the percent error of the output of the meter encoder 40 of the fluid passing through the meter 38 with respect to the standard volume passed therethrough as drawn by the meter prover system 10 is calculated in accordance with the indicated equation. The values of meter pressure PM, prover pressure PP, prover temperature TP, and meter temperature TM are those averaged values as determined from step 1060, whereas the prover volume count K was obtained as an indication of the accumulated counts that was produced by the linear encoder 26 and accumulated within the counter 182, these counts being indicative of a selected standard volume, e.g., one cubic foot, one-half cubic foot, or one-fourth cubic foot. As shown in FIG. 9N, the ratios of PM to PP, and TP to TM provide, respectively, pressure and temperature correction factors. As explained above, there exists differences of fluid temperature and fluid pressure between the fluid within the meter prover 10 and the fluid meter 38 under test. The noted ratios as determined by step 1062 provide appropriate correction factors whereby the differences in temperature are compensated for to give an accurate indication of percent error of the meter reading of fluid volume with respect to that calibrated indication or reading provided by the meter prover 10. The factor K* is representative of those counts as stored in the programmable counter 174a indicative of the fluid flow as measured by the meter 38. As shown in step 1062, the factor K* is multiplied by a constant C to convert the count, e.g., 40,000 for one cubic foot, to a value of the volume to be drawn through the meter 40. In the illustrative example, where the factor K* as entered into the programmable counter 174a is 40,000, the constant C is chosen as 1/40,000. Further, the number of counts as derived from the linear encoder 26 and counted by the counter 182 is multiplied by a calibration factor which, as will be explained later in detail, is derived by accurately measuring the volume of the chamber 28 of the meter prover 12 and correlating the precisely measured volume to the series of pulses outputted by the linear encoder 26. In an illustrative example of this invention, for a selected volume of one cubic foot of the chamber 28, it was determined that 38,790 output pulses were derived from the linear encoder 26. Thus, the calibration factor would be selected as inverse of this count or 1/38,790. In similar fashion, if a different volume was to be drawn through the meter 38 and the programmable counter 174a was to be programmed with a count corresponding to a different flow, it would be necessary to determine a different calibration factor corresponding to that volume as defined within a selected region of the chamber 28. In practice, the count of 38,790 is obtained empirically by moving the piston 14 along a length of the chamber 28 corresponding to precisely one cubic foot and calculating or otherwise determining the number of pulses as outputted by the linear encoder 26. Similar measurements and encoding will be taken empirically to determine the counts for one-half and one-fourth cubic feet flow corresponding to the output of the linear encoder 26 as the piston 14 is moved distances from the start-test position along the cylinder 12 corresponding illustratively to one-half cubic foot and to one-fourth cubic foot volumes within the cylidner. Thus, the actual counts and therefore the corresponding calibration factors for one-half and one-fourth cubic feet will correspond precisely to these volumes as defined by the cylindrical wall of chamber 28. In this manner, a calculation of the percent error between the reading of the meter 38 and the actual volume as drawn into the chamber 28 can be made with great accuracy, by the use of calibration factors that have been determined in accordance with the precise volume of the corresponding regions of the cylindrical wall of the chamber 28. After the step 1062 has been executed, the program returns to the next step 1000 as shown in FIG. 9F.

The calculation of the average temperatures and pressures as generally disclosed in step or subroutine 1060 of FIG. 9N is more completely shown by the subroutine as set out in FIG. 9Q, as previously indicated in step 1050, each measurement of temperature is added to the previous measurement to obtain a total indicative of accumulated discrete measurements of prover temperature ATP during the course of a single test. As indicated in step 1064 as shown in FIG. 9Q, this accumulated value of ATP is divided by the number of samples AVCTR=N+2 and added to 459.67 to provide the final averaged temperature FTP of the prover in degrees Kelvin. In similar fashion in step 1066, the value of the temperatures TM3 and TM4 are added successively to each other during the course of the meter test to provide an accumulated value of the average temperature ATM of the meter during the course of the test, and the ATM is divided by the number of samples or counts of the one-second sampling clock which is in turn added to 459.67 to give a final average temperature FTM in terms of degrees Kelvin. In similar fashion, in step 1068, the accumulated values of the average pressure APM of the meter as accumulated during the test is divided by the number AVCTR of samples taken during the test to provide a final FPM of the meter in terms of pounds per square inch absolute. In step 1070, the accumulated values of the average prover pressure APP as accumulated during the course of the meter test are divided by the number AVCTR of samples to provide an indication of the final pressure of the prover FPP in terms of pounds per square inch absolute, before returning to the next step 1062 as shown in FIG. 9N.

The accuracy of the meter prover 10 to measure the volume drawn through the meter 38 is dependent and is limited by the variations in the measurements of fluid pressure and temperature during a meter volume test. The variations in fluid pressure and temperature as occur during a meter volume test run are greater than those variations that may occur in the measurement and calibration of the volume of the meter prover. Thus in general, the actual volume of fluid delivered through the meter 38 as the piston 14 is moved from a first to second position may be approximated by the following expression:

$$V \approx (V_1 - V_2)[1 + (\overline{\delta T}/T_1) - (\overline{\delta P}/P_1)] + V_2[(\Delta T/T_1) - (\Delta P/P_1)]$$

where $V_1$, $P_1$, and $T_1$ are respectively the initial volume, fluid pressure and temperature existing within the chamber 28 of the prover 10 at the beginning of a meter volume test run, $\Delta P$ and $\Delta T$ are the corresponding changes in pressure and temperature that occur during the test, and $\overline{\delta T}$ and $\overline{\delta P}$ are the mean deviations from $T_1$ and $P_1$ at the fluid meter 38. As explained above, the logic circuit 178 as shown in FIG. 4C provides a one-second clock signal that samples the output of the temperature transducers 42, 44, 48, and 57, as well as the pressure transducers 46 and 51 to provide samples of these variables throughout the volume meter test run. As discussed above, the periodic samples of the meter temperature TM3 and TM4, and the prover temperature TP1 and TP2 as obtained in step 984 of FIG. 9E are summed in steps 1050, 1052, 1054, and 1056 of FIG. 9M together to obtain a spatially averaged meter temperature and prover temperature, which are time averaged by being sampled and summed over the test run as explained with respect to steps 1064, 1066, 1068, and 1070 of FIG. 9Q. In this manner, the continuous changes in both pressure and temperature are measured at the fluid meter and the prover 10. By so averaging in a spatial and time sense, the variations in temperature and pressure that would otherwise cause an error in the calculation of the change of volume may be avoided. Temperature changes in the fluid as drawn into the meter prover as caused by adiabatic expansion across a pressure drop of 1.5"H$_2$O can be as large as 0.5° F., causing an error in the calculation by as much as 0.1%. Thus, it is necessary to monitor accurately the fluid pressure and temperature throughout the system and apply the necessary corrections in order to obtain the "true" volume drawn into the meter prover 10. For an accuracy of 0.05% in volume, the parameters $\delta T$ and $\delta P$ between the chamber 28 and the meter inlet need to be monitored to an accuracy of better than ±0.1° F. and ±0.05"H$_2$O, respectively. The temperature transducers and pressure transducers described above with respect to FIG. 1 have such a capability to achieve the desired accuracy for temperature and pressure measurement and provide the desired accuracy in the measurement of the volume.

Step 1002, as shown in FIG. 9F as outputting the results of the conducted tests upon the meter 38 to the hard copy printer, is more fully shown in FIG. 9P. In the first step 1072, the printer is strobed by the logic 190b to initialize its operation and thereafter the percent error as calculated previously in step 1062 is printed out upon the printer. Next, in step 1074, a line feed command is applied for the printer to advance its paper by one line, before in step 1076, the flow rate at which the test was conducted is displayed in step 1076. In step 1078, ten line feed command signals are applied to the printer to feed the paper ten lines before returning to step 322 in FIG. 9F.

A significant aspect of this invention resides in the method of accurately measuring the volume of the chamber 28 of the cylinder 12 and to use that measurement to accurately calibrate the output of the linear encoder 26 to provide a manifestation of volume per pulse output of the linear encoder 26. As indicated in FIG. 2A, the linear encoder includes a scale 24 with a high number of accurately, closely spaced markings 102, whereby the optical encoder 26 provides a train of output pulses corresponding to the passage of each such marking past the optical encoder. By accurately correlating the number of such output signals to the precisely determined volume of the chamber 28, the linear encoder 26 may be encoded with a corresponding high degree of accuracy to thereby improve the calibrated indication of meter registration or error of the meter 38 under test.

In such a calibration procedure, it is first necessary to measure the volume of the chamber 28 with great accuracy. A method of volume measurement is employed including the establishing of a high frequency, electromagnetic field within the cavity; the principles of such measurement method will now be explained. The inside dimensions of the regularly shaped chamber 28 completely surrounded by conducting walls can be accurately determined by measuring the frequencies at which resonant conditions occur for the electromagnetic field established within the chamber 28. For a given geometry, the electromagnetic fields within the chamber 28 can assume a variety of spatial configurations. At discrete frequencies, the electromagnetic energy confined within the chamber 28 is stored over time intervals long compared with its wave period and these resonant solutions are designated as the normal modes of the chamber 28. The ratio of the energy stored to that dissipated per cycle of the resonant frequency is defined as the quality factor or "Q" of the resonance. The quality factor Q is a measure of the dissipative losses due to the ohmic resistance of the walls to the electrical currents induced by the electromagnetic fields. For a given normal mode, the resonant frequency is uniquely determined by the dimensions of the chamber 28 and the propagation velocity of light in the medium filling the volume. Consequently, by simultaneously measuring the resonant frequencies of a number of normal modes equalling the linear dimensions specifying the volume (one for a sphere, two for a right circular cylinder, and so forth), the volume of the chamber 28 can be determined to an accuracy comparable to the precision of the frequency measurements.

For a given chamber geometry, there is an infinite set of normal modes whose resonant frequencies will have a lower bound value corresponding to a free-spaced wavelength of the order of the linear dimensions of the chamber 28, but no upper bound. A volume change caused by a mechanical displacement of one of its linear dimensions will, in turn, change the resonant frequency of the low ordered modes by approximately the same fraction.

Briefly, as shown in FIG. 10, means in the form of the antenna 70 is provided to establish or generate an electromagnetic field within the chamber 28 and to extract therefrom a relatively small portion of the stored electromagnetic energy to be measured by the circuit of FIG. 10. As will be explained in detail later, measurements are made to determine the frequencies f at which resonance occurs within chamber 28. The selection of the configuration of the chamber 28 is significant for if an arbitrarily shaped chamber is used, the mathematical relationship between the resonant frequencies f and the dimensions of such a chamber may have no closed or analytical solution. Thus, the chamber 28 is selected to be of a regular geometry to assure that the dissipated losses and the effects of coupling are negligible and to provide known Maxwell equations defining the relationship between the chamber dimensions and the resonant frequencies subject to the boundary conditions that the electrical field E be radial and the magnetic field H be tangential to the totally enclosed surfaces of the regularly shaped chamber 28. Under these conditions, the field solutions for the chamber 28 will take on a relatively simple form and recognizable perturbations can be predicted.

Thus, in a preferred embodiment of this invention, the chamber 28 is selected to be a right circular cylinder as is formed by the inner surface of the cylinder 12, the head 60, and the exposed surface of the piston 14. It is recognized that a chamber 28 of such a configuration permits the piston to be driven therethrough to displace a known fluid volume, as explained above. The normal modes of the electromagnetic field established in the chamber 28 being configured as a right circular cylinder are divided into two general classes: the transverse electric modes (TE) for which the electric field is zero along the cylindrical (z) axis of the chamber 28, and the transverse magnetic modes (TM) for which the magnetic field is zero along its cylindrical axis. They are further specified by three integers l, m, and n, which are defined for the TE modes in terms of the cylindrical coordinates, r, $\theta$, and z by:

l = number of full-period variation of $E_r$ with respect to $\theta$;

m = number of half-period variation of $E_\theta$ with respect to r;

n = number of half-period variation of $E_r$ with respect to z.

A similar set of indices exists for the TM modes for which the integers l, m, n are correspondingly defined in terms of the components of the magnetic field; $H_r$ and $H_\theta$.

The solutions for the resonant frequencies of the normal modes are expressed in terms of the geometrical dimensions and roots of Bessel functions by the geneal expression:

$$f = (c/D) \left[ \left( \frac{x_{lm}}{\pi} \right)^2 + \left( \frac{n}{2} \right)^2 \left( \frac{D}{L} \right)^2 \right]^{\frac{1}{2}} \quad (1)$$

where D is the diameter, L is the length, c is the speed of light in the medium filling the cavity volume and $x_{lm}$ are given respectively by:

$x_{lm} = m^{th}$ root of $J'_l(x) = 0$ for the TE-modes, $x_{lm} = $ mth root of $J_l(x) = 0$ for the TM-modes.

Numerical values for these Bessel roots corresponding to the various lower ordered TE and TM modes are taken from the following table:

| Transverse Electric Modes (TE) | | Transverse Magnetic Modes (TM) | |
| --- | --- | --- | --- |
| TE | $x_{lm}$ | TM | $x_{lm}$ |
| 11 | 1.84118 | 01 | 2.40483 |
| 21 | 3.05424 | 11 | 3.83171 |
| 01 | 3.83171 | 21 | 5.13562 |
| 31 | 4.21009 | 02 | 5.52008 |
| 41 | 5.31755 | 31 | 6.38016 |
| 12 | 5.33144 | 12 | 7.01559 |

Figure 13:
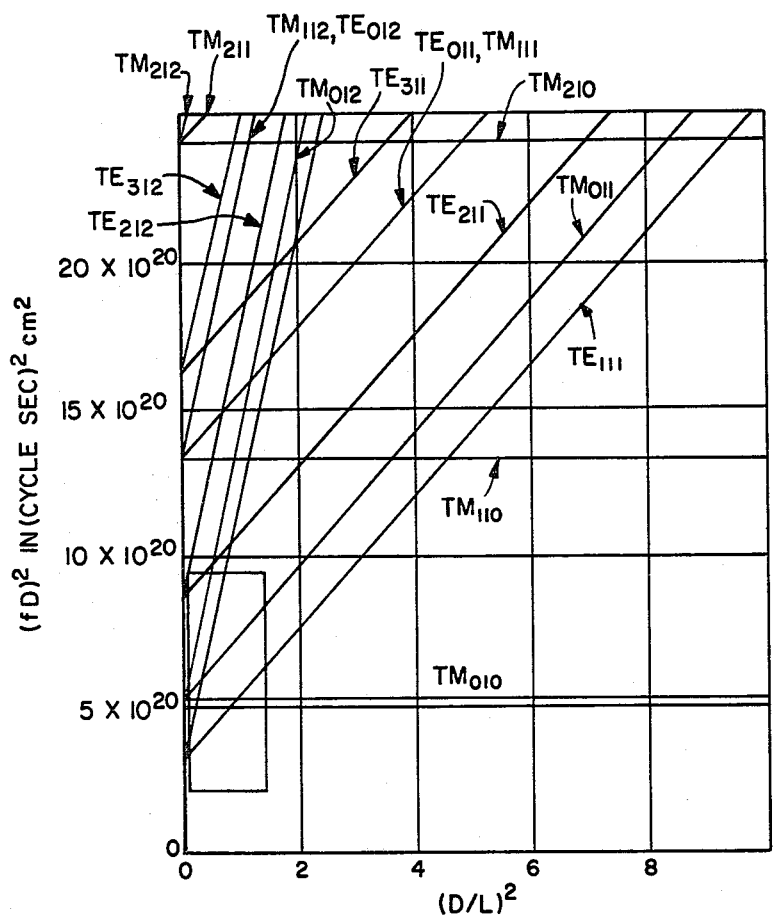
FIG. 13 is a graph illustrating the response of a chamber of a right circular cylinder configuration to being excited with high frequency electromagnetic fields in terms of the varying dimensions of the cavity and frequencies of excitation.

A plot of the quantity $(fD)^2$ vs $(D/L)^2$ of equation 1 is a straight line with intercept $(cx_{lm}/\pi)^2$ and slope $(cn/2)^2$. Such a mode chart is shown in FIG. 13 for the lower modes of the right cylindrical chamber 28 for values of n up to 2. FIG. 13 shows graphically the relative resonant frequency values as a function of the geometric parameter $(D/L)^2$ and the variation in resonant frequencies as the linear dimension L is changed. It is also useful in predicting the number of resonances expected to be encountered in a given frequency range for any fixed D/L ratio as well as the values of L at which two difference modes are degenerate in frequency, and hence would interfere with each other.

The mode chart of FIG. 13 is used to determine the modes of electromagnetic field excitation, the expected resonant frequencies of the selected modes, and the dimension in terms of the diameter D and length L of the chamber 28. In an illustrative embodiment of the chamber as shown in FIG. 10, the diameter D is set equal to 12" and the variation in the length L is from 10" to 30". Consequently, the corresponding values of $(D/L)^2$ have the range of values from 1.44 to 0.16. If the frequency range of observation is between 500 MHz to 1000 MHz, then $(fD)^2$ will vary between $2.32 \times 10^{20}$ and $9.29 \times 10^{20}$ (cycles/sec)$^2$cm$^2$. The number of resonant modes expected to be encountered over the variation in length L for this configuration between the range of 500 to 1000 MHz is then just given by the number of lines included in the rectangle shown on the mode chart of FIG. 13. As can be seen, at L=10", there are only three modes which occur between 500 to 1000 MHz. These are, namely, the $TM_{010}$ mode occurring at approximately 755 MHz, the $TE_{111}$ mode occurring at 830 MHz and the $TM_{011}$ mode occurring at 960 MHz. On the other hand, for L=30", there are eight modes, namely $TE_{111}$, $TE_{112}$, $TM_{010}$, $TM_{011}$, $TM_{012}$, $TE_{211}$, $TE_{212}$, and $TE_{113}$ which for purposes of clarity, are not shown in FIG. 13. At any intermediate position, the number of modes and their resonant frequencies f can be obtained from the intersection of the vertical line corresponding to the desired $(D/L)^2$ value with the lines designating the various modes. Since the measurements of the resonant frequency of any two distinct modes uniquely specify both D and L, the other modes may be used either as a redundancy check on the measurements or as a means for evaluating the effects of perturbation caused by deviation of the geometry from the idealized case as well as any higher ordered correction terms which may be present.

In a qualitative sense, it is understood that the electric and magnetic field components of the electromagnetic field are perpendicular to each other and have a defined relation at a resonant frequency to the dimensions D and L of the chamber 28 of a regular geometry and in particular the diameter and length of the chamber 28, as shown in FIG. 10. As will be explained, the relationship between the resonant frequency and the dimensions D and L for a particular mode can be related by a mathematical expression. The chamber 28 having a right circular cylinder configuration has two unknown dimensions that define its volume, i.e., its diameter D and its length L. Thus, it is necessary to provide two mathematical expressions that may be solved simultaneously for the unknown values D and L, and therefore it is necessary, as indicated above, to establish electromagnetic fields within the chamber 28 of two distinct modes and obtain the resonant frequencies of these two modes whereby the values of D and L and thus the volume of the chamber 28 may be calculated. As will be explained, the modes of excitation are selected to determine resonant frequencies with correspondingly high quality factors whereby the effects of perturbations to introduce errors into the measurement of D and L may be minimized.

The $TM_{010}$ mode line has zero slope, as shown in FIG. 13, and is therefore independent of the dimension L of the chamber and is only a function of the diameter. This unique property can therefore be used to identify this mode in experimental measurements. The $TM_{010}$ mode of excitation can be used to obtain an independent measurement of the dimension D. Furthermore, it can be seen that the rate of change of the resonant frequency for any given mode as a function of the dimension L is solely determined by the last index n. Consequently, the frequencies of the modes such as $TE_{111}$, $TM_{011}$, and $TE_{211}$ will shift by the same amount as L is varied whereas the $TE_{112}$, $TM_{012}$, and $TE_{212}$ modes will all shift together at twice the rate. Consequently, the tuning properties of these modes can be used to determine the relative change in the length L to very high accuracy once the absolute diameter of the cavity has been determined.

The quality factor or Q of the chamber 28 at resonance as excited in a given normal mode is important in two respects. First, it determines the sharpness of the resonant frequency response and therefore limits the ultimate accuracy with which the resonant frequency can be measured experimentally. More important, the quality factor Q is a measure of the order of magnitude of the expected deviation of the resonant frequency from the idealized results as given by equation 1. In general, the higher the Q for a given mode, the more accurate the theoretical expressions are in terms of determining the geometrical dimensions of the cavity. Thus, the modes for exciting the chamber 28 are selected to provide the highest quality factors Q, and thus provide the more accurate determination of the dimension and thus the volume of chamber 28.

For a volume comprised of perfectly conducting walls, the unloaded or intrinsic $Q_o$ of the chamber is infinite and the frequency solutions to the resonant normal modes are exact. For walls of finite resistivity, the electric and magnetic fields within the chamber 28 penetrate into the walls to a distance defined as the skin depth $\delta$, which is given by the expression $$\delta = [\lambda \rho / 120 \pi^2 \mu]^{\frac{1}{2}} \text{cm} \qquad (2)$$

where $\mu$ is the permeability of the wall material, $\lambda$ is the free-space wavelength in cm, and $\rho$ is the resistivity (d.c.) of the walls in ohm-cm. Since a finite skin depth makes the apparent dimensions of the chamber as seen by the electromagnetic fields somewhat larger than the actual geometrical dimensions, the dissipative effect caused by the ohmic losses on the walls perturbs the resonant frequency of the normal modes and shifts them to a lower value. A measure of this perturbation is the value of the ratio of the skin depth to the free-space wavelength or ($\delta/\lambda$), which can be calculated via equation 2 by using known values of the d.c. resistivity and permeability of the wall material. For a cavity made of copper ($\mu=1, \rho=1.72\times10^{-6}$ ohm-cm), the skin depth is equal to $3.8\times10^{-5}\lambda^{\frac{1}{2}}$cm. At 1000 MHz ($\lambda=30$ cm), the ratio ($\delta/\lambda$) is approximately equal to $7\times10^{-6}$. This correction to the resonant frequency caused by the finite conductivity is clearly negligible for the present application. For series 300 stainless steel, ($\mu=1, \rho=72\times10^{-6}$ ohm-cm), the raio of ($\delta/\lambda$) at 1000 MHz is $4.5\times10^{-5}$ which is becoming non-negligible compared to to the desired overall accuracy of 0.01% in absolute volume accuracy. In a preferred embodiment, the walls of the chamber 28 are chrome-plated, ($\mu=1, \rho=13\times10^{-6}$ ohm-cm), the corresponding value of ($\delta/\lambda$) is equal to $2\times10^{-5}$ at 1000 MHz. Consequently, on the base of theoretical calculations, the correction to the resonant frequency of the normal modes in the chamber 28 of a right circular cylinder configuration should be negligible and the expression given by equation 1 should be adequate in giving an overall volume determination to an accuracy better than 0.01%.

In practice, however, the theoretical skin depth value for a given material is never achieved due to a variety of reasons, including wall imperfections, material impurities, and residual surface contaminations. Consequently, it is necessary to experimentally determine the effective skin depth by measuring the Q of the chamber 28 to selected of the preferred modes of excitation, and if necessary, apply the appropriate correction to the volume determination due to this effect.

The expression $Q_o$ of the chamber 28 is obtained by evaluating the ratio of the energy stored to the dissipative losses occurring on the walls per cycle of the electromagnetic oscillation, which can be written as, $$Q_o = \frac{2}{\delta} \frac{\int_v H^2 dv}{\int_s H^2 ds}, \quad (3)$$

where H is the normal mode magnetic field vector and $\delta$ is the skin depth. The Q factors in terms of the normal modes and geometrical shape for the chamber 28 of a right cylindrical cavity are given by the following expressions:

For *TE* modes:

$$Q_o \frac{\delta}{\lambda} = \frac{[1 - (l/x_{lm})^2][x_{lm}^2 + P^2 R^2]^{3/2}}{2\pi \left[ x_{lm}^2 + P^2 R^3 + (1-R)\left(\frac{PRl}{x_{lm}}\right)^2 \right]}, \quad (4)$$

For *TM* modes:

$$Q_o \frac{\delta}{\lambda} = \frac{[x_{lm}^2 + P^2 R^2]^{\frac{1}{2}}}{2\pi(1+R)} \quad \text{for } n > 0 \quad (5)$$

$$= \frac{x_{lm}}{\pi(2+R)} \quad \text{for } n = 0$$

where R=(D/L), P=$n\pi/2$ and all other symbols are as previously defined.

By evaluating the right hand sides of the above expressions for a given mode and cavity geometry and dividing it by the experimentally determined Q, an effective $\delta/\lambda$ can be obtained. A direct comparison of the result obtained with the calculated via equation 2 then gives a quantitative evaluation of the magnitude of the perturbation expected in the volume determination of the chamber 28.

The chamber 28 is coupled to an external measurement circuit as shown in FIG. 10 whereby microwave power is introduced into the chamber 28 to establish an electromagnetic field therein and to extract reflected power therefrom. The chamber 28 is a reflection type cavity requiring only one coupling device in the form of the antenna 70. As will be explained in detail later, the resonant characteristic, and in particular the resonant frequency of a given normal mode, is determined by measuring the power reflected from the antenna 70 as a function of the incident microwave frequency. The use of a reflected type chamber 28 permits minimal perturbation from an idealized cavity response and permits an implementation by the use of a directional coupler 1106 which allow sampling of the reflected power without interference from the incident power. As shown in FIG. 10, the power output of a sweep generator 1100 is applied to excite the atenna 70 while the reflected power may be transferred by the coupler 1106 to a crystal detector 1110.

The presence of the coupling device in the form of the antenna 70 introduces an additional loss term in the dissipation of the resonant electromagnetic energy stored within the chamber 28, namely, the amount of power extracted for measurement. This is usually defined as an equivalent coupling Q or $Q_c$ as distinguished from the "unloaded" Q of the cavity or $Q_o$. In addition, the interaction of the cavity with the rest of the circuits of FIG. 10 via the antenna 70 need to be taken into account in order to derive an accurate description of the "cavity-coupling" system for evaluating the appropriate expressions in the present invention.

It can be shown that for a reflection-type chamber 28, i.e., a chamber for which power is introduced and extracted by a single antenna 70, the ratio of the reflected power to the incident power near a resonance is given by the expression, $$(P_r/P_o) = \frac{\frac{1}{4}\left(\frac{1}{Q_o} - \frac{1}{Q_c}\right)^2 + (\nu_o - \nu)^2/\nu_o^2}{\frac{1}{4}\left(\frac{1}{Q_o} + \frac{1}{Q_c}\right)^2 + (\nu_o - \nu)^2/\nu_o^2} \quad (6)$$

where $\nu$ is the frequency, $\nu_o$ is the resonant frequency, $Q_o$ is the unloaded Q of the cavity resonance, and $Q_c$ is the coupling Q which is proportional to the power loss through the coupling device.

At the resonant frequency $\nu_o$, the ratio of the reflected power to the incident power is defined as the reflection coefficient for the given normal mode, i.e.

$$(P_r/P_o)_{\nu=\nu_o} = \beta = (Q_c - Q_o)^2/(Q_c + Q_o)^2 \quad (7)$$

For $\beta=0$, the cavity is considered to be 100% coupled and $Q_o = Q_c$. This condition corresponds to the low-frequency equivalent circuit case where the load impedance is matched to the generator impedance.

Combining equations 6 and 7, and eliminating $Q_c$, the unloaded $Q_o$ of the normal mode is given in terms of the measurable parameters by, $$Q_o = \nu_o[(P_r/P_o) - \beta/1 - (P_r/P_o)]^{\frac{1}{2}}/(\nu - \nu_o)(1+\beta^{\frac{1}{2}}) \quad (8)$$

Therefore, by measuring $\beta$ and the frequency width at some arbitrary power level $(P_r/P_o)$ on the cavity resonant response curve, the quantity $Q_o$ can be determined. If a "half-power" point is defined such that $$P_{\frac{1}{2}} = (1+\beta)/2, \quad (9)$$

then the frequency difference corresponding to the two half-power points is known as the "half-width" of the resonant response and is given by $$\Delta\nu = 2(\nu_{\frac{1}{2}} - \nu_o) \quad$$

where $\nu_{\frac{1}{2}}$ is the frequency corresponding to the half-power points. For this case, equation 8 further reduces to, $$Q_o = (2\nu_o/\Delta\nu)/(1+\beta^{\frac{1}{2}}). \quad (10)$$

The value of $Q_o$, therefore, varies between $(\nu_o/\Delta\nu)$ and $(2\nu_o/\Delta\nu)$, depending on the degree of coupling.

Figure 14:
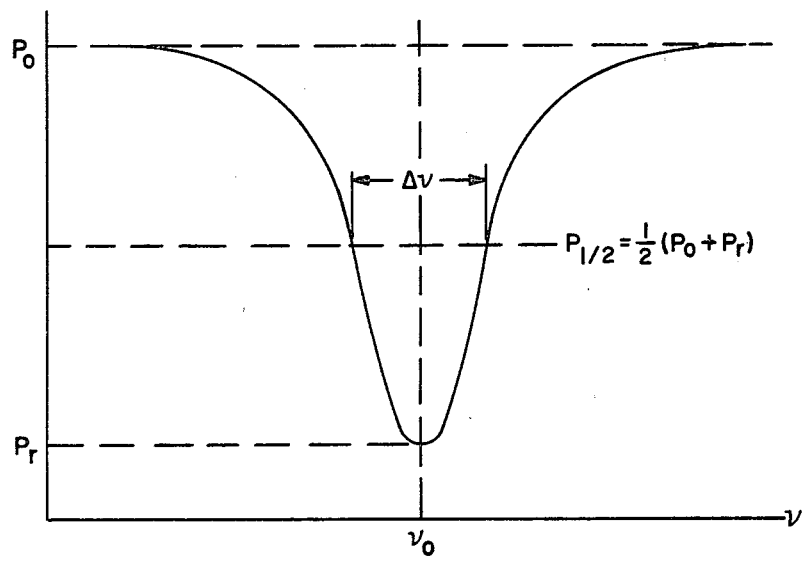
FIG. 14 is a cavity response curve showing reflected power Pr as a function of the excitation frequency.

A pictorial representation of the chamber response curve, together with the defined parameters, is shown in FIG. 14. The center frequency of the response, $\nu_o$, corresponding to a minimum of the reflected power, is the resonant frequency of the normal mode.

It is understood that the frequency measuring circuit as shown in FIG. 10 effects a change of the resonant frequency, i.e., frequency pulling, caused by the interaction between the chamber 28 with the elements of the circuit of FIG. 10. In the circuit as shown in FIG. 10, wherein the frequency of the sweep generator 1100 is varied by a factor approximately 2, the directional coupler 1106 receives the output power of the sweep generator 1100 and applies a relatively small portion thereof to the antenna 70. In particular, the power applied to the auxiliary or output port of the directional coupler 1106 is approximately 80% of the output of the sweep generator 1100. The chamber 28 is connected to the main input port, and the crystal detector 1110 is connected to the third port of the directional coupler 1106 to measure the microwave power reflected from the chamber 28. The use of the directional coupler 1106 results in a factor of 100 attentuation or "padding" between the sweep generator 1100 and the load as imposed by the antenna 70. As a result, the sweep generator 1100 is respectively isolated from the antenna 70, i.e., the coupling system, to insure that no interaction occurs to perturb the chamber response. As a result of the isolation imposed by the coupler 1106 between the antenna 70 and the generator 1100, the amount of frequency pulling is determined by the quality factor Q of the chamber 28, the coupling coefficient $\beta$, and the VSWR between the crystal detector 1110 and the cavity coupling system. Assuming that the sweep generator 1100 is totally decoupled from the cavity 28, a cavity 28 having a quality factor Q of 5,000, a coupling coefficient $\beta$ of 0.5 and a residual VSWR of 2, will provide a frequency pulling in the order of $1.3 \times 10^{-5}$ or 0.0013%. This deviation is an order of magnitude better than required to achieve desired overall measurement of the chamber volume to an accuracy of better than 0.01%.

Further, an analysis of the cavity 28 and its associated resonant frequency measuring system, as shown in FIG. 10, have shown that perturbations due to distortions in the geometry of the chamber 28 whether due to the out of roundness of the cylindrical shape of the cavity 28 or to small localized surface irregularities and deformations, indicates that such perturbations can be compensated for by taking the following precautions. First, if the machine tolerence of the chamber 28 is such that the diameter D of its cylindrical configuration is maintained to within the limits of 12 mills out of roundness, then the diameter D and thus the volume of the chamber 28 can be determined with an accuracy in the order of $10^{-5}$ or less and, thus, such deformation may be neglected for the present method of measuring volume. Similarly, the shift in the chamber resonant frequencies for any normal mode caused by a small inward or outward dent on the interior wall of the chamber 28 is deemed negligible is the hole dimension is well below the cut-off wavelength of the electromagnetic field established within the chamber 28 and the hole does not couple electromagnetic field to another structure; under these conditions, the frequency pulling will be approximately proportional to the ratio of the cube of the hole diameter to the volume of the chamber 28. Thus, as a practical matter, the frequency pulling for inward or outward dents in the walls of the chamber 28 is negligible; for example, a 1 inch diameter hole as placed within a chamber 28 having a diameter of approximately 12 inches and length of 20 inches will provide a change of the resonant frequency by only 7 parts in $10^5$.

Considering the effect of the inlet 62 as well as the openings to receive the transducers 51 and 57 within the piston 14, these openings or holes may be filled with metallic plugs during the volume measurement and calibration to virtually eliminate these sources of error from effecting the determination of the resonant frequency.

In order to satisfy the accuracy requirement of ±0.01% in the measurement of the displacement volume of the chamber 28, the resonant frequency measuring circuit as shown in FIG. 10 should be capable of measuring the resonant frequencies of the normal modes as established within the chamber 28 to 1 part in $10^5$. The circuit, as shown in FIG. 10, is designed to reduce systematic error which can effect the measurement of the resonant frequencies f, such distortions due to impedance mismatch between the sweep generator 1100 and the antenna 70, variations and fluctuations of the microwave power, extraneous noise, and sensitivity to component drifts. As shown in FIG. 10, the microwave power source takes the form of the sweep generator 1100 which may illustratively take the form of that generator manufactured by Texscan under their model disignation VS80A. The sweep generator 1100 may be operated illustratively at a fixed frequency (CW) or automatically to sweep through a range between 50 KHz and 300 MHz at a rate set between 0.05 Hz and 30 KHz. In addition, the output of the sweep generator 1100 may be controlled by its vernier knob 1100a to sweep at an operator control change of frequency through the noted range. The output of the sweep generator 1100 is applied by a coaxial cable to a directional coupler 1102 which acts as a transformer whereby a portion of the energy applied across the coupler 1102 is transferred to a frequency counter 1108, which in an illustrative embodiment of this invention may take the form of that counter manufactured by Fluke Corporation under their model designation No. 1920A. As will be explained later, the counter 1108 displays the frequency at which a standing wave is established within the chamber 28. In turn, the output of the coupler 1102 is applied by a similar coaxial cable to a second coupler 1104 and in turn via the directional coupler 1106 to be applied to the microwave antenna 70. As shown in FIG. 10 and in more detail in FIG. 2A, the microwave antenna 70 is a simple metallic loop 70a and is insulated by an insulator 70b from the head 60 of the chamber 28.

As is well known in the art, the energy reflected through the antenna 70 from the chamber 28 upon occurrence of a standing wave decreases significantly in comparison to that enery reflected at other frequencies. This is known as the resonance condition, and the associated frequency as the resonant frequency. Thus, as the frequency of the output of the sweep generator 1100 is varied, as resonant frequency is selected at which a standing wave occurs within the chamber 28 dependent upon the configuration and dimensions of the chamber 28. The frequency at which the standing wave is established determines, as will be explained, the chamber dimensions in terms of the diameter D and the length L, and therefore the volume of the chamber 28. To detect the power drop at the resonant frequency, the coupler 1106 is connected to the crystal detector 1110, which converts the microwave power reflected through the antenna 70 to a d.c. signal. In turn, the crystal detector 1110, which may illustratively take the form of a Hewlett Packard crystal detector Model No. 423A (NEG), applies its d.c. output to the Y input of an oscilloscope 1112. The oscilloscope 1112 may illustratively take the form of a Textronix oscilloscope manufactured under their Model No. T922R. The X input to the oscilloscope 1112 is provided by the sweep generator 1100, so that when the generator 1100 is set in the sweep mode, the reflected power response of the chamber 28 is a function of the input signal frequency and is displayed upon the oscilloscope 1112. As seen in the expanded display 1112a, the power reflected through the antenna 70 dips to a minimum 1113, at the resonance frequency in a manner shown in FIG. 14. The frequency at which the minimum 1113 occurs is displayed upon the counter 1108. The second coupler 1104 applies microwave power to a crystal detector 1114 which provides a corresponding d.c. signal to be amplified by an operational amplifier 1115 and applied to the sweep generator 1100 to provide a level control upon the output of the sweep generator 1100, whereby substantially an even power drain is placed upon the sweep generator 1100 as it sweeps through that frequency at which a standing wave occurs.

The circuit of FIG. 10 is operated in the following fashion to obtain a measurement of the resonant frequency. First, the sweep generator 1100 is set for wide sweep to permit essentially all of the normal mode resonances to be displayed simultaneously on the screen of the oscilloscope 1112 whereas the resonant response for any particular mode can be displayed individually by an appropriate choice of sweep width and sweep center frequency. Unambiguous identification of the modes can be made by measuring their resonant frequencies for a particular setting of the piston position within the chamber 28, and using equation 1, or alternatively, by moving the piston position and comparing the rate of change of their resonant frequencies as a function of piston position with those shown in FIG. 13.

The resonant frequency f of any given mode is measured by first displaying the response curve on the oscilloscope screen and then switching the sweep generator 1100 to its CW mode and manually tuning the fine frequency knob 1100a until the voltage displayed on the oscilloscope 1112 is a minimum. The display on the frequency counter 1108 when this minimum is reached is then the resonant frequency of the cavity normal mode. As a convenience, the second beam of the oscilloscope 1112 can be used to better define the position of this minimum by setting the system in the sweep mode and manually changing the vertical position of the second beam so that it just touches the bottom of the resonant response curve. When the generator 1100 is switched to operate in its CW mode, the resonant frequency f of the chamber 28 is then the frequency setting of the generator 1100 corresponding to condition when the two beams coincide. In a preferred embodiment, by simultaneously reading the frequency counter output while the two beams are exactly coincident, the effect due to frequency drifts of the generator 1100 is eliminated so that the measurement can be made to a much higher degree of accuracy than the inherent stability of the sweep generator 1100. In addition, since the measurement depends only on establishing the minimum in the chamber response curve, it is independent of non-linearity in the response of the detector 1100 as well as fluctuations in the incident microwave power with time. Repeated measurements on a given mode indicate that resonant frequency of the chamber 28 can be determined to an accuracy better than ±3 KHz or approximately 5 parts in $10^6$.

Now, a first embodiment of the method for precisely measuring the volume of a section of the chamber 28 will be explained in greater detail. Generally, the method of this invention involves measuring the resonant frequencies of the chamber 28 for two different modes of excitation. As an example, consider the right cylindrical chamber 28, and measure the resonant frequencies in the $TM_{010}$ and $TE_{111}$ modes. Both modes are non-degenerate and their resonant frequencies can be determined to an accuracy of 1 part in $10^7$ or better with standard techniques. The $TM_{010}$ mode (parallel plate mode) is dependent only on the average diameter (D) of the chamber 28 and is independent of the cavity height (L), whereas the $TE_{111}$ mode is dependent on both (D) and (L). Therefore, from the measurement of the two frequencies, the volume of the chamber 28 can be determined. For the case of $TM_{010}$ mode:

$$\lambda_1 = \text{resonant wavelength} = \frac{\pi D}{X_{01}} \text{ or } D = \frac{\lambda_1 X_{01}}{\pi} \quad (11)$$

where D=diameter, $X_{01}$=1st Bessel root or $J_o(X)=0$
For the case of $TE_{111}$ mode:

$$\lambda_2 = \text{resonant wavelength} = \frac{2}{\sqrt{\left[\frac{2X_{11}}{\pi D}\right]^2 + \frac{1}{L}^2}} \quad (12)$$

where D=diameter, L=length or height of cavity, $X_{11}$=1st root of $J'_1(X)=0$. Combining the 2 results give

$$D = \frac{X_{01}}{\pi} \lambda_1, \quad L = \frac{1}{2}\left[\frac{1}{\lambda_2^2} - \frac{1}{\lambda_1^2}\left(\frac{X_{11}'}{X_{01}}\right)^2\right]^{-\frac{1}{2}} \quad (13)$$

In terms of the resonant frequencies, the results can be expressed as:

$$D = \frac{X_{01}c}{\pi f_1}, \quad L = \frac{c}{2f_2}\left[1 - \left(\frac{f_1}{f_2}\frac{X_{11}'}{X_{01}}\right)^2\right]^{-\frac{1}{2}} \quad (14)$$

where $X'_{11} = 1.8412$, $X_{01} = 2.4048$, and $c = $ speed of light in the medium filling the cavity, (air for the present application).

In terms of the total volume of the chamber, $$\text{Volume} = \frac{\pi D^2}{4} L = \frac{\lambda_1^2 \lambda_2 X_{01}^2}{}\left[1 - \frac{\lambda_2^2}{\lambda_1^2}\left(\frac{X_{11}'}{X_{01}}\right)^2\right]^{-\frac{1}{2}} \quad (15)$$

$$= \frac{c^3 X_{01}^2}{8\pi f_1^2 f_2}\left[1 - \frac{f_1^2}{f_2^2}\left(\frac{X_{11}'}{X_{01}}\right)^2\right]^{-\frac{1}{2}}$$

As can be seen, the volume is, to first order, proportional to $\lambda^3$ or $1/f^3$. Therefore $$\frac{dv}{v} \sim 3\left(\frac{d\lambda}{\lambda}\right) \text{ or } 3\left(\frac{df}{f}\right) \quad (16)$$

Hence, the frequencies can be measured accurately to 1 part in $10^7$ as by the counter 1108, and thus the theoretical accuracy for v is of the order of 3 parts in $10^7$.

The method can be used to continuously measure the change in volume of a right circular cylinder 12 caused by a positive displacement of its piston 14. Both the volume of the chamber 28 before and after the piston motion, as well as the rate of change of volume can be measured in a simple manner. For the arrangement shown in FIG. 10, as the piston 14 moves from position X to position Y, the $TM_{010}$ mode resonant frequency will remain constant (or change slightly due to non-uniformity in the diameter of the cylinder) and the $TE_{111}$ mode resonant frequency will shift by an amount proportional to the displacement $\Delta L$. At position X, the resonant frequencies $f_1$ and $f_2$ are measured and are inserted within equation 2 to provide an indication of a first volume $V_1$. Thereafter, the piston 14 is moved to a second position Y and a second set of resonant frequencies $f_1'$, $f_2'$ for the modes $TM_{010}$ and $TE_{111}$, respectively, are taken and a second volume $V_2$ is calculated in accordance with equation 15. Finally, a displacement volume $\Delta V$ is calculated by subtracting the first determined volume $V_1$ as determined at position X from the value $V_2$ of the second volume as determined at position Y. In addition, by continuously monitoring the $TM_{010}$ resonant frequency, the variation of the diameter of the chamber 28 (due to machining imperfections) between $L_1$ and $L_2$ can be measured as a function of L. In a similar manner, the rate of change of volume can be measured by continuously monitoring the resonant frequency of the $TE_{111}$ mode.

Perturbations to the above relationships include dielectric properties of air, the presence of coupling conduits 30 and 32, and the other gas inlet 62, surface irregularities, finite electrical conductivity of the wall material of the chamber 28 and degeneracy due to mode crossing. To 1st order, so long as the irregularities are small compared to $\lambda$ (which will be on the order of 30 cm or larger), the perturbations will be proportional to the volume change. Hence, the method will average over deformities and give a measurement which will be proportional to the true volume of the chamber 28.

The coupling conduits 30 and 32 and gas inlet 62 are made with sizes well below the cut off wavelength of the microwaves and should perturb the resonant frequency at most by 1 part in $10^5$ and can be corrected for in the 1st order.

Similarly, the perturbation due to the finite electrical conductivity of the wall material of the chamber 28 should be of this same order of magnitude if the walls are fabricated or plated with a high-conducting metal such as copper, silver, gold, or aluminum, and reasonable care is taken in polishing. As an example, the theoretical skin-depth for copper at 300 Mc/s is $3.8 \times 10^{-4}$ cm. The perturbation on the volume is of the order of the ratio of the skin-depth to the linear dimension of the resonant cavity which, for a right circular cylinder with a radius of 50 cm, is approximately $7.6 \times 10^{-6}$. The actual skin depth can be estimated from the dissipative losses in the cavity which are directly related to the quality factor or Q of the chamber, which can generally be experimentally measured to about 1% accuracy. Consequently, a first order correction can be applied which will reduce the uncertainty to better than a few parts in $10^7$.

The resonant frequency change between vacuum and air in the cavity is given by, $$(f_{vacuum}/f_{air}) = (\epsilon)^{\frac{1}{2}} \quad (17)$$

where $\epsilon$ is the dielectric constant for air at microwave frequencies, which for dry air at STP, has the value $\epsilon_{STP} - 1 = 536.5 \times 10^{-6}$. Hence the frequency change from vacuum to air is of the order of $2.7 \times 10^{-4}$. Since $\epsilon$ for dry air is accurately known at microwave frequencies as a function of pressure and temperature, this shift can be corrected for to an accuracy of at least 1 part in $10^6$. The expression $$[(\epsilon-1)_{t,P}/(\epsilon-1)_{20c, 1atm}] = (P/760)/[1+0.00341(t-20)]$$

can be used to correct for the pressure and temperature dependence of $\epsilon$ to better than 0.1% accuracy. Since the perturbation in frequency is only $2.7 \times 10^{-4}$ initially, we can expect an overall accuracy in the resonant frequency determination of the order of $10^{-7}$ if the barometric pressure is monitored to better than 0.1% (or about 1 mm of mercury).

The water vapor (relative humidity) contribution to the dielectric constant of air can be expressed as:

$$(\sqrt{\epsilon} - 1)_{water\ vapor} \times 10^{-6} = 5.00\left(\frac{273.16}{T}\right)^2 P \quad (18)$$

where T is the temperature as measured by a precision temperature device in degrees Kelvin and P is the partial pressure of water vapor in millibars. For $T = 20°$ C. (293° K.), the saturation vapor pressure (100% relative humidity) is 23 millibars. Hence, for this extreme case, $(\sqrt{\epsilon}-1)_{water\,vapor} \times 10^{-6} \cong 100$ which is approximately $\frac{1}{3}$ as that for dry air. Again, this effect can be corrected to the 1st order by measuring the relative humidity, and an accuracy of the order of $10^{-7}$ can be achieved in determining the vacuum resonant frequency of the cavity.

Both the $TE_{111}$ and the $TM_{010}$ are not degenerate in frequency with any other resonant TEM modes. Accidental degeneracy due to spurious mode-crossing can be avoided by choosing the dimensions of the volume properly. The conditions for mode-crossing, between $D/L>0$ to $D/L=3$ are:

$$D/L = 0.45;\ D/L = 1;\ \text{and}\ D/L = 2.14$$

(at $D/L=0.45$, the $TM_{010}$ mode is degenerate with the $TE_{112}$ mode; at $D/L=1$, the $TM_{010}$ mode is degenerate with the $TE_{111}$ mode; at $D/L=2.14$, the $TE_{111}$ mode is degenerate with the $TM_{110}$ mode). Therefore, by choosing $D/L$ ratios other than those values, interactions with spurious modes are avoided and the resonant behavior of the cavity will be well-defined and the formulas for calculating the resonant frequencies from the dimensions of the chamber 28 are rigorously valid.

As an illustrative example, suppose we choose to work in the region of $1<D/L<2.14$ and require that the net traverse of the piston 14 displace a volume equal to 8 cu. ft. $(2.2652\times 10^5$ cc). Then the following configuration can be used:
D=104.88 cm
$L_1$=52.44 cm=final piston position Y
$L_2$=78.66 cm=initial piston position X.
Hence, the net displaced volume is, $$\frac{\pi(104.88)^2}{4}(26.22) = 2.2652 \times 10^5\ cc.$$

Also, as can be seen, the D/L ratio varies from 1.33 for the initial position to 2 for the final position, which are well within the desirable operating range. For this case then:
$f_1$=resonant frequency of $TM_{010}$ mode=219.0 Mc/s
$f_2(i)$=initial value of $TE_{111}$ mode=253.9 Mc/s (D/L=1.33)
$f_2(f)$=final value of $TE_{111}$ mode=331.5 Mc/s (D/L=2)
Similarly, for the case of 2 cubic feet total volume, the frequencies are:

$$f_1 = 347.6\ Mc/s$$

$$f_2(i) = 403.0\ Mc/s$$

$$f_2(f) = 526.2\ Mc/s$$

The dependence of frequency for an incremental change in L can be expressed as:

$$\frac{\Delta f}{f} = \left[\frac{2}{(1.3739)(L^2/D^2)+1}\right]\frac{\Delta L}{L} \quad (19)$$

which for D/L=1.33 gives, $$(\Delta f/f) = 1.1(\Delta L/L) \quad (20)$$

and for D/L=2 gives, $$(\Delta f/f) = 1.5(\Delta L/L).$$

As can be seen, the uncertainty in measuring L is nearly equal to that for the frequency measurement. Consequently, very high precision can be obtained for determining the volume displaced in this dimension configuration.

It is also informative to estimate the quality factor Q of the resonant modes, since the precision in measuring the resonant frequencies will depend, to a great extent, on the sharpness of the resonances. For the $TM_{010}$ mode:

$$Q\frac{\delta}{\lambda} = 0.22\ \text{for}\ D/L = 1.33,\ Q\frac{\delta}{\lambda} = 0.19\ \text{for}\ D/L = 2.$$

Where $\delta$ is the skin depth given by $\delta = [(\lambda\rho)/120\pi^2\mu]^{\frac{1}{2}}$, $\rho$ is the resistivity of the wall material of the chamber 28, $\lambda$ is the wavelength, and $\mu$ is the permeability of the wall material.

If the chamber 28 is made of copper, $\rho=1.7\times 10^{-6}$, $\mu=1$ and $\delta=4.43\times 10^{-4}$ cm at 219 Mc/s. Therefore
$Q=6.8\times 10^4$ for D/L=1.33 and $$Q=5.9\times 10^4\ \text{for}\ D/L=2.$$

Depending in the coupling coefficient, the width of the resonance curve at the half power points varies between $(2f_o/Q)$ and $(f_o/Q)$ where $f_o$ is the resonant frequency. Consequently, the width of the resonance curve for the values of Q computed are:
at $f_o$=219 Mc/S: $3.2 \leq \Delta f \leq 6.4$ kc/s for $Q=6.8\times 10^4$ and
$3.7 \leq \Delta f \leq 7.4$ kc/s for $Q=5.9\times 10^4$ Since $f_o$ can be usually determined to an accuracy of $10^{-2}$ of f or better, we can expect an accuracy of the order of $10^{-7}$ in determining $f_o$. This in turn implies accuracy of this order in the measurement of the diameter D of the chamber 28.

Similarly, for the $TE_{111}$ mode:

$$Q\frac{\delta}{\lambda} = 0.28\ \text{for}\ D/L = 1.33,\ Q\frac{\delta}{\lambda} = 0.27\ \text{for}\ D/L - 2,$$

which gives,
$Q=7.5\times 10^{-4}$ at 253.9 Mc/s and
$Q=5.5\times 10^{-4}$ at 331.5 Mc/s.
As before, the widths of the resonance curves are,
$3.4 \leq f \leq 6.8$ kc/s at 253.9 Mc/s and
$6.0 \leq f \leq 12.0$ kc/s at 331.5 Mc/s.

Again adapting the criteria that $f_o$ can be determined accurate to $10^{-2}$ of $\Delta f$, then for the worst case of (12.0 kc/s) $\Delta f_o/f_o \approx 4\times 10^{-7}$. From the expression previously derived for D/L−2, $$\frac{\Delta f_o}{f_o} = 1.5\left(\frac{\Delta L}{L}\right)$$

Therefore, $(\Delta L/L)$ can be determined to $(4\times 10^{-7})/1.5 \cong 2.7\times 10^{-7}$.

It is also possible to calculate the perturbation on the resonant frequency of a cavity mode due to the presence of a gas-inlet and outlet opening 62 on one head 60 of the cylinder 12. From the Adiabatic Invariance theorem and a knowledge of the field configuration inside the cavity, the frequency pulling caused by the hole can be estimated in a straightforward manner. If the hole dimension is well below the cut-off wavelength (which will be rigorously true for the case under consideration), then the frequency pulling will be proportional to the ratio of the cube of the hole diameter to the volume of the chamber 28.

Illustratively, the expression for the change in the resonant frequency of the $TM_{010}$ mode caused by the opening 62 located at the center of the plate 60 is given by, $$(\Delta f/f_o) = (d^3)/8D^2 L(X_{01}) J_1^2(X_{01}) \qquad (21)$$

where d is the diameter of the hole $J_1(X_{01})$ is the value of the Bessel function $J_1$ at $X_{01}$, and $\Delta f$ is the frequency shift.

Upon numerical evaluation using D=104.88 cm, L−52.44 cm, $X_{01}=2.40483$ and $J_1^2(X_{01})=0.2695$, then
$(\Delta f/f_o) = 3.35 \times 10^{-7} d^3$ As can be seen, for d of the order of 2 cm or less, the frequency shift is only of the order of $2 \times 10^{-6}$. Consequently, the shift is very small and with an appropriate initial calibration procedure, such as covering the opening 62 with a matching metallic plug, this effect can be virtually eliminated as a systematic error in the precision of the method.

Coupling of the microwave energy to the chamber 28 for the two modes $TM_{010}$ and $TE_{111}$ can best be accomplished by placing a coaxial feed line terminated in the antenna 70 at a position approximately ½ way out from the center of the end plate 60 of the cylinder 12 with the loop oriented along a radius. The magnetic field at this location is about 90% of the maximum field intensity inside the cavity for both modes. Consequently, both modes are energized to the same degree of coupling with high efficiency. In addition, by placing the coupling on the head 60, the coupling will not be affected by the movement of the displacement piston 14.

In the following, a description will be given of a second preferred method of measuring a displacement volume within the chamber 28 and using this accurately determined volume to calibrate the train of pulses as provided by the optical, linear encoder 26. In a similar manner to that described above, the piston 14 is moved from a first position as indicated in FIG. 10 by the designation $L_1$, to a second position indicated by the designation $L_2$ having moved through a displacement of $\Delta L$. The cylinder 12 is inherently rigid whereby the calibration process, as will be described, may be only carried out occasionally to insure that no long term systematic changes, such as dimensional deformation of the cylinder 12, misalignment and malfunction of the optical linear encoder 26, or distortion of the piston 14 has occurred. In order to maximize the absolute measurement accuracy of the microwave volume calibration, it is necessary that the mechanical configuration of the cylinder 12 be as close as possible to that of a perfect, totally enclosed right circular cylinder and thereby eliminate or reduce all possible sources of systematic perturbations which could potentially affect the microwave measurements.

Figure 12A:
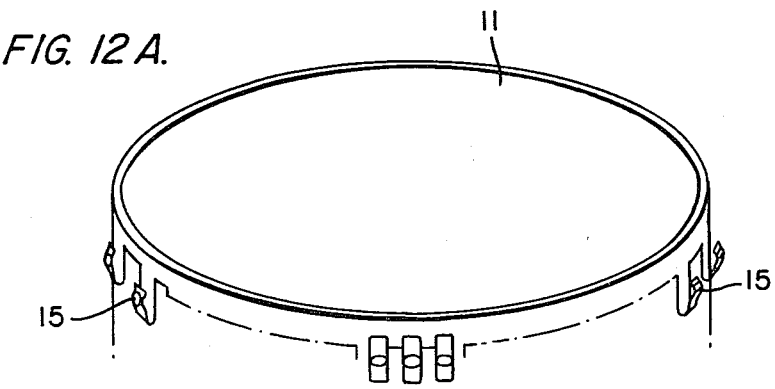
FIGS. 12A and B show respectively a perspective view of a cover to be placed over the piston as shown in FIGS. 1 and 2A, and a cross-sectional view of the spring-like seal disposed about the periphery of the piston cover.
Figure 12B:
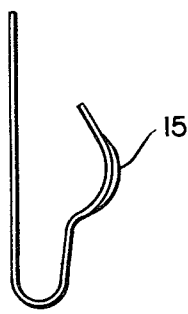

Referring now to FIG. 12A, certain mechanical modifications are made. First, the physical gap that exists between the piston 14 and the walls of the chamber 28 must be effectively blocked to prevent the escape of microwave energy through that gap. As explained in the above-identified application, filed concurrently herewith and entitled "Piston Seal", because of the nature of the seal between the piston 14 and the wall of the chamber 28, the gap is considerable. A cover 11 is made of a suitable metallic material, such as stainless steel, and further, has a series of springlike fingers 15, as shown in detail in FIG. 12B, disposed between the piston 14 and the inner periphery of the chamber 28, which, when the cover 11 is in place over the piston 14, project into the gap between the piston 14 and the wall of the chamber 28, the fingers being in close contact with the piston 14 and the wall. The fingers 15 act as a short circuit reflecting the electromagnetic field that would otherwise be directed through the noted gap. In an illustrative embodiment, the springlike fingers 15 are made of a beryllium copper. Further, the pressure and temperature sensors 51, 57, 48, and 68 are removed and are replaced by appropriate blank metallic plugs, configured to provide a substantially flush surface with the inside walls of the chamber 28. Further, the fluid inlet opening 62 in the head 60 is covered by a metallic plate to provide a substantially flush surface across the the top of the head 60. In addition, the inside peripheral walls of the chamber 28 are cleaned with a suitable solvent to remove any residual traces of the oil as may have seeped from the piston seal. Noting that the required calibration is determined by a displacement volume $\Delta V$ and not by the absolute volume of the chamber 28, the above-described mechanical modifications do not affect the accuracy of the calibration process. Once the measurements, as will be described, are made for the modified chamber 28, the same set of measurements may be carried out immediately afterwards with the chamber 28 restored to its normal operating configuration and a set of appropriate calibration factors can be generated to relate the two sets of measurements. The results of the second measurements can then be used as a data base from which subsequent checks of the absolute calibration can be compared without going through the full procedure of modification and reassembly of the chamber 28.

Briefly, the volume measuring and calibration process includes the step of moving the piston 14 to a first position indicated by the designation $L_1$ in FIG. 10, by manually rotating the rotary member 19 of the servomotor 20. At the first position, the antenna 70 is energized with electromagnetic energy of a first mode $TE_{111}$ and a second mode $TE_{112}$, selected to minimize the above-discussed perturbations. The frequencies $f_1$ and $f_2$ at which resonance is established for each mode is detected by observing the counter 1108. Then, the piston 14 is moved through a distant $\Delta L$ to a second position as indicated by the designation $L_2$, whereat the antenna 70 is energized again with electromagnetic energy of the first and second modes and corresponding frequencies at which resonance is established for each of the modes are noted. The output of the optical, linear encoder 26 is applied to a counter, which counts the linear encoder pulses as the piston 14 is moved through the distance $\Delta L$. The diameters $D_1$ and $D_2$ of the chamber 28 at each of the first and second positions corresponding to the designations $L_1$ and $L_2$ are calculated. At this point, a calculation of the $\Delta L$ is made using the previously calculated values of $D_1$ and $D_2$. The calculated value of $\Delta L$ is divided by the number of pulses derived from the linear encoder 26 as counted during the movement of the piston 14 through the distance $\Delta L$ to provide a length calibration factor using the measurements of $D_1$ and $D_2$. The volume $\Delta V$ corresponding to that volume as defined by planes passing through the points $L_1$ and $L_2$ and the inner periphery of the chamber 28 is expressed by a mathematical expression in terms of the diameters $D_1$ and $D_2$ and $\Delta L$. If the output of the optical, linear encoder 26 is to be calibrated for a given volume, e.g., one cubic foot, that value is disposed in this equation and it is solved for the calculated values $D_1$ and $D_2$ to provide that value of $\Delta L$ corresponding to the movement of the piston 14 to draw one cubic foot of fluid through the meter 38. The calculated value of $\Delta L$ is multiplied by the previously calculated length calibration factor to provide that number of pulses that will be output by the optical, linear encoder 26 as the piston 14 is moved a length $\Delta L$ to draw the one cubic foot into the chamber 28. As explained above, the count as derived from the linear encoder 26 is used to calculate the calibration factor as incorporated within the calculation carried out in step 1062, as shown in FIG. 9N. In particular, the calibration factor is the reciprocal of the counts so derived for one cubic foot of fluid drawn into the chamber 28 and provides a correction to the calculation of percent error in the reading of the meter based upon a precise measurement of the volume of the chamber 28, as explained above.

First, it is necessary to measure the frequencies at which the standing wave conditions are established at the positions $L_1$ and $L_2$. The calculation of diameters $D_1$ and $D_2$, as will be explained, requires a value of the speed of light, which changes for varying ambient conditions of temperature, pressure, and relative humidity. Corrections for changes in the speed of light are expected to be small, and the calculation of the speed of light is made typically once or twice during the course of a calibration process of the optical, linear encoder 26.

The speed of light in vacuum, $C_o$, is $2.997925 \times 10^{10}$ cm/sec. The corresponding value c for air is obtained by dividing $C_o$ by the refractive index of air at the wavelength of observation. For the microwave region (f<30 GHz), the refractive index, n, is related to the atmospheric parameters by the equation:

$$(n - 1) \times 10^6 = \frac{77.6}{T}\left(P + \frac{4810e}{T}\right) \quad (22)$$

where P is the total pressures in millibars (1 bar=$10^6$ dynes/cm$^2$=0.986923 standard atmosphere −75.0062 cm Hg at 0° C.), T is the temperature in degrees Kelvin, and e is the partial vapor pressure of water in millibars. The speed of light is then given by $$c = C_o/n = C_o/\left(1 + \frac{77.6}{T}\left(P + \frac{4810e}{T}\right) \times 10^{-6}\right) \quad (23)$$

The temperature and barometric pressure can be directly obtained from the readings of a thermometer and a barometer placed near the meter prover 10. The partial vapor pressure of water can be deduced from the relative humidity data obtained with a sling psychrometer through the use of the psychrometer formula, or more conveniently, via the use of a standard table such as the Smithsonian Physical Table #640.

In order to calculate a value of $\Delta L$, there is needed to determine the average value of the diameter of the chamber 28 and more specifically, to determine the values of the diameters $D_1$ and $D_2$ at the locations $L_1$ and $L_2$, respectively. The calculation $D_1$ and $D_2$ is carried out with great care since the resulting uncertainty in the volume is approximately twice the uncertainty of this measurement. As explained above, the piston 14 is moved to the first position corresponding to the designation $L_1$ at which the frequencies $f_1$ and $f_2$ for which the resonant standing wave condition is established for the two different modes. The preferred method is to measure simultaneously the resonant frequencies $f_1$ and $f_2$ of two different modes of the same electrical characteristics as a function of the piston position L and solve for the average diameter $\overline{D}$ by using the appropriate theoretical expression.

In a preferred embodiment wherein the chamber 28 has the configuration of a right circular cylinder, the pair of modes preferred for this purpose are the $TE_{111}$ and $TE_{112}$ modes. As will be discussed, it has been demonstrated that the quality factor Q obtained by excitation in these modes is high thereby reducing the effects of perturbations upon the measurements of resonant frequency. The average diameter of the cylinder at any fixed position of L is given by the expression:

$$\overline{D}(L) = \frac{1.015098c}{[4f_2^2(L) - f_1^2(L)]^{\frac{1}{2}}} \quad (24)$$

where $f_2$ is the resonant frequency of the $TE_{111}$ mode and $f_1$ is the resonant frequency of the $TE_{112}$ mode, and c is the speed of light in air as calculated by equation 23. By using two different modes of electromagnetic wave energy excitation, the various perturbations such as skin-depth variation, reactive frequency pulling caused by the antenna 70, the degree of divergency of the inner periphery of the chamber 28 from being a perfect right circular cylinder are compensated for and the absolute value of $\overline{D}$ is obtained with great accuracy. By exercising care in the taking of measurements of the frequencies upon the counter 1108, as shown in FIG. 10, absolute accuracies of the values $\overline{D}$ as a function of L may be obtained in the order of one part in $10^5$ or 0.1 mill out of a 12 inch diameter. This degree of accuracy is of the same order of the changes in the volume of the chamber 28 due to thermal expansion and contraction as disposed in a temperature stabilized environment where the temperature is maintained within range of ±1° F.

In order to confirm these measurements as well as to provide a quantitative means for evaluation of the order of magnitude of the expected perturbations in the system of measurement, the diameter may be independently determined by measuring the resonant wave frequencies by generating electromagnetic waves of the $TM_{010}$ mode within the chamber 28. With such a mode of excitation, the resonant frequency is independent of the length L and therefore for a perfectly uniform cylinder, should not change as the position of piston 14 is varied. However, excitation in the $TM_{010}$ mode is subject to other various perturbations which need be considered to achieve the same degree of accuracy as for the two modes discussed above. For the $TM_{010}$ mode, the average diameter is given by the expression:

$$\overline{D}(L) = 0.7654799c/f \quad (25)$$

where f is a resonant frequency of the $TM_{010}$ mode.

Once the average diameter D of the chamber 28 as a function of L has been determined to the desired degree of accuracy, the value of $\Delta L$ is obtained and related to the observed number of pulses from the optical, linear encoder 26 in order to obtain the length calibration factor in terms of length per pulse interval or number of pulses per inch. The piston position is set at $L_1$, and the resonant frequencies at $f_1$ and $f_2$ for the selected modes $TE_{111}$ and $TE_{112}$ are measured. The piston 14 is then moved by cranking the rotary member 19 to a new position $L_2$ and the resonant frequencies of the same modes are remeasured, while counting the number of optical encoder pulses during the movement of the piston 14 from its first to its second position. The number of pulses is divided by $\Delta L = L_1 - L_2$ to provide the desired length calibration factor. The distance $\Delta L = (L_1 - L_2)$ should be large enough such that the calibration accuracy is not limited by the accuracy in the pulse count ($\pm 1$ in this case) and the calibration should be performed over a number of $\Delta L$ intervals to insure that no non-linearity effects exist in these measurements.

For the $TE_{111}$ mode, the change in distance $\Delta L$ is given by the expression:

$$\Delta L = (L_2 - L_1) = \frac{C}{2}\left[\left[f_2^2 - \left(\frac{0.5860671C}{D(L_2)}\right)^2\right]^{-\frac{1}{2}} - \left[f_1^2 - \left(\frac{0.5860671C}{D(L_1)}\right)^2\right]^{-\frac{1}{2}}\right] \quad (26)$$

where $f_2$ and $D(L_2)$ are the $TE_{111}$ mode resonant frequency and the previously determined average diameter at piston position $L_2$, and $f_1$ and $D(L_1)$ are the respective values at position $L_1$.

For the $TE_{112}$ mode, the change in distance $\Delta L$ is given by the expression:

$$\Delta L = (L_2 - L_1) = C\left[\left[f_2^2 - \left(\frac{0.5860671C}{D(L_2)}\right)^2\right]^{-\frac{1}{2}} - \left[f_1^2 - \left(\frac{0.5860671C}{D(L_1)}\right)^2\right]^{-\frac{1}{2}}\right] \quad (27)$$

where the various quantities are defined in a similar manner as above.

Similar expressions can be written for any mode of excitation, and more than one mode can be used to check the internal consistency and absolute accuracy of these measurements.

The absolute calibration of the displacement volume $\Delta V$ between the piston positions $L_1$ and $L_2$ is provided by the following expression:

$$\Delta V = V_2 - V_1 (\pi/4)[D_2^2(\Delta L) + (D_2^2 - D_1^2)L_1] \quad (28)$$

where $D_2$ and $D_1$ are the averaged diameters of the cylindrical cross-sections as taken at piston positions $L_1$ and $L_2$ and $DL = (L_1 - L_2)$. It is evident from an observation of the equation 28 that knowing values of $D_2$ and $D_1$, if we assume for calibration purposes a given value of the absolute displacement volume $\Delta V$, e.g., one cubic foot, that the corresponding value of $\Delta L$, i.e., that distance through which the piston 14 must be moved in order to draw one cubic foot of fluid into the chamber 28 of the meter prover 12, may be calculated. The object of the calibration is to obtain the number of pulses as derived from the optical linear encoder 26 that are output for any desired displacement volume $\Delta V$ and is obtained by multiplying the obtained value of $\Delta L$ for a given volume by the length calibration factor to provide the equivalent number of pulses that are output by the optical linear encoder 26.

The selection of the $TE_{111}$ and $TE_{112}$ modes to excite the cavity 28 was based upon repeated determinations using a number of normal mode resonances to determine the quality factor Q for each of the modes. These determinations of the Q of a normal mode require the measurements of the ratio of the reflected power (Pr) to the incident (Po) at the resonant frequency, and the frequency width of the response curve corresponding to the half-power level defined by $P_{\frac{1}{2}} = (Po + Pr)/2$. It is desired that the d.c. voltage response of the crystal detector 1110 be linear with input microwave power. This condition can be satisfied by operating the crystal detector 1110 in the so-called "square law detection" region corresponding to a d.c. level typically less than 20 millivolt. If necessary, the linearity of the response can be verified by the use of the step attenuator located on the sweep generator 1100. Once established, the coupling coefficient (Pr/Po) can be measured directly on the screen of the oscilloscope 1112 in terms of the corresponding voltage ratio. The half-power level then can be calculated as an equivalent voltage. The half width of the response curve, as shown in FIG. 14, is just the difference between the two frequency settings as set on the sweep generator 1100 corresponding to the half-power levels on either side of the resonant frequency as observed on the oscilloscope 1112. The Q of the resonance is calculated by using the expression given by equation 10. From these determinations of Q, it was demonstrated that $TE_{111}$ mode has a quality factor Q of approximatey 6,000 to 7,000 over the running range of the piston 14, while the $TE_{112}$ mode has a quality factor Q of 8,000 to 10,000. As indicated above, the quality factor is a measure of the order of magnitude of the expected deviation of the resonant frequency from the idealized results as provided by equation 1. Thus by using these modes, the resonant frequency may be measured with a greater accuracy and those perturbations as would arise due to in surface imperfections as well as for the effects of skin depth and frequency pulling may be minimized. Thus, the use of the modes $TE_{111}$ and $TE_{112}$ are believed to provide determinations of greater accuracy of the resonant frequency, and thus of the average diameter D and of the volume displacement between the two piston positions.

Thus, there has been described a meter prover that is capable of measuring fluid and in particular, gas flow through a meter with a high degree of precision. In one aspect of this invention, the volume of the cylinder into which the fluid is drawn is measured with extreme accuracy and is compared to the output of the encoder which detects movement of the cylinder's piston, whereby indication of the volume drawn into the cylinder is provided with corresponding high degree of accuracy. This standard or calibrated volume is compared with the output of the meter under test to provide an indication of meter registration, as well as the percentage of error of the meter fluid reading from the actual or calibrated volume indicated by the optical encoder of the meter prover system. Further, the meter prover system is controlled by a computer system whereby a number of tests are made in which parameters of meter and prover temperature and pressure are taken into consideration to adjust the indication of the measured volume of fluid flow, as well as to take repeated tests under varying conditions. In particular, varying volumes of fluid may be drawn by the meter prover through the meter by entering corresponding count factors into a counter of the computer and counting the selected count to zero, to terminate the meter test. In a further aspect of this invention, a new and novel method is employed for determining with high precision the volume of the cylinder into which the fluid is drawn for a given displacement of the piston. This accurate measurement is determined by the frequencies at which standing waves are established for first and second piston positions to provide a precise indication of the fluid volume and the output of the optical encoder coupled to detect the movement of the piston.

Numerous changes may be made in the above-described apparatus and method, and different embodiments of the invention may be made without departing from the spirit thereof; therefore, it is intended that all matter contained in the foregoing description and the accompanying drawings shall be interpreted as illustrative and not in a limiting sense.

We claim:

1. Apparatus for measuring with a high degree of accuracy the volume of a chamber of a meter prover, said chamber having the regular geometry of a right circular cylinder, the volume of said right circular cylinder being defined its diameter and length, said measuring apparatus comprising;
    (a) antenna means disposed for generating electromagnetic energy into and for receiving electromagnetic energy reflected from said chamber;
    (b) generating means coupled to said antenna means for generating first and second resonant modes of selected electromagnetic energy fields, each of said first and second modes having an electromagnetic energy field whose electric and magnetic component fields are uniquely related to said diameter and said length of said right circular cylinder;
    (c) means coupled to said antenna means for detecting the electromagnetic energy reflected from said right circular cylinder;
    (d) resonant condition detecting means coupled to said energy detecting means for providing first and second indications of the occurrences of the minimum levels of the reflected electromagnetic energy corresponding to the establishment of a standing wave resonant condition within said right circular cylinder for each of said first and second resonant modes; and
    (e) means coupled to said generating means for detecting first and second frequencies at which said standing wave resonant conditions are established within said right circular cylinder, said first and second frequencies being a function of the volume of said right circular cylinder whereby said volume is defined with the high degree of accuracy.

2. Volume measuring apparatus as claimed in claim 1, wherein said generating means comprises means for varying the frequency of the microwave electromagnetic energy until a standing wave condition is established within the chamber.

3. Volume measuring apparatus as claimed in claim 2, wherein said generating means automatically varies the frequency of the output microwave electromagnetic energy.

4. Volume measuring apparatus as claimed in claim 2, wherein said generating means comprises operator manipulable means for varying the frequency of the outputted electromagnetic wave energy.

5. Volume measuring apparatus as claimed in claim 1, wherein said energy detecting means and said generating means are each coupled to said antenna means and to said resonant condition detecting means, whereby a manifestation of the level of energy leaving said chamber is provided as a function of the frequency of the electromagnetic energy generated by said electromagnetic generating means.

6. Volume measuring apparatus as claimed in claim 1, wherein said detecting means comprises a counter.

7. Volume measuring apparatus as claimed in claim 1, wherein there is included means coupled to the output of said electromagnetic energy generating means for detecting the level of energy and for providing a feedback signal indicative of the level of energy to said electromagnetic energy generating means, whereby the level of power required by said electromagnetic energy generating means is stabilized.

8. A method of measuring accurately the volume of a meter prover, the meter prover including a chamber having the geometry of a right circular cylinder and dimensions including its diameter and axial length to be measured, said method comprising the steps of:
    (a) selecting at least one resonant mode of an electromagnetic field having electric and magnetic component fields that are uniquely related to the diameter and axial length of said chamber,
    (b) generating first and second distinct normal modes of electromagnetic energy field within said chamber of said selected resonant mode;
    (c) extracting reflected energy from said regular geometry chamber;
    (d) sensing first and second frequencies of the electromagnetic energy that establish resonant conditions for the first and second modes within said chamber; and
    (e) determining, based upon the numerical values of the sensed first and second frequencies, the length and diameter of and thus the volume of the right circular cylinder chamber.

9. The method of measuring volume as claimed in claim 8, wherein the normal modes for generating electromagnetic energy are selected to minimize the perturbations due to the character, configuration, and surface of the chamber.

10. The method of measuring volume as claimed in claim 9, wherein the modes selected are the $TE_{111}$ mode and the $TE_{112}$ mode.

11. The method of measuring volume as claimed in claim 9, wherein the modes selected are the $TE_{112}$ mode and the $TM_{010}$ mode.

12. The method of measuring volume as claimed in claim 9 wherein the modes selected are the $TM_{010}$ mode and the $TE_{111}$ mode.

13. A method of measuring accurately the volume of a chamber having the geometry of a right circular cylinder, the volume of said right circular cylinder being defined by its diameter and length, said method comprising the steps of:
    (a) selecting two resonant modes of electromagnetic energy fields, each of said modes having an electromagnetic energy field whose electric and magnetic component fields are uniquely related to said diameter and said length of said right circular cylinder;
    (b) generating said two electromagnetic energy fields of said two selected resonant modes, respectively;

(d) extracting reflected energy from said right circular cylinder for each of said two electromagnetic energy fields;

(d) sensing two frequencies of the electromagnetic energy fields that establish resonant conditions for said two normal modes respectively within said right circular cylinder; and (e) determining, based upon said two sensed resonant frequencies, said length and said diameter of and thus the volume of said right circular cylinder.

* * * * *